US012387399B2

(12) United States Patent
Barry et al.

(10) Patent No.: US 12,387,399 B2
(45) Date of Patent: Aug. 12, 2025

(54) INTERACTIVE GRAPHING USER INTERFACE

(71) Applicant: The Broad Institute, Inc., Cambridge, MA (US)

(72) Inventors: Andrew James Barry, Somerville, MA (US); Benjamin Eric Deverman, Somerville, MA (US); Ken Yee Chan, Cambridge, MA (US)

(73) Assignee: The Broad Institute, Inc., Cambridge, MA (US)

( * ) Notice: Subject to any disclaimer, the term of this patent is extended or adjusted under 35 U.S.C. 154(b) by 0 days.

(21) Appl. No.: 18/972,604

(22) Filed: Dec. 6, 2024

(65) Prior Publication Data

US 2025/0191257 A1 Jun. 12, 2025

Related U.S. Application Data

(60) Provisional application No. 63/608,116, filed on Dec. 8, 2023.

(51) Int. Cl.
| | |
|---|---|
| *G06T 11/00* | (2006.01) |
| *G06F 3/048* | (2013.01) |
| *G06F 3/14* | (2006.01) |
| *G06T 11/20* | (2006.01) |
| *G06T 11/60* | (2006.01) |

(52) U.S. Cl.
CPC .......... *G06T 11/206* (2013.01); *G06T 11/001* (2013.01); *G06T 11/60* (2013.01); *G06T 2200/24* (2013.01)

(58) Field of Classification Search
CPC ...... G06T 11/206; G06T 11/001; G06T 11/60; G06T 2200/24; G06F 3/14; G06F 3/0481–0483; G06F 3/04812; G06F 3/1431; G06F 3/048; G06F 11/323; G06F 18/29

See application file for complete search history.

(56) References Cited

U.S. PATENT DOCUMENTS

| | | | |
|---|---|---|---|
| 2010/0162152 A1* | 6/2010 | Allyn .................. | G06F 3/04842 715/767 |
| 2018/0018386 A1* | 1/2018 | Orlova ................. | G06T 11/206 |
| 2019/0384762 A1* | 12/2019 | Hill ...................... | G06F 16/2272 |
| 2022/0057902 A1* | 2/2022 | Kwiecien .............. | G06F 3/0482 |

* cited by examiner

*Primary Examiner* — Wesner Sajous
(74) *Attorney, Agent, or Firm* — FIG. 1 Patents

(57) ABSTRACT

An interactive graphing user interface is described. In one or more implementations, a user interface of an interactive graphing application is displayed. The user interface includes a graph having a first axis and a second axis. User input to assign a first set of data values to the first axis of the graph and to assign a second set of data values to the second axis of the graph is received via the user interface. In response to the user input, a visualization of the first set of data values and the second set of data values is displayed in the graph. The visualization includes data points that plot the first set of data values against the second set of data values.

20 Claims, 32 Drawing Sheets
(21 of 32 Drawing Sheet(s) Filed in Color)

INTERACTIVE GRAPHING USER INTERFACE

RELATED APPLICATIONS

This application claims the benefit of and priority to U.S. Provisional Application Ser. No. 63/608,116, filed on Dec. 8, 2023, the disclosures of which are incorporated herein by reference in their entireties.

BACKGROUND

Data visualization is the use of visual elements like charts and graphs to represent data, making it easier to understand, analyze, and communicate complex information. Data visualization aids in exploring data, conveying insights to a broader audience, facilitating informed decision-making, detecting trends, and monitoring performance in various fields and industries.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Overview

Figure 1:
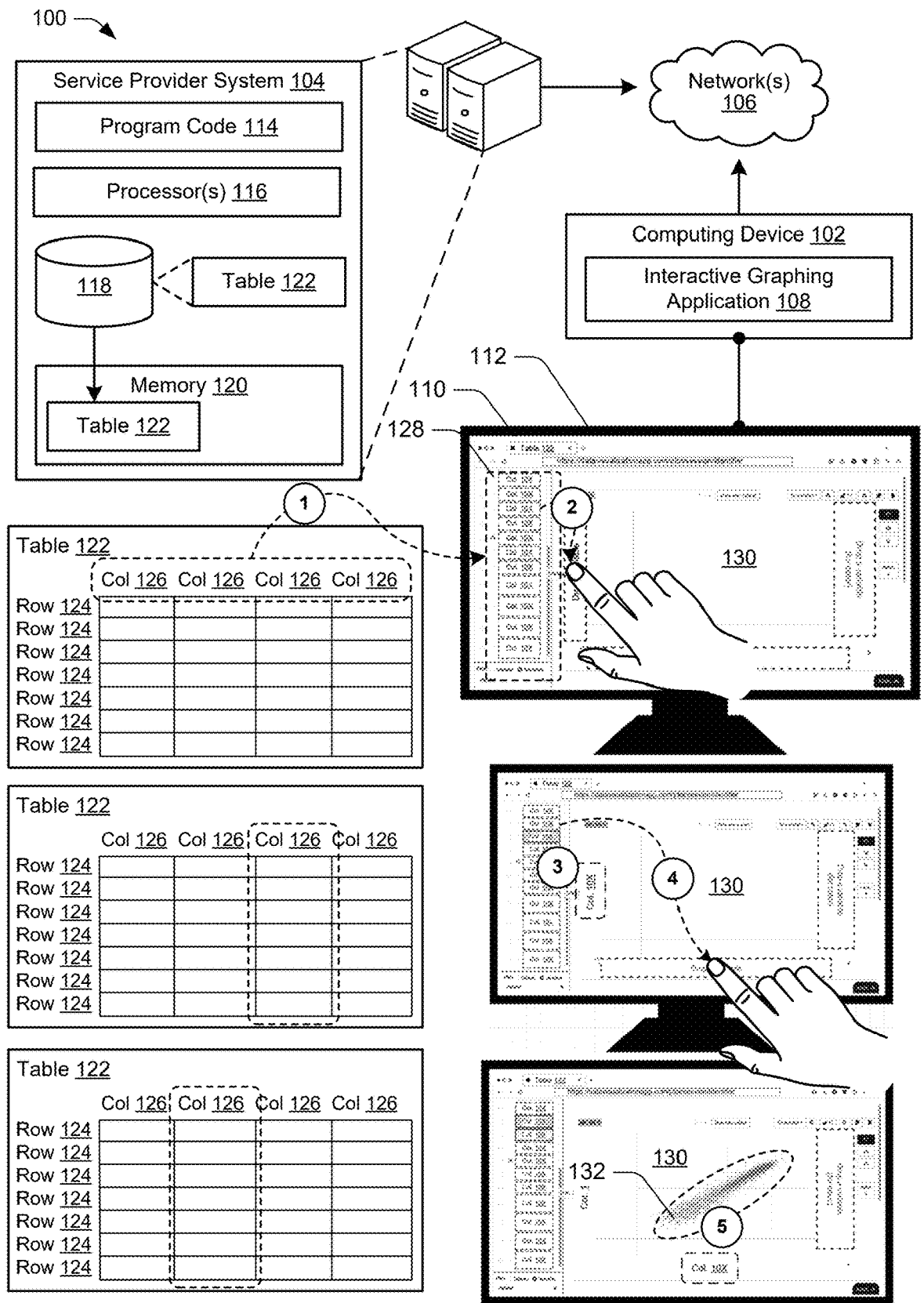
FIG. 1 is an illustration of an environment 100 in an example implementation that is operable to employ techniques described herein.

An interactive graphing user interface is described. In accordance with the described techniques, an interactive graphing application supports communication of data across a network, e.g., between a computing device that displays a graphing user interface and a service provider system having one or more servers. By supporting such data communication, the interactive graphing application enables a respective user of the computing device (and users of other computing devices) to interact with the graphing user interface, causing the interactive graphing application to request that the service provider system leverage its underlying resources for displaying visualizations of large amounts of data, e.g., over 5 million rows of data in a table. The service provider system may be configured with resources that are suitable to store and process large amounts of data in real-time. For example, the data may be contained in a file having a table that contains over 5 million rows of data, such as a spreadsheet or .csv file. The service provider system may be configured with different resources than the computing device that displays the graphing user interface, enabling the service provider system to store and/or process large amounts of data in ways that the computing device cannot, because the computing device is not equipped with those resources to the same extent.

In accordance with the described techniques, the interactive graphing application is configured to enable a user to select a source of data for visualizing. For example, user input is received to select a file that contains a table that stores data in multiple rows and columns. In response to the selection of the table via the graphing user interface, the table is loaded into memory. In one or more implementations, the table is loaded into memory at the service provider system. The memory at the service provider system may be capable of handling (e.g., processing) more data than memory of the computing device. For example, the memory of the service provider system is configured to have a table with millions of entries (e.g., rows) loaded and also enables one or more processors of the service provider to process the data of the table or portions of the table (e.g., one or more rows of the data and/or one or more columns of the table) in substantially real time. The memory may have superior capabilities (in terms of size of data that can be handled and speed) to memory of the computing device due to implementation at the service provider system. This is because the service provider system may be able to physically house or maintain more memory hardware (e.g., across one or more servers) than is reasonable, practical, or even possible to house within a "client" computing device, such as within a laptop, desktop, smart phone, or other mobile device. In other words, memory of the computing device may not be large enough or fast enough to handle a table having a "large" amount of data, whereas the memory is large enough and fast enough to handle such a table, e.g., millions of rows of data of a table.

The table includes data arranged within rows and columns. In one or more implementations, the data in each of the of the multiple rows of the table represents an entry in the table and each of the multiple columns represents an attribute of the entry. By way of example, such attributes may be categorical or numerical (e.g., including categorical converted to numerical using one or more known techniques). In at least one example, for instance, a row corresponds to a particular sample that is subject to lab tests, and each of the multiple columns corresponds to a test result from testing the particular sample or to another describable/computable aspect of the testing. Further, a different row corresponds to a different sample that is subject to the lab tests, such that values within the different row include values of a test result from testing the different sample or other describable/computable aspects of such testing.

In accordance with the described techniques, the graphing user interface includes a graph having a first axis and a second axis, e.g., an "x-axis" and a "y-axis". The interactive graphing also includes a data set selection region that includes a plurality of visual indications which each correspond to a set of data values, e.g., extracted or derived from the table. For example, each of the visual indications may correspond to data extracted from one of the multiple columns, such that each of the multiple columns that contains data is represented by a respective displayed visual indication in the data set selection region. In accordance with the described techniques, the data of a column corresponds to a set of data values, and the set of data values includes the data values within the column for the multiple rows (e.g., all the populated rows) of the table.

The visual indications are selectable and manipulatable within the graphing user interface. For example, each of the visual indications may be draggable around the graphing user interface to different areas of the graphing user interface. In one or more implementations, each of the visual indications can further be "dropped" at designated locations of the graphing user interface in order to assign the respective data set to an axis of a displayed graph.

For example, in order to plot a first set of data values against a second set of data values, the user selects a first visual indication of the first set of data values and positions the first visual indication at a first region of the graphing user interface that is associated with a first axis of the graph, e.g., by selecting and dragging the first visualization to the first region associated with the first axis. Next, the user selects a second visual indication of the second set of data values and positions the second visual indication at a second region of the graphing user interface that is associated with a second axis of the graph, e.g., by selecting and dragging the first visualization to the second region associated with the second axis. In response to this input, the interactive graphing application automatically displays a visualization of the first set of data values and the second set of data values in real time. For example, the visualization may correspond to a scatter plot which includes data points that plot the first set of data values against the second set of data values.

The ability to drag visual indications around the graphing user interface to desired areas (and drop them at the desired areas) reduces the cognitive burden on a user in connection with generating and manipulating data visualizations relative to conventional techniques. For instance, dragging (and dropping) a visual indication is easier for a user than selecting multiple cells (e.g., of a table) and then confirming that the range of selected cells corresponds to a desired set of data values to be used for a visualization. As a result of the reduced cognitive burden, the graphing user interface may receive fewer inputs, including fewer erroneous inputs and inputs provided to rectify such erroneous inputs, than user interfaces associated with conventional approaches. Due to this, fewer user inputs may be processed by the computing device and/or the service provider system in connection with the described techniques, such that processing cycles may be used to perform other tasks instead and/or such that power used to process inputs may be reduced relative to conventional techniques.

In some aspects, the techniques described herein relate to a computer-implemented method including: displaying, via a user interface of an interactive graphing application, a graph having a first axis and a second axis; receiving, via the user interface, user input to assign a first set of data values to the first axis of the graph and to assign a second set of data values to the second axis of the graph; and responsive to the user input, displaying, in the graph, a visualization of the first set of data values and the second set of data values, the visualization including data points that plot the first set of data values against the second set of data values.

In some aspects, the techniques described herein relate to a computer-implemented method, wherein the first set of data values is stored in a first column of a table, and wherein the second set of data values is stored in a second column of the table.

In some aspects, the techniques described herein relate to a computer-implemented method, further including loading a file that includes the table into the interactive graphing application, wherein the loading causes the interactive graphing application to: extract the first set of data from a first column in the table; extract the second set of data from a second column in the table; and display visual indications of the first set of data and the second set of data in the user interface.

In some aspects, the techniques described herein relate to a computer-implemented method, wherein each row of the table represents an entry in the table, and wherein each column in the table represents an attribute of the respective entry.

In some aspects, the techniques described herein relate to a computer-implemented method, wherein each row of the table represents a sample that is subject to test results, and wherein each column in the table represents a test result from testing the respective sample.

In some aspects, the techniques described herein relate to a computer-implemented method, wherein the user interface includes a data set selection region that includes at least a first visual indication of the first set of data values and a second visual indication of the second set of data values.

In some aspects, the techniques described herein relate to a computer-implemented method, wherein the user input includes at least: a first user input, to the data set selection region, to select the first visual indication and position the first visual indication in a first data assignment region associated with the first axis; and a second user input, to the data set selection region, to select the second visual indication and position the second visual indication in a second data assignment region associated with the second axis.

In some aspects, the techniques described herein relate to a computer-implemented method, further including adjusting the graph based on the first set of data values and the second set of data values, the adjusting including: determining a first range and a first scale of the first axis based on the first set of data values; determining a second range and a second scale of the second axis based on the second set of data values; and adjusting the graph based on the first range and the first scale of the first axis and the second range and the second scale of the second axis.

In some aspects, the techniques described herein relate to a computer-implemented method, further including: receiving additional user input to select a subset of the data points of the visualization; and responsive to the additional user input, adjusting the visualization in order to visually differentiate the selected subset of data points.

In some aspects, the techniques described herein relate to a computer-implemented method, wherein the adjusting the visualization in order to visually differentiate the selected subset of data points includes displaying the selected subset of data points with a different color.

In some aspects, the techniques described herein relate to a computer-implemented method, wherein the adjusting the visualization in order to visually differentiate the selected subset of data points includes displaying only the selected subset of data points.

In some aspects, the techniques described herein relate to a computer-implemented method, wherein the additional user input includes user input to draw a polygon to select the subset of the data points of the visualization.

In some aspects, the techniques described herein relate to a computer-implemented method, wherein the additional user input includes user input to provide a text string.

In some aspects, the techniques described herein relate to one or more computer-readable storage media having instructions stored thereon that, responsive to execution by one or more processors, perform operations including: displaying a user interface of an interactive graphing application, the user interface including a graph having a first axis and a second axis; displaying, on the graph, a visualization of a first set of data values extracted from a table and a second set of data values extracted from the table, the visualization including data points that plot the first set of data values against the second set of data values; receiving, via the user interface, user input to select a subset of the data points; and responsive to the user input, adjusting the visualization in order to visually differentiate the selected subset of data points.

In some aspects, the techniques described herein relate to one or more computer-readable storage media, wherein the adjusting the visualization in order to visually differentiate the selected subset of data points includes displaying the selected subset of data points with a different color.

In some aspects, the techniques described herein relate to one or more computer-readable storage media, wherein the adjusting the visualization in order to visually differentiate the selected subset of data points includes displaying only the selected subset of data points.

In some aspects, the techniques described herein relate to one or more computer-readable storage media, wherein the user input includes user input to draw a polygon to select the subset of the data points of the visualization.

In some aspects, the techniques described herein relate to a computing device including: at least a memory and a processor to execute an interactive graphing application, the interactive graphing application configured to: extracting a first set of data values from a first column of a table and extracting a second set of data values from a second column of the table; display a user interface that includes a graph having a first axis and a second axis; and display, on the graph, a visualization of a first set of data values extracted from the table and the second set of data values extracted from the table, the visualization including data points that plot the first set of data values against the second set of data values.

In some aspects, the techniques described herein relate to a computing device, wherein the interactive graphing application is further configured to: receive, via the user interface, user input to select a subset of the data points; and responsive to the user input, adjust the visualization in order to visually differentiate the selected subset of data points.

In some aspects, the techniques described herein relate to a computing device, wherein the visualization is displayed responsive to user input received, via the user interface, to assign a first set of data values to the first axis of the graph and to assign a second set of data values to the second axis of the graph.

In the following discussion, an exemplary environment is first described that may employ the techniques described herein. Examples of implementation details and procedures are then described which may be performed in the exemplary environment as well as other environments. Performance of the exemplary procedures is not limited to the exemplary environment and the exemplary environment is not limited to performance of the exemplary procedures.

Example of an Environment

FIG. 1 is an illustration of an environment 100 in an example implementation that is operable to employ techniques described herein. The environment 100 includes a computing device 102 and a service provider system 104. In one or more implementations, the computing device 102 and the service provider system 104 are communicatively coupled, one to another, via network(s) 106. One example of the network(s) 106 is the Internet, although one or more of the computing device 102 and the service provider system 104 may be communicatively coupled using one or more different connections or different networks in various implementations.

Computing devices that implement the environment 100 are configurable in a variety of ways. A computing device, for instance, is configurable as a desktop computer, a laptop computer, a mobile device (e.g., assuming a handheld configuration such as a tablet or mobile phone), an IoT device, a wearable device (e.g., a smart watch, a ring, or smart glasses), an AR/VR device (e.g., the smart glasses), a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud" as further described in relation to FIG. 52.

In at least one implementation, interactive graphing application 108 supports communication of data across the network(s) 106 between the computing device 102 and the service provider system 104. By supporting such data communication, the interactive graphing application 108 enables a respective user of the computing device 102 (and users of other computing devices) to interact with graphing user interface 110, causing the interactive graphing application 108 to request that the service provider system 104 leverage its underlying resources for displaying visualizations of large amounts of data, e.g., over 5 million rows. For example, the computing device 102 receives data from the service provider system 104. Based on the received data, the interactive graphing application 108 causes various systems of the computing device 102 to output the graphing user interface 110, such as by displaying the graphing user interface 110 via a display device 112 communicably coupled (e.g., wired or wirelessly) to the computing device 102, and to manipulate visualizations of large amounts of data in real-time via the graphing user interface 110.

In one or more implementations, the service provider system 104 includes, and/or otherwise has access to, resources that are suitable to store and process large amounts of data (e.g., over 5-million rows of a data table, such as a spreadsheet or .csv file) in real time. In at least one variation, the service provider system 104 includes or has access to more and/or different resources than the computing device 102, enabling the service provider system 104 to store and/or process large amounts of data in ways that the computing device 102 cannot, because the computing device 102 is not equipped with those resources to the same extent. In one or more implementations, the resources with which the service provider system 104 is equipped cannot practically be housed within a client device, such as a conventional desktop, conventional laptop, or conventional mobile device. Alternatively or in addition, the resources with which the computing device 102 is equipped are not suitable for processing an amount of data that the resources of the service provider system 104 are suitable to process. In this way, in order to generate and display visualizations for large amounts of data in substantially real time as user inputs are received, the computing device 102 relies on the resources of the service provider system 104.

In this example, the service provider system 104 includes program code 114 (e.g., server-side code for the interactive graphing application 108), processor(s) 116, storage device 118, and memory 120. In the context of the discussion just above, the processor(s) 116, the storage device 118, and the memory 120 are considered "resources" of the service provider system 104. Although not depicted, the computing device 102 also has one or more processors, a storage device, and memory, but it has less of one or more such resources and/or it has one or more such resources that are less performant in relation to those of the service provider system 104. In the following discussion, the program code 114, the processor(s) 116, the storage device 118, and/or the memory 120 may alternatively be referred to as "components" of the service provider system 104.

For example, in one or more implementations, the service provider system 104 has more, fewer, or different components than depicted in the illustrated environment 100. In one or more implementations, one or more of the program code 114, the processor(s) 116, the storage device 118, and/or the memory 120 may be included at a single computing device of the service provider system 104, such as at a single server of the service provider system 104. Alternatively or additionally, one or more of the program code 114, the processor(s) 116, the storage device 118, and/or the memory 120 may be distributed across multiple computing devices, such as across multiple servers of the service provider system 104 located at a server farm and/or located at different geographic locations.

Examples of the processor(s) 116 include, but are not limited to, a central processing unit (CPU), graphics processing unit (GPU), field programmable gate array (FPGA), digital signal processor (DSP), application-specific integrated circuit (ASIC), accelerator, quantum processor, single core processor, and multi-core processor, to name just a few. Examples of the storage device 118 include a hard disk drive (HDD), solid-state drive (SSD), non-volatile memory express (NVMe) storage, redundant array of independent disks (RAID) arrays, network-attached storage (NAS), storage area network (SAN), direct-attached storage (DAS), tape library, cloud storage (e.g., accessible via a third party web service provider), and hybrid storage, to name just a few. In one or more implementations, the storage device 116 is or is implemented as mass storage or virtual storage. For example, the storage device 116 may be virtualized across a plurality of data centers and/or cloud-based storage devices. Examples of the memory 120 include, but are not limited to, volatile memory, examples of which include random-access memory (RAM), dynamic random-access memory (DRAM), synchronous dynamic random-access memory (SDRAM), static random-access memory (SRAM), and memristors, to name just a few. Additional examples of the memory 120 include but are not limited to flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM).

Here, the storage device 118 is depicted including (e.g., storing) table 122. In accordance with the described techniques, the storage device 118 is configured to store any of a variety of types of data, one example of which is the table 122. In at least one variation, the storage device 118 is used to implement one or more databases, such that the table 122 is maintained as part of at least one such database. Additionally or alternatively, the storage device 118 is used to implement a file system (e.g., NTFS, Files-11, etc.), and the table 122 is a file maintained in the file system. It is to be appreciated that the storage device 118 may be configured in different ways to store the table 122 in accordance with the described techniques. Although not depicted, the storage device 118 is also configured to store additional tables and/or other data in addition to the table 122.

The data stored by the storage device 118 (including the table 122) may be added to the storage device 118 and/or updated in a variety of ways. In one or more implementations, for example, the data may be produced, saved (in whole or in part), and uploaded to the storage device 118, such as by creating a file, adding data to the file, and saving the file to the storage device 118. Alternatively or additionally, the data may be input to an interface (e.g., of an application), and the data input to the interface may then be stored, e.g., used to populate the table 122. Alternatively or additionally, the data may be streamed from an electronic source, such as an electronic stock ticker feed, one or more sensors, and/or the output of another machine, equipment (e.g., lab equipment), or computing device.

Additionally, the table 122, or other data visualized by the interactive graphing application 108 and displayed via the graphing user interface 110, may be formatted in a variety of ways in accordance with the described techniques. In one or more implementations, for instance, the table 122 may be configured as comma separated values (CSV), e.g., a text file format that uses commas to separate values. Other examples of data formats which may be used in accordance with the described techniques include, but are not limited to, other delimiter-separated value files (e.g., tab separated), spreadsheets, and JavaScript Object Notion (JSON) data, to name just a few.

Through interaction of a user with the computing device 102, the interactive graphing application 108 receives user input via the graphing user interface 110. Examples of such input include, but are not limited to, receiving touch input in relation to portions of a displayed user interface, receiving one or more voice commands, receiving typed input (e.g., via a physical or virtual ("soft") keyboard), receiving mouse or stylus input, and so forth. In one example, the interactive graphing application 108 is a browser-based application accessible via a browser, is stored on the service provider system 104, and is accessible via the connection of the computing device 102 to the network(s) 106. Another example of the interactive graphing application 108 is a web-based computer application, such as a mobile application or a web-based desktop application. The interactive graphing application 108 may be configured in different ways, which enable users to interact with their computing devices and by extension perform visualization operations in relation to large amounts of data maintained in the storage device 118, without departing from the spirit or scope of the techniques described herein.

In one or more implementations, the program code 114 is included at or otherwise stored by the service provider system 104, e.g., the program code 114 is stored in the storage device 118 or some other storage device (SRAM). Examples of the program code 114 include, but are not limited to, an executable, binary code, and intermediate representations, to name just a few. In accordance with the described techniques, the program code 114 is executable by the processor(s) 116 to implement server-side aspects of the interactive graphing application 108, such as to cause display of the graphing user interface 110 and based on inputs received via the graphing user interface 110 perform various operations to visualize data, e.g., large amounts of data, in the manners discussed above and below. In one or more implementations, the program code 114 is loaded into the memory 120 and then executed by the processor(s) 116 to carry out the functionality discussed above and below.

In accordance with the described techniques, input is received via the graphing user interface 110 to select a source of data for visualizing. In the context of the environment 100, for instance, user input is received via the graphing user interface 110 to select the table 122. By way of example, an identifier of the table 122 is navigated to in a dialog box, the identifier is selected, and an interactive user interface element (button) is selected to open the table 122 with the interactive graphing application 108. The data to visualize may be selected in other ways without departing from the spirit or scope of the described techniques, e.g., typed into an interactive user interface element (e.g., text field), an interactive user interface element (e.g., button) corresponding to the data may be selected, and so forth. In the following discussion, the table 122 refers to the data selected for visualization, even though in one or more scenarios the data selected for visualization is different from a table.

Responsive to selection of the table 122 via the graphing user interface 110, at the service provider system 104, the table 122 is loaded into the memory 120. For example, the program code 114 loaded into the memory 120 and executed by the processor(s) 116, causes the processor(s) 116 to load the table 122 into the memory 120.

In at least one variation, the memory 120 is capable of handling (e.g., processing) more data than memory of the computing device 102. For example, the memory 120 is configured to have a table with millions of entries (e.g., rows) loaded and also enables the processor(s) 116 to process the data of the table or portions of the table (e.g., one or more rows of the data and/or one or more columns of the table) in substantially real time. The memory 120 may have superior capabilities (in terms of size of data that can be handled and speed) to memory of the computing device 102 due to implementation at the service provider system 104. This is because the service provider system 104 may be able to physically house or maintain more memory hardware (e.g., across one or more servers) than is reasonable, practical, or even possible to house within a "client" computing device, such as within a laptop, desktop, smart phone, or other mobile device. In other words, memory of the computing device 102 may not be large enough or fast enough to handle a table having a "large" amount of data, whereas the memory 120 is large enough and fast enough to handle such a table, e.g., millions of rows of data of a table.

In the illustrated example, the table 122 is depicted having multiple rows 124 and multiple columns 126. It is to be appreciated that the number of rows may vary from one to any other positive integer and that the number of columns may also vary from one to any other positive integer without departing from the spirit or scope of the described techniques. In one or more implementations, each of the multiple rows 124 represents an entry in the table 122 and each of the multiple columns 126 represents an attribute of the entry. By way of example, such attributes may be categorical or numerical (e.g., including categorical converted to numerical using one or more known techniques).

In at least one example, for instance, a row corresponds to a particular sample that is subject to lab tests, and each of the multiple columns 126 corresponds to a test result from testing the particular sample or to another describable/computable aspect of the testing. Further, a different row corresponds to a different sample that is subject to the lab tests, such that values within the different row include values of a test result from testing the different sample or other describable/computable aspects of such testing.

It is to be appreciated that the multiple rows 124 and the multiple columns 126 may represent different aspects from entries and attributes without departing from the spirit or scope of the described techniques. To the extent that the following discussion of visual indications is described in relation to columns of the table 122, it should be appreciated that in at least one alternative implementation, visual indications for rows may be displayed and selected instead, such as when the columns correspond to entries and rows correspond to attributes of those entries.

From the perspective of the computing device 102, responsive to selection of the table 122 via the graphing user interface 110, the interactive graphing application 108 presents (e.g., displays) a plurality of visual indications 128. For instance, the interactive graphing application 108 presents the plurality of visual indications 128 in a data set selection region of the graphing user interface 110. In at least one scenario, each of the plurality of visual indications 128 corresponds to a set of data values, e.g., extracted or derived from the table 122. In the context of the illustrated example, for instance, the plurality of visual indications 128 corresponds to the multiple columns 126, such that each of the multiple columns 126 is represented by a respective displayed visual indication in the data set selection region. In accordance with the described techniques, the data of a column 126 corresponds to a set of data values, and the set of data values includes the data values within the column for the multiple rows 124 (e.g., all the populated rows) of the table 122. In the illustrated example, causing display of the plurality of visual indications 128 to represent the multiple columns 126 is represented in the environment 100 as a first step, e.g., the circle with a '1'.

The plurality of visual indications 128 may be displayed responsive to other triggers in accordance with the described techniques, such as responsive to a selection to initiate a new graphing session based on the table 122 and/or to resume a saved graphing session based on the table 122. In one or more implementations, the plurality of visual indications 128 includes more visual indications than a number of columns of the table 122, such as when a user interacts with the plurality of visual indications 128 and other interactive elements of the graphing user interface 110 to cause the processor(s) 116 to perform computations with the underlying data values.

In one or more implementations, the plurality of visual indications 128 are selectable and manipulatable within the graphing user interface 110. Responsive to user input, for instance, each of the plurality of visual indications 128 may be draggable around the graphing user interface 110 to different areas of the graphing user interface 110. In one or more implementations, each of the plurality of visual indications 128 can further be "dropped" at designated locations of the graphing user interface 110, such as to assign the respective data set to an axis of a displayed graph.

The ability to drag visual indications around the graphing user interface 110 to desired areas (and drop them at the desired areas) reduces the cognitive burden on a user in connection with generating and manipulating data visualizations relative to conventional techniques. For instance, dragging (and dropping) a visual indication is easier for a user than selecting multiple cells (e.g., of a table) and then confirming that the range of selected cells corresponds to a desired set of data values to be used for a visualization. As a result of the reduced cognitive burden, the graphing user interface 110 may receive fewer inputs, including fewer erroneous inputs and inputs provided to rectify such erroneous inputs, than user interfaces associated with conventional approaches. Due to this, fewer user inputs may be processed by the computing device 102 and/or the service provider system 104 in connection with the described techniques, such that processing cycles may be used to perform other tasks instead and/or such that power used to process inputs may be reduced relative to conventional techniques.

In one or more implementations, user input may be received in relation to a visual indication to select the visual indication (e.g., a tap and hold with a finger or click and hold a mouse button) and move (e.g., drag) the selected visual indication to an area of the graphing user interface 110 (e.g., move the finger around a touch screen to a portion of the screen displaying the area or move the mouse so that the pointer moves to the portion of the screen displaying the area). As noted above, user input may also be received to drop a visual indication at one or more designated areas of the graphing user interface 110, such as by lifting a finger off a touch screen or letting go of a depressed mouse button.

In accordance with the described techniques, user input is received to move a first visual indication of the plurality of visual indications 128 to a first area of the graphing user interface 110. In this example, the first area of the graphing user interface 110 is associated with a first axis of a graph 130 that is displayed in the graphing user interface 110. In other words, the input to move the first visual indication to the first area assigns a first set of data values to the first axis of the graph 130. In this example, the first set of data values corresponds to the column 126 of the table 122 that is represented by the respective first visual indication. Receipt of the input to select a first visual indication and move the first visual indication to a first area of the graphing user interface 110 associated with a first axis of the graph 130 is represented in the environment 100 as a second step, e.g., the circle with a '2'. In this example, the first axis of the graph 130 corresponds to a vertical axis of the graph 130, which is referred to as the "y-axis".

Based on receipt of the first input, the first set of data values is assigned to the first axis of the graph 130. For example, the program code 114 causes the processor(s) 116 to assign the first set of data values (e.g., those in the column 126 corresponding to the moved visual indication) to the first axis of the graph 130. This assignment to the first axis of the graph 130 is illustrated in the environment 100 as a third step, e.g., the circle with a '3'. In the illustrated example, the first set of data values corresponds to the visual indication 128 that is third from a top of the plurality of visual indications 128 and in this example also corresponds to a third column from the left of the table 122. It is to be appreciated, however, that in various implementations an order in which visual indications are displayed in the graphing user interface 110 may not correspond to an order of the columns 126 in the table 122. For example, an order of the visual indications may be arranged in a different manner, e.g., alphabetically or based on some other characteristic.

In accordance with the described techniques, user input is also received to move a second visual indication of the plurality of visual indications 128 to a second area of the graphing user interface 110. In this example, the second area of the graphing user interface 110 is associated with a second axis of the graph 130. In other words, the input to move the second visual indication to the second area assigns a second set of data values to the second axis of the graph. In this example, the second set of data values corresponds to a different column 126 of the table 122, which is represented by the respective second visual indication. Receipt of this additional user input to select a second visual indication and move the second visual indication to a second area of the graphing user interface 110 associated with a second axis of the graph 130 is represented in the environment 100 as a fourth step, e.g., the circle with a '4'. In this example, the second axis of the graph 130 corresponds to a horizontal axis of the graph 130, which is referred to as the "x-axis".

Based on receipt of this additional user input, the second set of data values is assigned to the second axis of the graph 130. For example, the program code 114 causes the processor(s) 116 to assign the second set of data values (e.g., those in the column 126 corresponding to the second moved visual indication) to the second axis of the graph 130. Additionally, responsive to the second input, a visualization 132 is displayed in the graph 130. The visualization 132 includes data points that plot the first set of data values against the second set of data values. The assignment of the second set of data values to the second axis and automatic display of the visualization 132 in the graphing user interface 110 is illustrated in the environment 100 as a fifth step, e.g., the circle with a '5'. Although the figures depict the "first axis" as the y-axis of the graph 130 and the "second axis" as the x-axis of the graph 130, in operation a user may provide input to move (e.g., drag) a visual indication to areas associated with either of the x-axis or the y-axis first. Additionally or alternatively, a user may provide input to move a visual indication to areas associated with visualization aspects (e.g., axes of the graph or other aspects as discussed in more detail below) in any of a variety of orders without departing from the spirit or scope of the described technique. Some of the details of the graphing user interface 110 discussed just above are more clearly depicted in FIGS. 2-5 as further described below.

Before discussing such details, however, a brief discussion of plotting data values is provided. In the context of plotting a first set of data values against a second set of data values to generate a scatter plot graph, for instance, pairs of data values are identified, forming data points. Each pair includes a data value from the first set of data values and a corresponding data value from the second set of data values. In the context of the table 122, for instance, the data value of the second set of data values that "corresponds" to the data value of the first set of data values is within a same row (or "record") of the table 122 as the data value of the first set of data values. The data point is plotted on the graph 130 where the data value from the first set and the data value from the second set intersect. Data values in a first set of data values (e.g., of a first column of a table) may be plotted against data values in a second set of data values (e.g., of a second column of the table) to produce any of a variety of graphs according to known techniques. Examples of such graphs include, but are not limited to, scatter plot graphs, bar charts, pie graphs, histograms, and line graphs, to name just a few.

Further, the described techniques are not limited to generating graphs based on just two sets of data values. Rather, the described techniques are useable to generate visualizations for more than two sets of data values. By way of example, a visual indication representing a third set of data values may be moved to an area of the graphing user interface 110, such as to an area associated with a third axis (e.g., z-axis) to generate a 3D visualization of data points. Alternatively or additionally, the third set of data values may be moved to an area of the graphing user interface 110 that causes correspondence of a third set of data values to be visualized in a different manner than along a third axis, such as to be visualized based on color, intensity, and/or opacity.

In order to configure the axes of the graph 130 so that data points formed by plotting the first set of data values against the second set of data values are displayed in the graphing user interface 110, ranges of the data values within the assigned sets may be determined. For a given axis, the range of data values within the assigned set can be used to define a span of values along the axis and/or a scale of the values along the axis. If the data values within a set range from 10 to 50, for instance, then in the graph 130 an axis assigned that set may be labeled as spanning from 10 to 50 (or some other range that includes the values of the set). Indeed, axes of the graph 130 may be configured in a variety of ways to display data points formed by plotting selected sets of data values. In the context assigning sets of data to axes of a graph by dragging visual indications of those sets to areas of a user interface associated with the axes, consider the following discussion.

Figure 2:
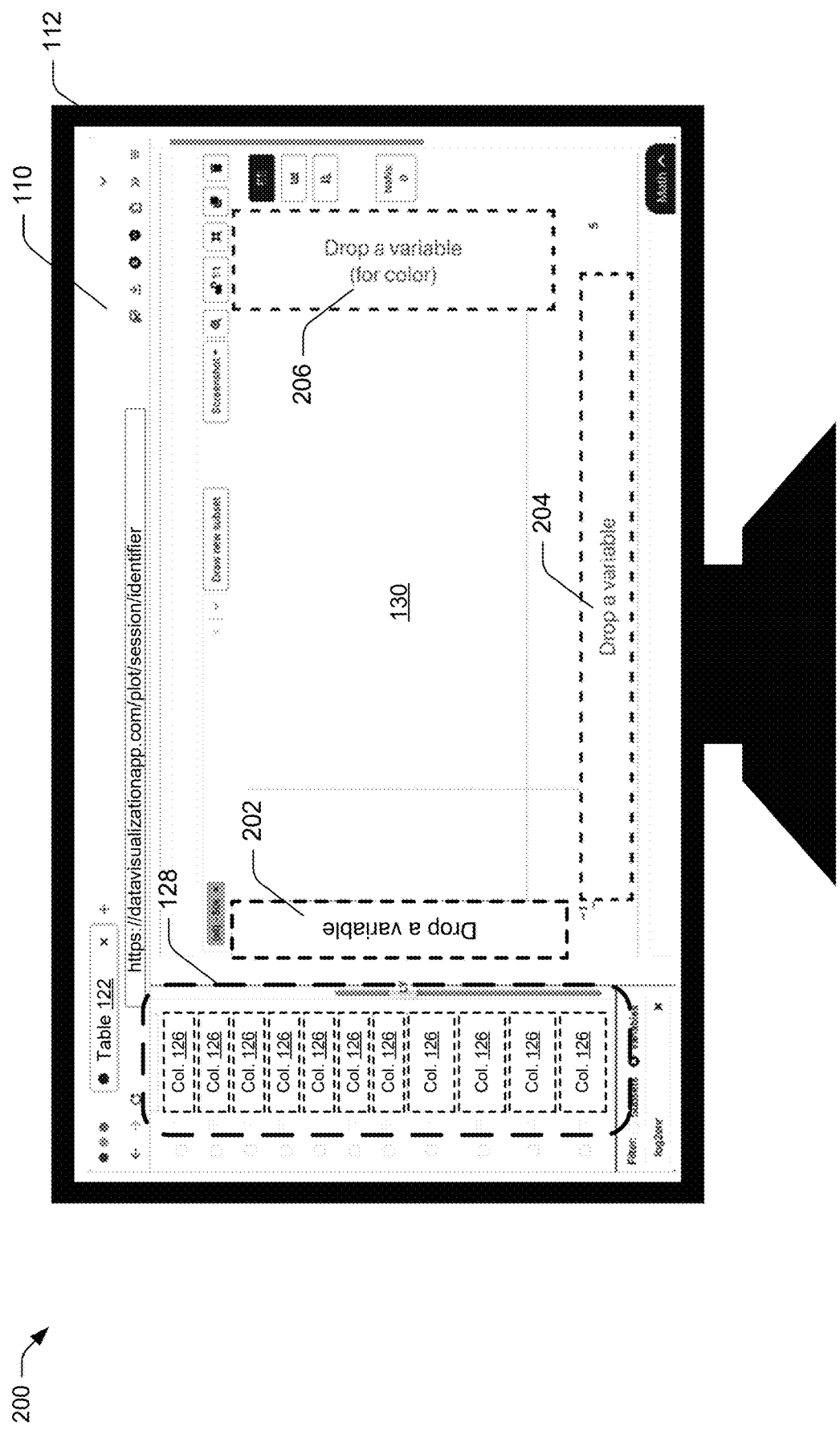
FIG. 2 depicts an example 200 of an interactive graphing user interface.

FIG. 2 depicts an example 200 of an interactive graphing user interface.

The illustrated example 200 includes the display device 102, which is depicted displaying the graphing user interface 110. In one or more implementations the graphing user interface 110 is generated by the processor(s) 116 executing the program code 114 and by causing data indicative of the graphing user interface 110 to be communicated to the computing device 102 and displayed by the computing device 102 on the display device 112. The graphing user interface 110 includes a variety of interactive elements with which a user can interact to cause the interactive graphing application 108 to utilize the resources of the service provider system 104 and thereby generate and manipulate visualizations for large amounts of data. In one or more implementations, the graphing user interface 110 is different from or otherwise varies from the user interfaces discussed herein. Alternatively or additionally, user interfaces used in connection with interactive graphing include any combination of the user interface elements discussed herein and/or depicted in FIGS. 2-50 without departing from the spirit or scope of the techniques described herein.

In the illustrated example 200, the graphing user interface 110 includes the plurality of visual indications 128. In one or more implementations, the plurality of visual indications 128 are displayed in a data set selection region of the graphing user interface 110. The illustrated example 200 also includes the graph 130, a first area 202 associated with a first axis of the graph 130, a second area 204 associated with a second axis of the graph 130, and a third area 206 associated with visualizing selected data on the graph 130.

Figure 3:
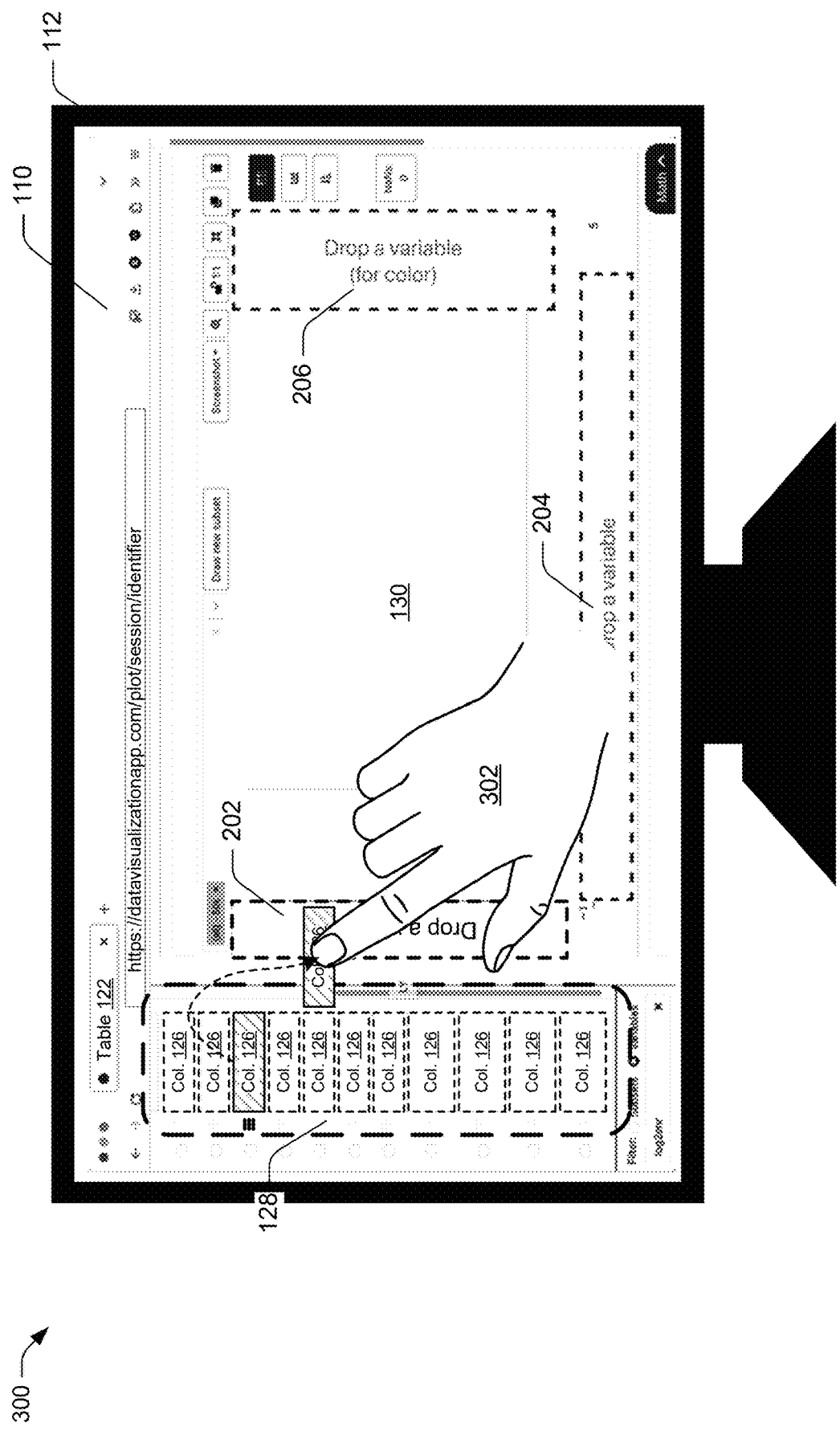
FIG. 3 depicts another example 300 of an interactive graphing user interface.

FIG. 3 depicts another example 300 of an interactive graphing user interface.

The illustrated example 300 includes the display device 102 displaying the graphing user interface 110. In this example 300, a hand 302 of a user is depicted providing input (e.g., touch input) via the graphing user interface 110 to select a visual indication from the data set selection region and drag the selected visual indication to the first area 202 associated with the first axis of the graph 130. In the continuing example, it is assumed that user input is further received to "drop" the selected visual indication into the first area 202 associated with the first axis of the graph 130. As mentioned above, responsive to this, the set of data values corresponding to the visual indication is assigned to the axis associated with the drop area. In one or more implementations, the graphing user interface 110 displays a label for the first axis (e.g., proximate the first axis) which corresponds to the selected visual indication (e.g., a text label of the selected visual indication).

Figure 4:
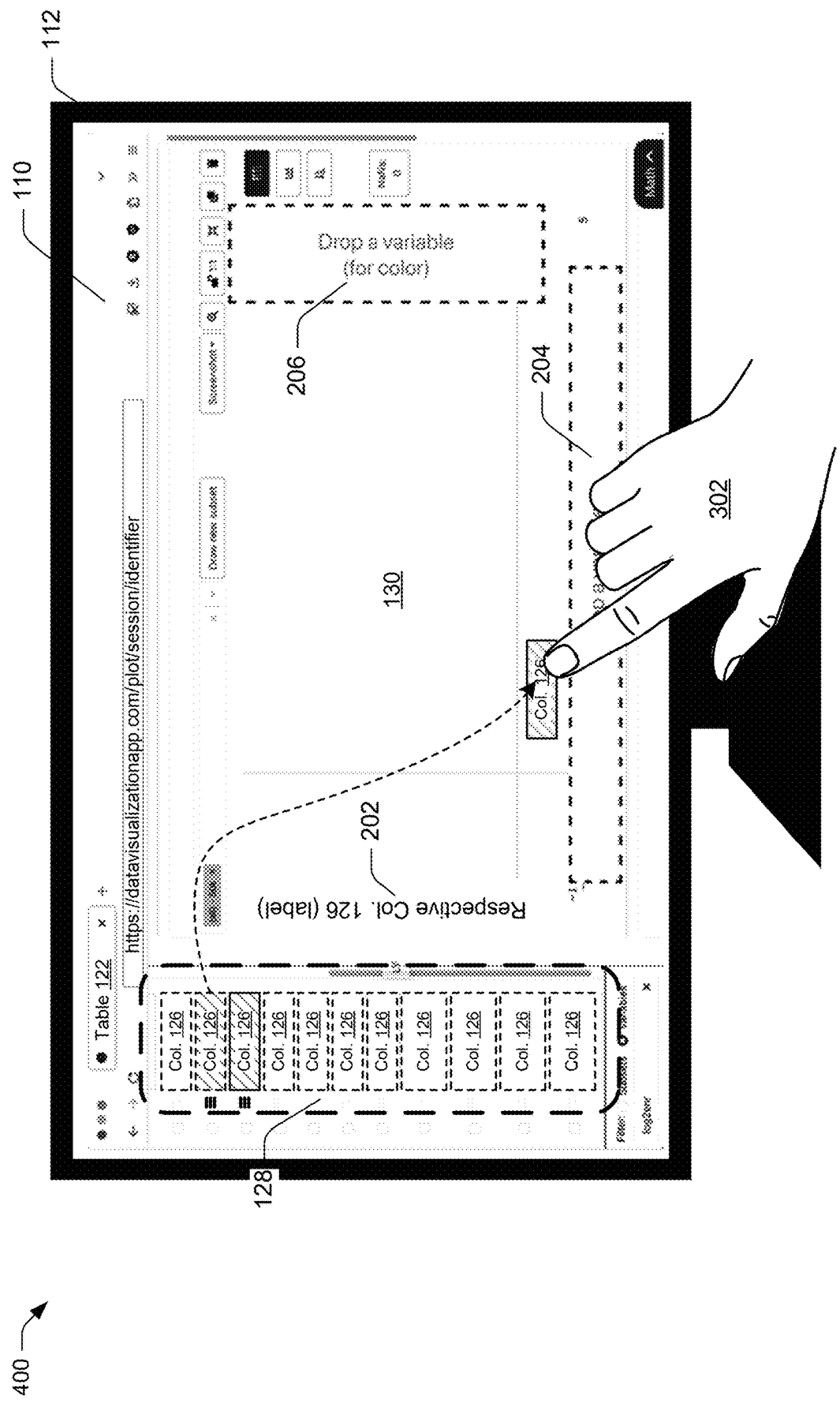
FIG. 4 depicts another example 400 of an interactive graphing user interface.

FIG. 4 depicts another example 400 of an interactive graphing user interface.

The illustrated example 400 includes the display device 102 displaying the graphing user interface 110. In this example 400, the hand 302 of the user is depicted providing input (e.g., touch input) via the graphing user interface 110 to select a second visual indication from the data set selection region and drag the second selected visual indication to the second area 204 associated with the second axis of the graph 130. In the continuing example, it is assumed that user input is further received to "drop" the selected visual indication into the second area 204 associated with the second axis of the graph 130. As mentioned above, responsive to this, the set of data values corresponding to the visual indication is assigned to the axis associated with the drop area.

Figure 5:
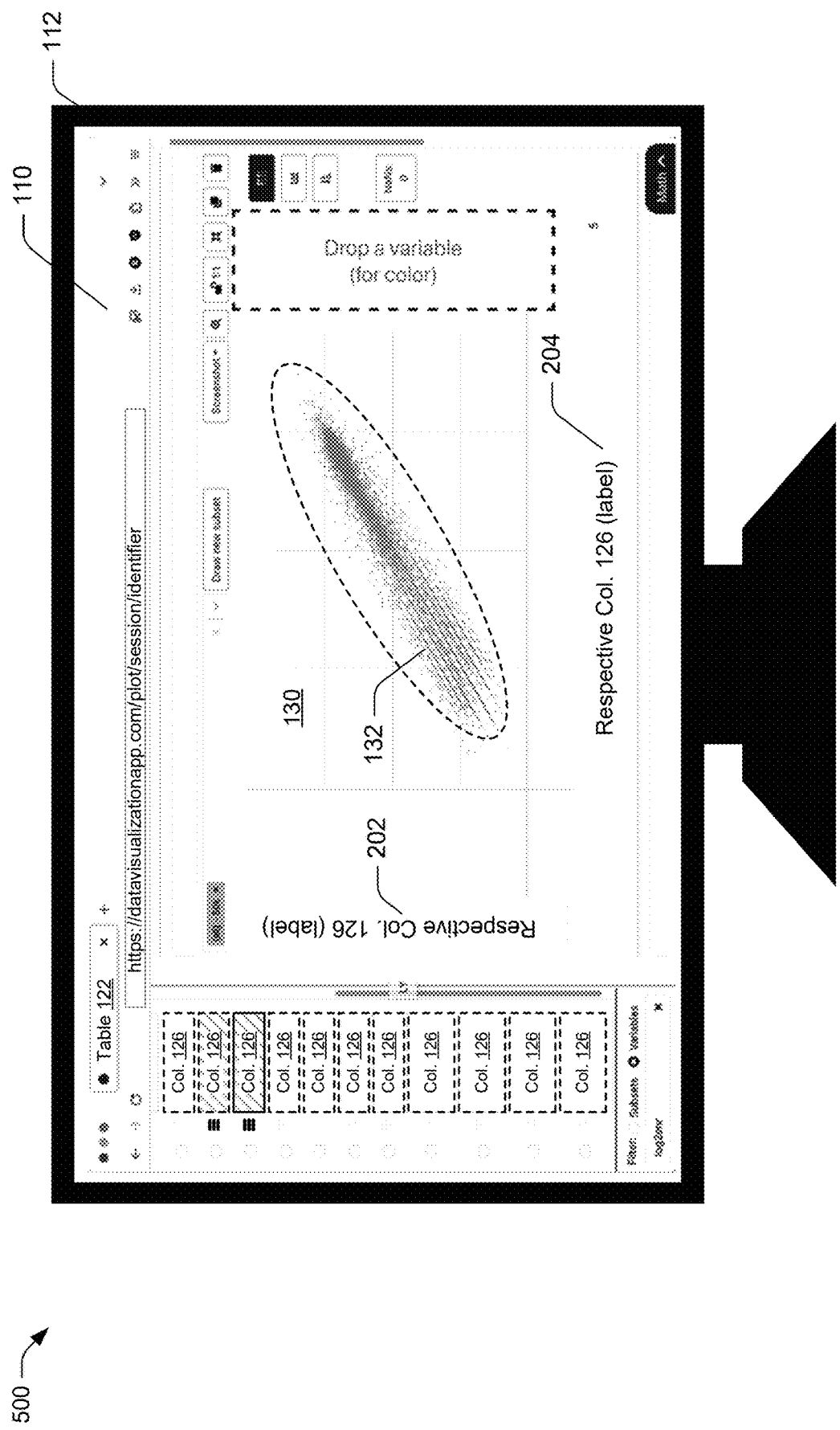
FIG. 5 depicts another example 500 of an interactive graphing user interface.

FIG. 5 depicts another example 500 of an interactive graphing user interface.

The illustrated example 500 includes the display device 102 displaying the graphing user interface 110. In this example 500, the graphing user interface 110 displays a label for the second axis (e.g., proximate the second axis) which corresponds to the second selected visual indication (e.g., a text label of the second selected visual indication). Additionally, the graphing user interface 110 is depicted displaying the visualization 132, which plots the first set of data assigned to the first axis against the second set of data assigned to the second axis. In at least one variation, both the label for the second axis and the visualization 132 are displayed in substantially real time after the second visual indication is dropped into the area of the graphing user interface 110 associated with the second axis of the graph 130. In the context of drawing a polygon on the graphing user interface 110 to select data points within the polygon, consider the following discussion of FIGS. 6-9.

Figure 6:
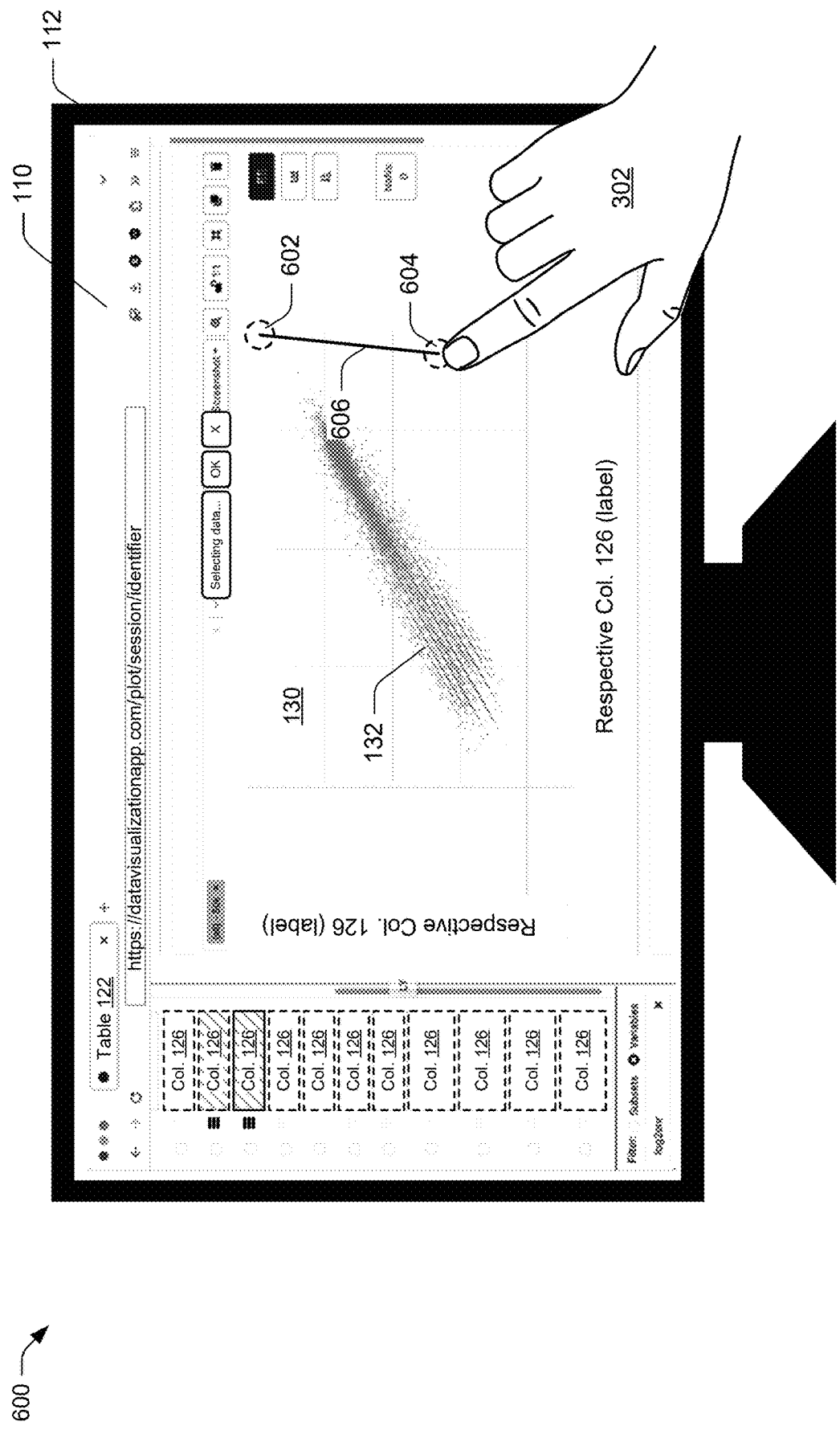
FIG. 6 depicts another example 600 of an interactive graphing user interface.

FIG. 6 depicts another example 600 of an interactive graphing user interface.

The illustrated example 600 includes the display device 102 displaying the graphing user interface 110. This example 600 represents a scenario where the hand 302 of the user provides and the graphing user interface 110 receives a first input (e.g., tap) at a first location 602 and a second input at a second location 604 in connection with forming a polygon to select a portion of the visualization 132, e.g., a subset of the data points. Here, since only two locations are specified by the input, a polygon is not yet formed. Instead, a line 606 between the two locations is formed and displayed.

Figure 7:
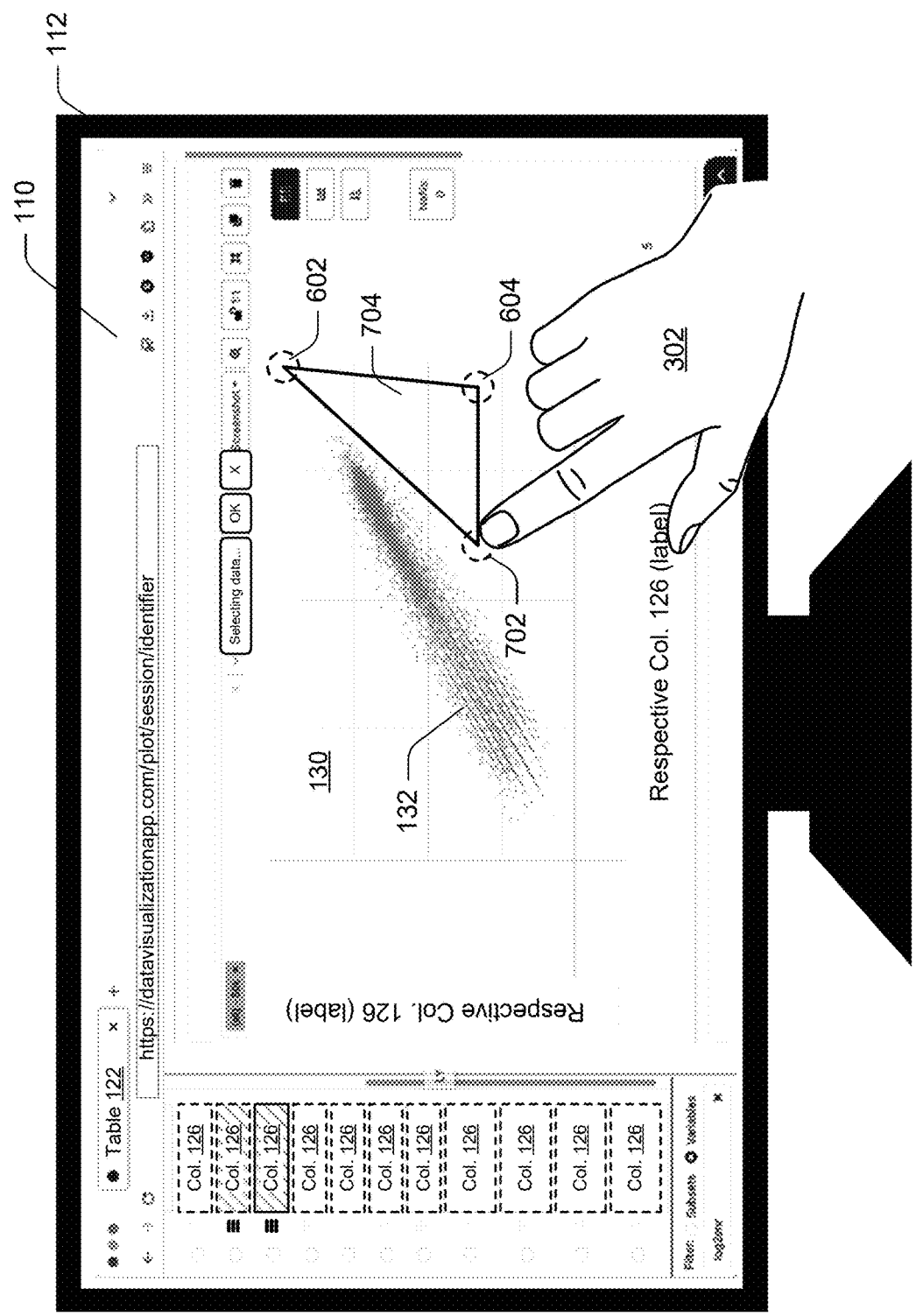
FIG. 7 depicts another example 700 of an interactive graphing user interface.

FIG. 7 depicts another example 700 of an interactive graphing user interface.

The illustrated example 700 includes the display device 102 displaying the graphing user interface 110. This example 700 represents a continuation of the scenario discussed in relation to FIG. 6. In the continuing scenario, the hand 302 of the user provides and the graphing user interface 110 receives a third input (e.g., tap) at a third location 702. Responsive to receipt of the third input, a polygon 704 is formed and displayed via the graphing user interface 110. In this example, the polygon 704 includes the line 606 between first location 602 and second location 604, a line 706 between second location 604 and third location 702, and a line 708 that is automatically formed between third location 702 and first location 602. Any data points within the polygon may be selected, e.g., responsive to receipt of an input to approve the shape of the polygon 704 and thus the selection of the points is bounded by the drawn polygon.

Figure 8:
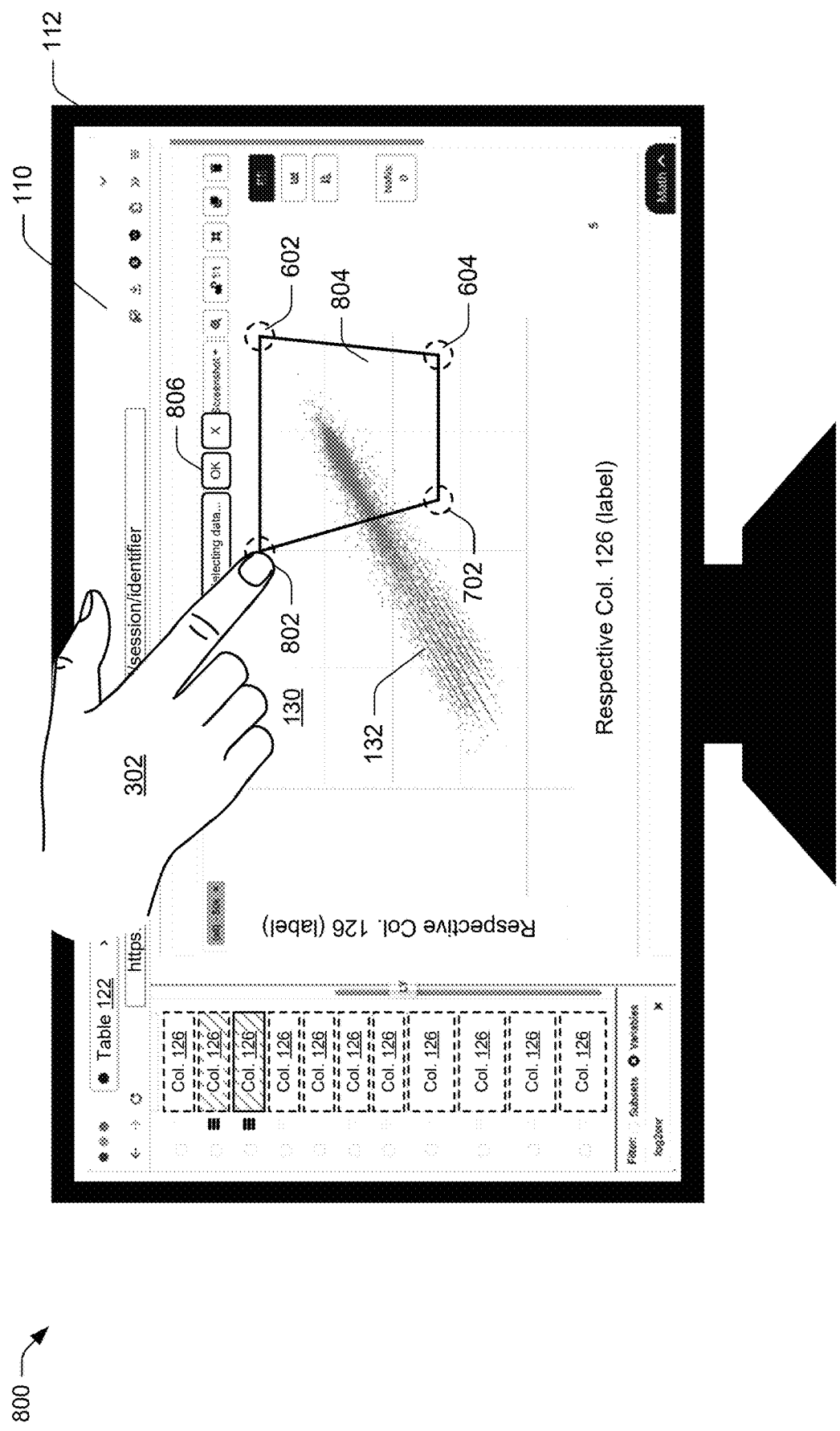
FIG. 8 depicts another example 800 of an interactive graphing user interface.

FIG. 8 depicts another example 800 of an interactive graphing user interface.

The illustrated example 800 includes the display device 102 displaying the graphing user interface 110. This example 800 represents a continuation of the scenario discussed in relation to FIG. 7. In the continuing scenario, the hand 302 of the user provides and the graphing user interface 110 receives a fourth input (e.g., tap) at a fourth location 802 of the graphing user interface 110. Responsive to receipt of the fourth input, the polygon 704 updated and an updated polygon 804 is formed and displayed via the graphing user interface 110. In this example, the updated polygon 804 includes line 606 between first location 602 and second location 604, line 706 between second location 604 and third location 702, a new line 808 between third location 702 and fourth location 802, and a new line 810 between fourth location 802 and first location 602. Any data points within the polygon may be selected, e.g., responsive to receipt of an input to approve the shape of the updated polygon 804 and thus the selection of the points bounded by the updated polygon 804. In one or more implementations, for instance, the graphing user interface 110 includes an interactive user interface element 806 that is selectable after a polygon has been drawn to approve the shape of the polygon and select the data points bounded by it. In other words the polygon 804 is usable to select the portion of the data points of the visualization 132 within the polygon 804. In one or more implementations, the graphing user interface 110 also includes an interactive user interface element to delete the polygon without selecting the data points within.

Figure 9:
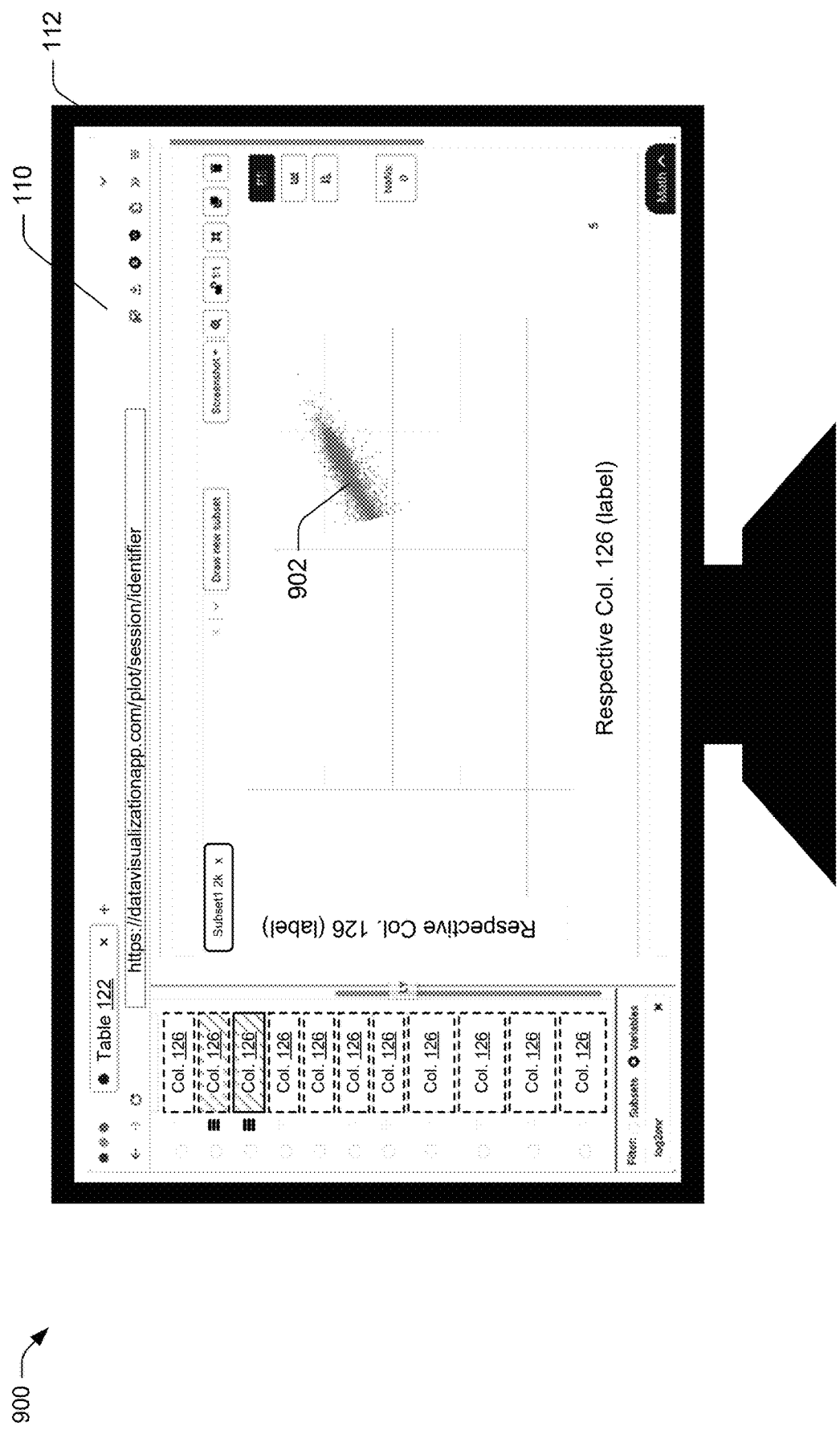
FIG. 9 depicts another example 900 of an interactive graphing user interface.

FIG. 9 depicts another example 900 of an interactive graphing user interface.

The illustrated example 900 includes the display device 102 displaying the graphing user interface 110. This example 900 represents a continuation of the scenario discussed in relation to FIG. 8. In the continuing scenario, a user input confirming the polygon 804 is received, e.g., to select portion 902 of the data points of the visualization 132 using the polygon 804. In this example 900 only the selected data points are displayed. In operation, though, a user may provide and the graphing user interface 110 may receive input to display both the data points selected using the polygon 804 as well as the other data points of the visualization 132. In one or more implementations, the selected data points can be visually differentiated from the other data points of the visualization 132, such as by displaying the selected data points with a different color than the other data points.

Figure 10:
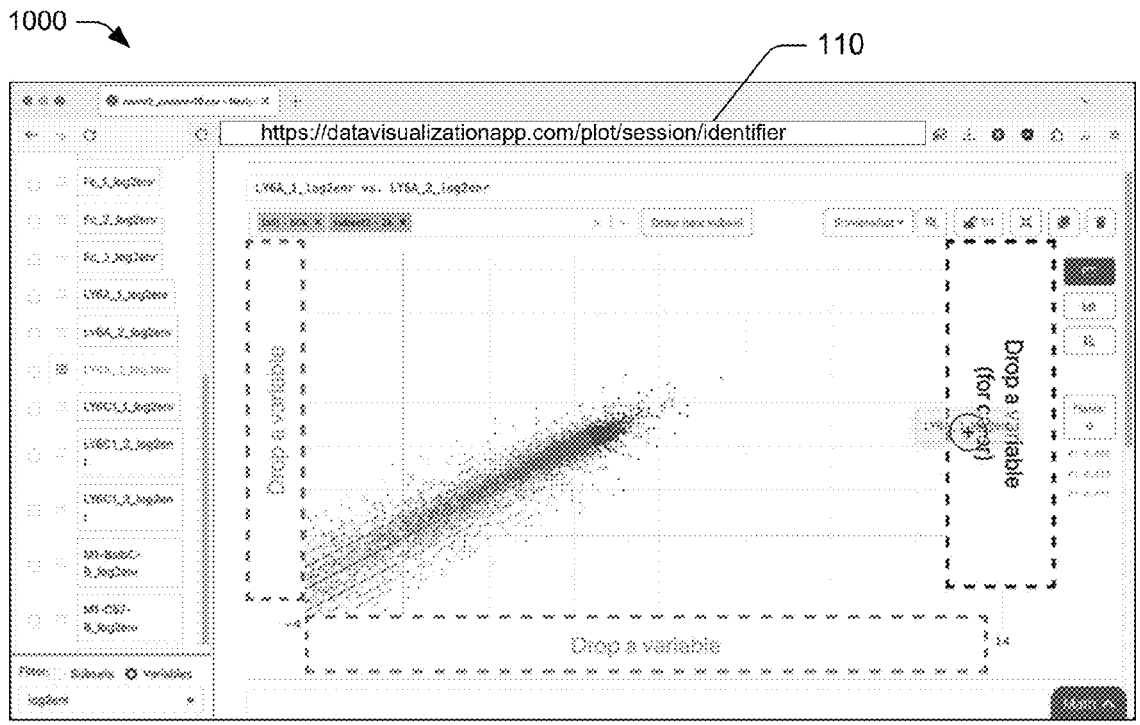
FIG. 10 depicts another example 1000 of an interactive graphing user interface.

FIG. 10 depicts another example 1000 of an interactive graphing user interface.

The illustrated example 1000 includes the graphing user interface 110, e.g., as generated by processor(s) 116 executing program code 114 and displayed by the display device 112. In this example 1000, the graphing user interface 110 includes a drag and drop area for a selected visual indication to adjust one or more colors of the visualization. In this example 1000, the graphing user interface 110 also depicts the visualization 132 having a first color (e.g., blue) and selected data points of the visualization 132 (e.g., a subset of the data points) having a second color (e.g., red) and overlaying the visualization 132's data points. The graphing user interface 110 also includes labels in a displayed dataset area (bar), which indicates which data sets are displayed in the graph 130 and also indicates visual characteristics (e.g., color) of the respective data set within the graph 130, e.g., the label has a same or similar color as the data points in the graph 130.

Figure 11:
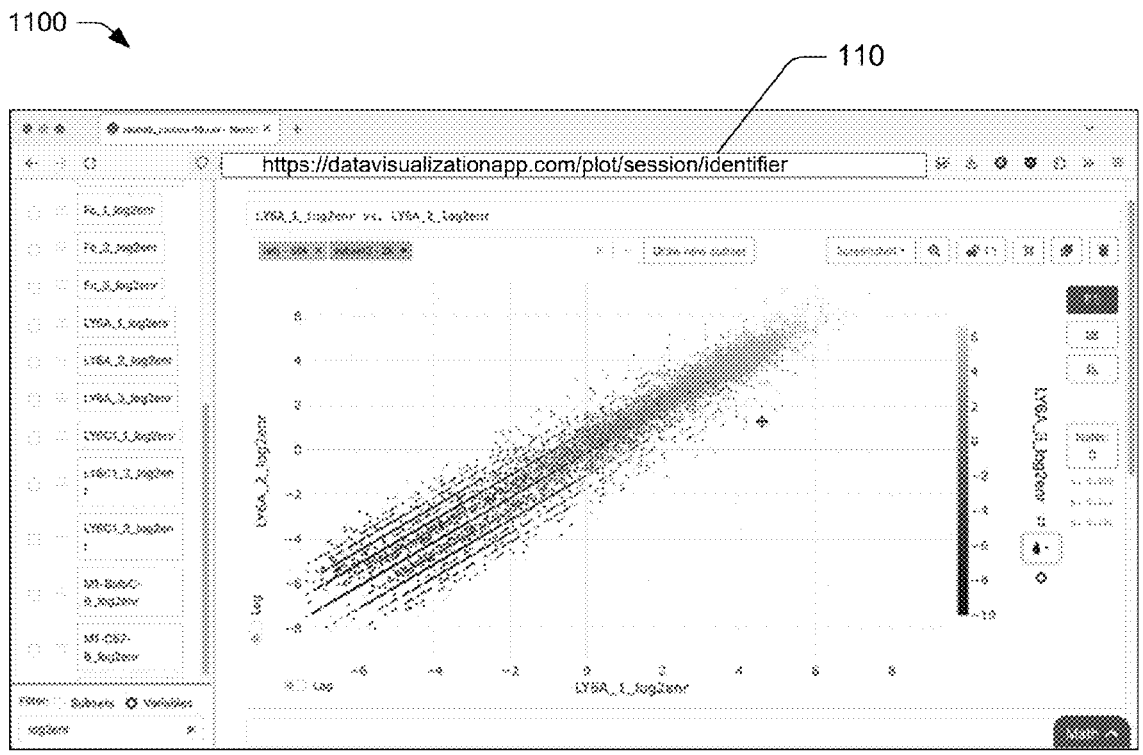
FIG. 11 depicts another example 1100 of an interactive graphing user interface.

FIG. 11 depicts another example 1100 of an interactive graphing user interface.

The illustrated example 1100 includes the graphing user interface 110, e.g., as generated by processor(s) 116 executing program code 114 and displayed by the display device 112. In this example 1100, a visual indication is moved into the drag and drop area to adjust one or more colors of the visualization. In other words, a third visual indication has been dragged into a designated area or zone of the graphing user interface 110 to affect the visualization 132. Thus, in this example 1100 a first visual indication has been dragged and dropped in an area associated with a first axis of the graph 130, a second visual indication has been dragged and dropped in an area associated with a second axis of the graph 130, and a third visual indication has been dragged and dropped into the area to adjust one or more colors of the visual indication. In this example 1100, the set of data values assigned to the color effect of the visualization are mapped to a color gradient, such that different values within the set are mapped to different colors of the gradient. Gradients having a variety of colors may be used for coloring data points of the graph 130 in accordance with the described techniques. In one or more implementations, the colors of a gradient are adjustable and/or specified based on user input, e.g., a number of colors, which colors, how adjacent colors blend, and so forth.

Figure 12:
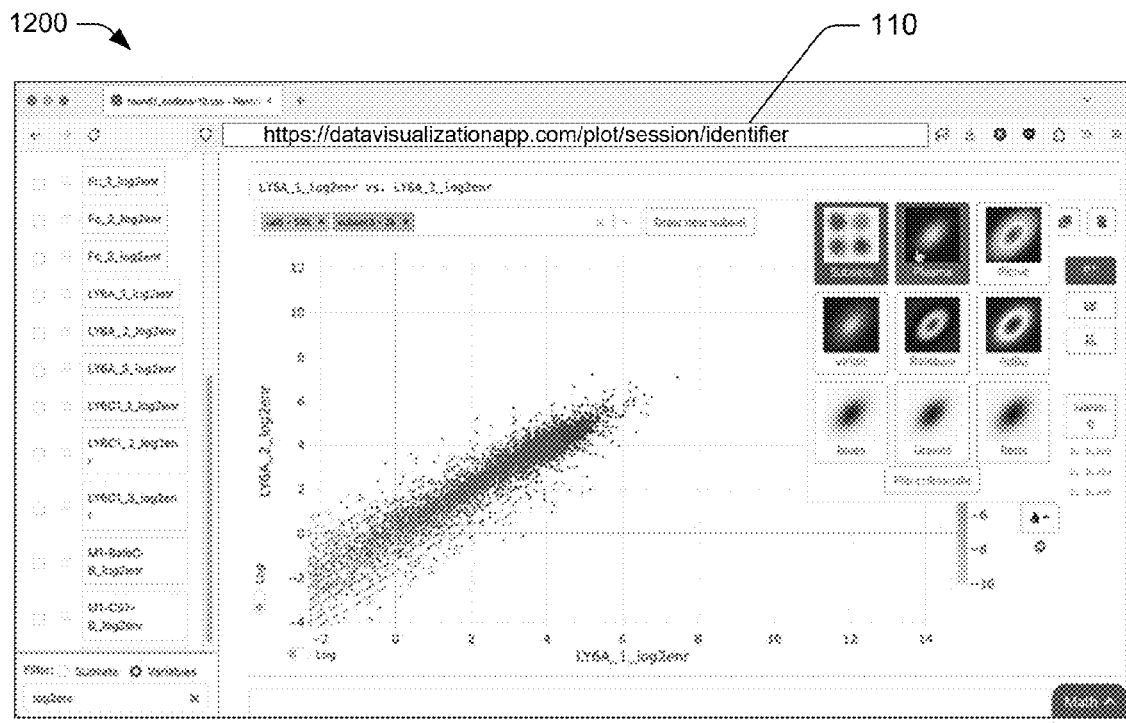
FIG. 12 depicts another example 1200 of an interactive graphing user interface.

FIG. 12 depicts another example 1200 of an interactive graphing user interface.

The illustrated example 1200 includes the graphing user interface 110, e.g., as generated by processor(s) 116 executing program code 114 and displayed by the display device 112. In this example 1200, an interactive user interface element is displayed by the graphing user interface 110 which includes selectable indications of different color patterns which responsive to selection of the indications are applied to data points of a visualization, e.g., based on data values of a respective set assigned to the color aspect of the graph 130. The different color patterns include a plurality of gradients and also a subset pattern to apply different colors or patterns to different identified subsets.

Figure 13:
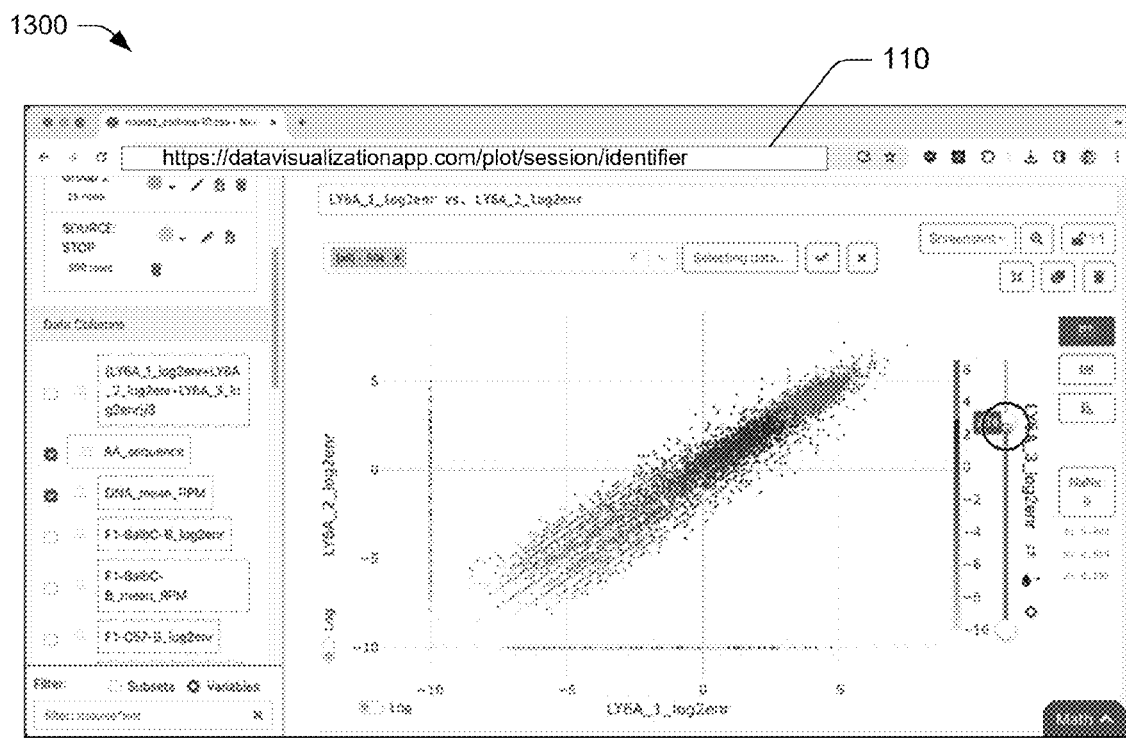
FIG. 13 depicts another example 1300 of an interactive graphing user interface.

FIG. 13 depicts another example 1300 of an interactive graphing user interface.

The illustrated example 1300 includes the graphing user interface 110, e.g., as generated by processor(s) 116 executing program code 114 and displayed by the display device 112. In this example 1300, the graphing user interface 110 includes an interactive user interface instrumentality (e.g., a slider) that is manipulatable responsive to user input to select a portion of the color gradient to display (or deselect some of the colors). In this way, data points having colors that are selected for display are displayed on the graph 130 and data points having colors that are not selected for display (or are deselected, e.g., selected not to display) are at least temporarily removed from the display of the graph 130.

Figure 14:
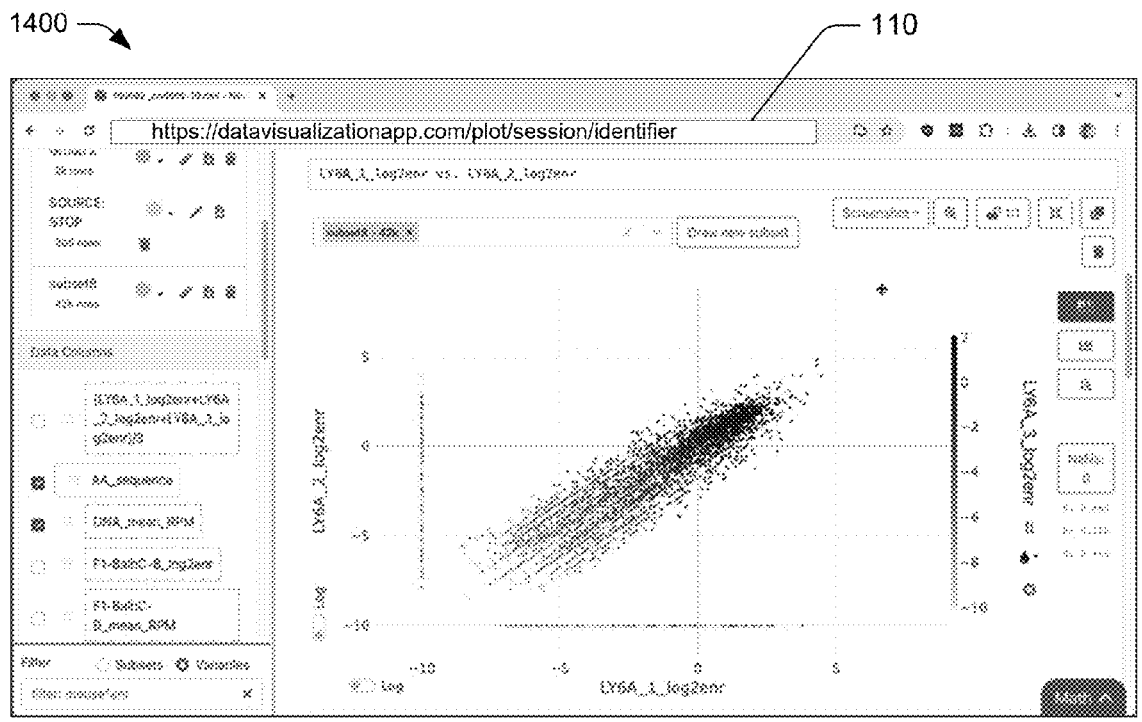
FIG. 14 depicts another example 1400 of an interactive graphing user interface.

FIG. 14 depicts another example 1400 of an interactive graphing user interface.

The illustrated example 1400 includes the graphing user interface 110, e.g., as generated by processor(s) 116 executing program code 114 and displayed by the display device 112. The illustrated example 1400 represents a continuation of the scenario depicted in FIG. 13. In particular, a subset of the gradient is selected for display in FIG. 13, e.g., via the interactive user interface element (e.g., slider). In this example 1400, the data points having a color within the selected subset are displayed and the data points having a color that is not within the subset are not displayed, e.g., they are removed from the display.

Figure 15:
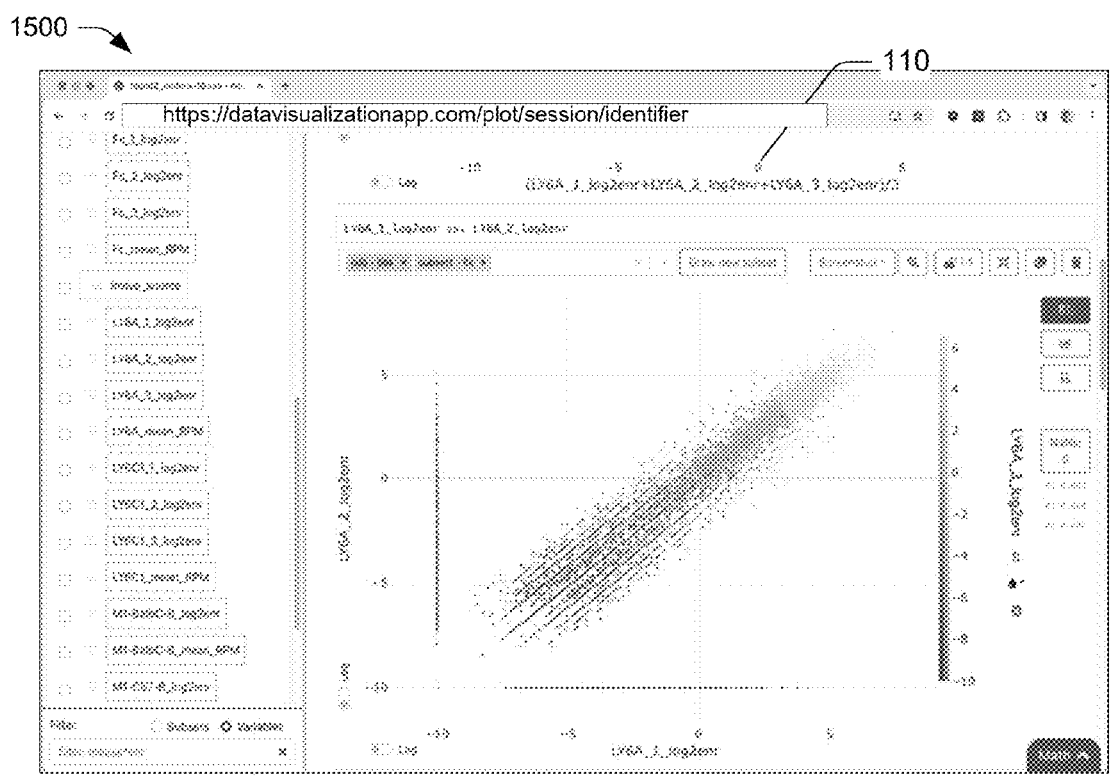
FIG. 15 depicts another example 1500 of an interactive graphing user interface.

FIG. 15 depicts another example 1500 of an interactive graphing user interface.

The illustrated example 1500 includes the graphing user interface 110, e.g., as generated by processor(s) 116 executing program code 114 and displayed by the display device 112. In this example 1500, the graphing user interface 110 includes indications of color intensities. In one or more implementations, the program code 114 causes the processor(s) 116 to use color intensity to visualize a third variable and membership of a subset. For instance, the intensity of color applied to a data point varies based a third data value corresponding to the data point and based on a range of the set of data values that includes the third data value. The particular color (for which the intensity varies) is based on a subset to which the displayed data point belongs, e.g., a selected subset.

Figure 16:
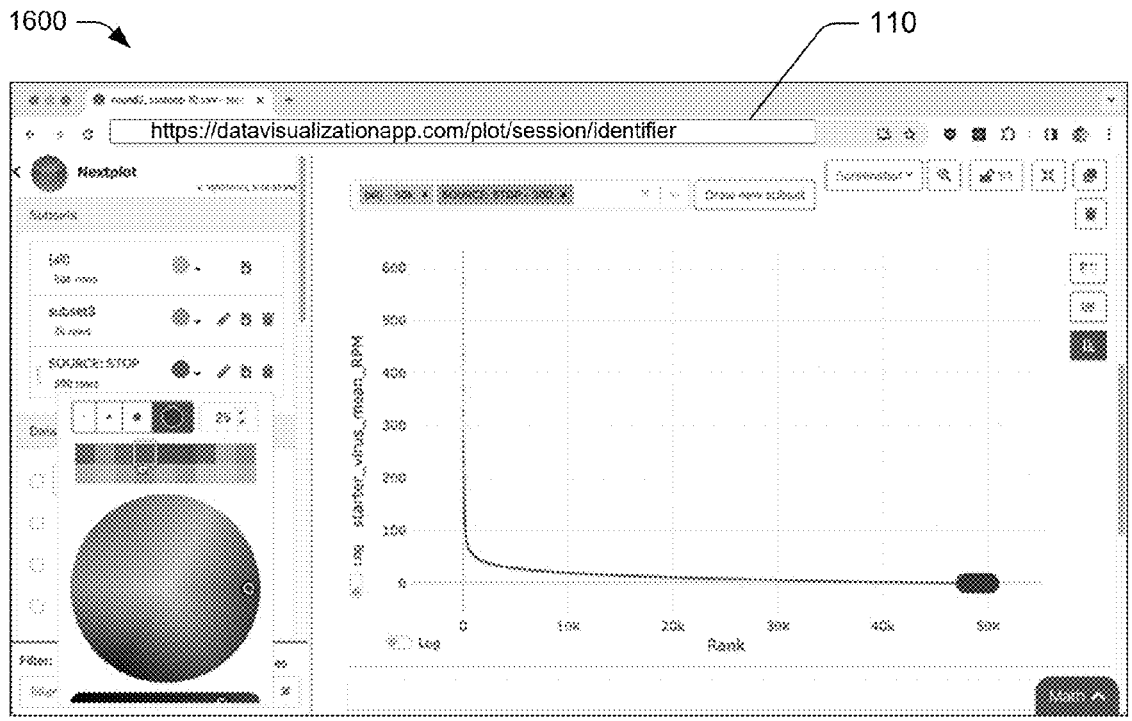
FIG. 16 depicts another example 1600 of an interactive graphing user interface.

FIG. 16 depicts another example 1600 of an interactive graphing user interface.

The illustrated example 1600 includes the graphing user interface 110, e.g., as generated by processor(s) 116 executing program code 114 and displayed by the display device 112. In this example 1600, the graphing user interface 110 displays a variety of visual characteristics that are adjustable based on user input for displaying data points. Examples of such visual options include, but are not limited to, a size of data points on the graph, color of data points, shadow, opacity, and color intensity, to name just a few. In one or more implementations, these visual characteristics are adjustable, responsive to user input, for each set of data points, e.g., each different set of data points displayed or displayable on the graph 130.

Figure 17:
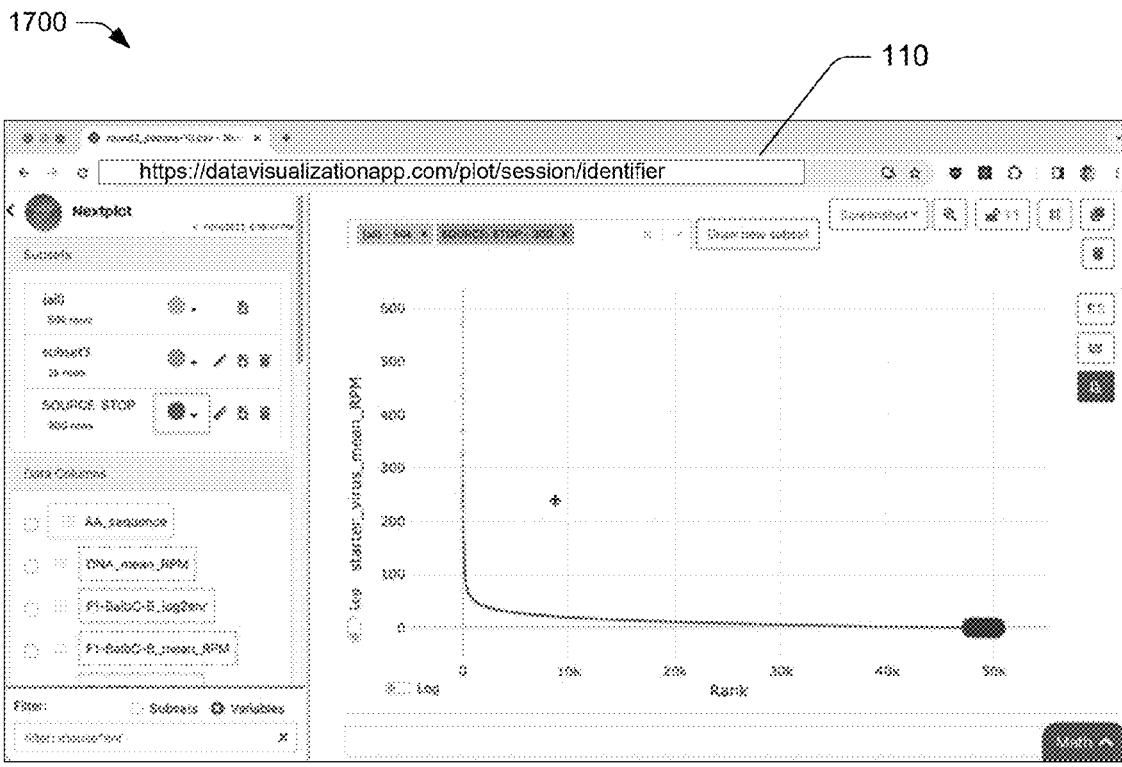
FIG. 17 depicts another example 1700 of an interactive graphing user interface.

FIG. 17 depicts another example 1700 of an interactive graphing user interface.

The illustrated example 1700 includes the graphing user interface 110, e.g., as generated by processor(s) 116 executing program code 114 and displayed by the display device 112. This example 1700 represents a continuing scenario from FIG. 16. In this scenario, a size and color for a set of data point is selected based on user input in FIG. 16. In the example 1700, the data points of the set are displayed with the size and color (e.g., red and larger) specified by user input via the interactive user interface element depicted in FIG. 16.

Figure 18:
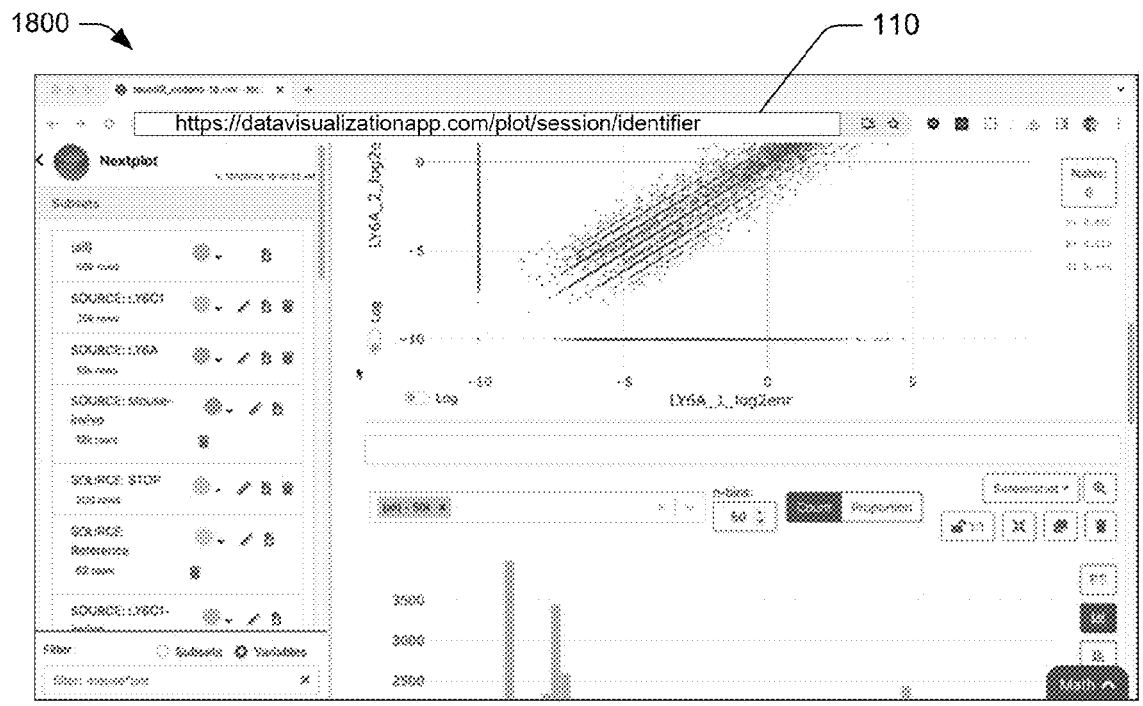
FIG. 18 depicts another example 1800 of an interactive graphing user interface.

FIG. 18 depicts another example 1800 of an interactive graphing user interface.

The illustrated example 1800 includes the graphing user interface 110, e.g., as generated by processor(s) 116 executing program code 114 and displayed by the display device 112. In this example 1800, the graphing user interface 110 includes multiple graphs (or plots). In particular, the graphing user interface 110 includes a first graph (e.g., a scatter plot) and also includes a second graph (e.g., a histogram). In one or more implementations, user input may be received to add multiple graphs to a "session." It is to be appreciated, for instance, that more than two graphs can be added to and included in the graphing user interface 110, e.g., three or more graphs may be included in various scenarios. By providing multiple graphs in a same user interface, the graphing user interface 110 may reduce a number of inputs received to navigate between different data visualizations. In one or more implementations, the graphing user interface 110 is scrollable to display the different graphs. Alternatively or additionally, the graphing user interface 110 includes tabs that are selectable to navigate to displays of the different graphs. In one or more implementations, user input is received to add a new graph to the bottom of one or more already displayed graphs. Alternatively or additionally, user input is received to adjust an order of the graphs.

Figure 19:
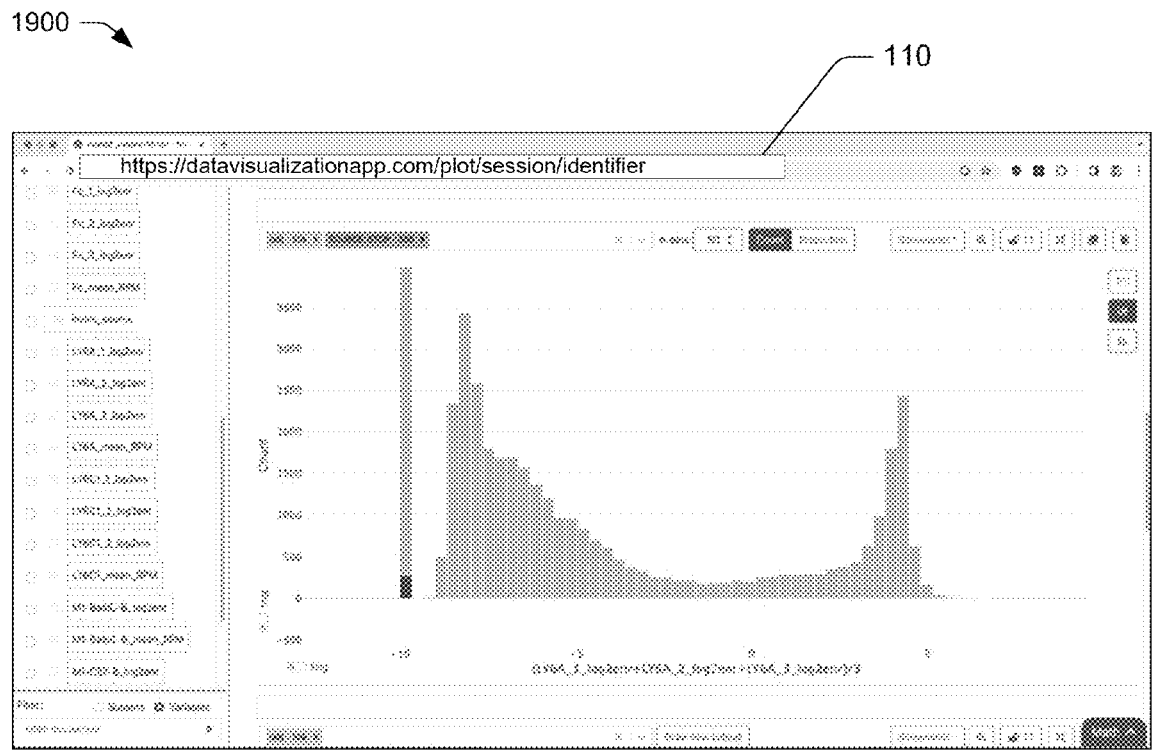
FIG. 19 depicts another example 1900 of an interactive graphing user interface.

FIG. 19 depicts another example 1900 of an interactive graphing user interface.

The illustrated example 1900 includes the graphing user interface 110, e.g., as generated by processor(s) 116 executing program code 114 and displayed by the display device 112. In this example 1900, the graphing user interface 110 displays a histogram. The graphing user interface 110 also includes interactive elements to adjust, for the displayed histogram, bin-number, count, and proportions, to name just a few.

Figure 20:
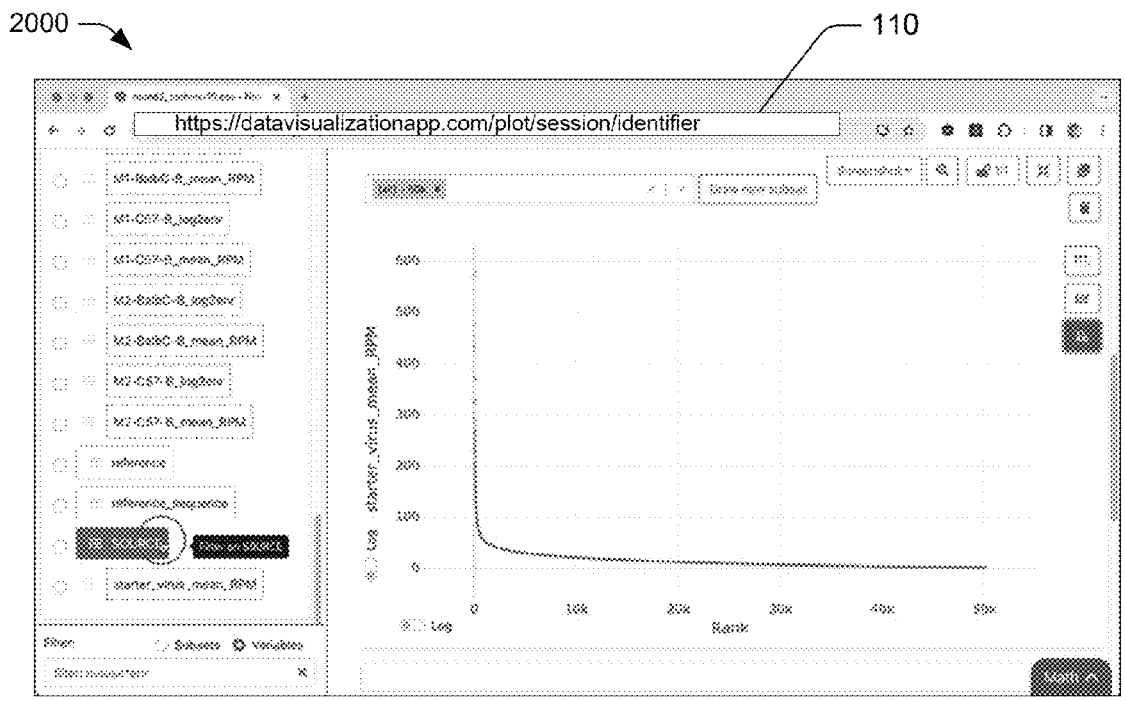
FIG. 20 depicts another example 2000 of an interactive graphing user interface.

FIG. 20 depicts another example 2000 of an interactive graphing user interface.

The illustrated example 2000 includes the graphing user interface 110, e.g., as generated by processor(s) 116 executing program code 114 and displayed by the display device 112. In this example 2000, user input is received in relation to a visual indication displayed in the data set selection region, e.g., a hover or tap input. Based on the user input received in relation to the visual indication, the graphing user interface 110 is operable to filter the displayed data points based on the set of data values corresponding to the selected visual indication.

Figure 21:
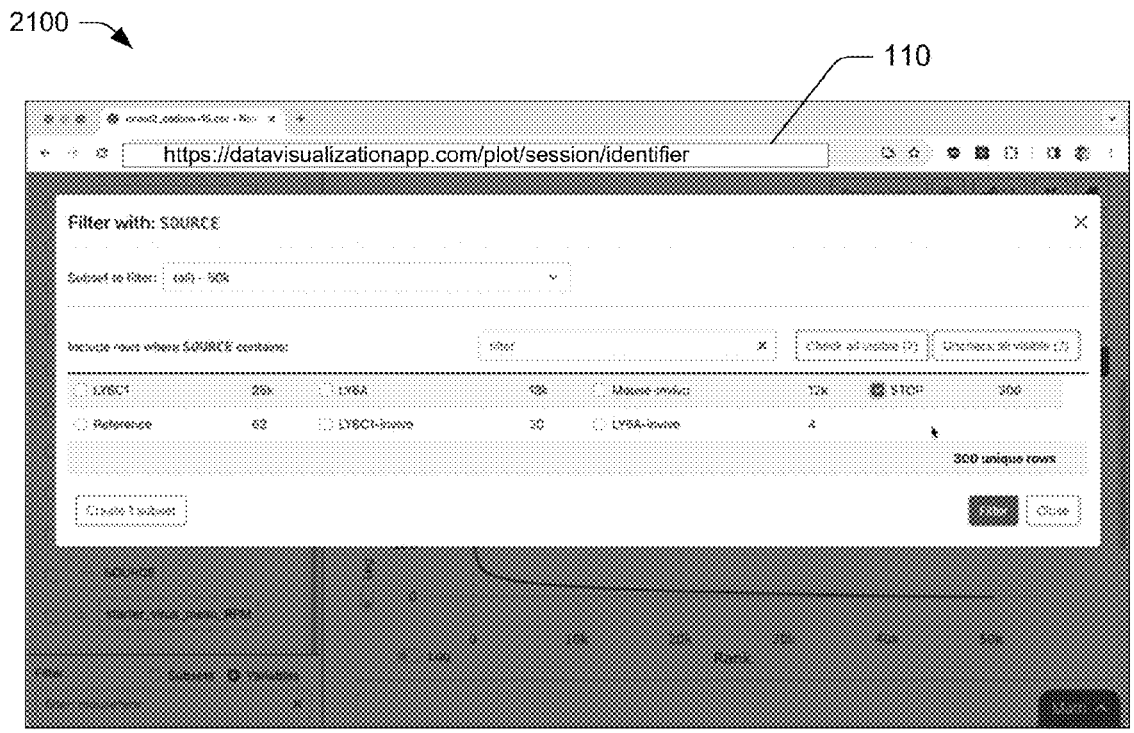
FIG. 21 depicts another example 2100 of an interactive graphing user interface.

FIG. 21 depicts another example 2100 of an interactive graphing user interface.

The illustrated example 2100 includes the graphing user interface 110, e.g., as generated by processor(s) 116 executing program code 114 and displayed by the display device 112. The example 2100 represents a continuation of the scenario depicted in FIG. 20. In this scenario, user input is received in FIG. 20 in relation to a particular visual indication to filter data points based on the set of data values associated with the particular visual indication. In this example 2100, the different data values of the set corresponding to the selected visual indication are displayed and are selectable. Notably the data values within the set corresponding to the selected visual indication are a plurality of different text strings. In accordance with the described techniques, one or more of those text strings (e.g., data values of the set) are selectable to filter the displayed data points based on the selected text strings. For instance, the data points that correspond to the selected text strings are displayed and the data points that correspond to unselected text strings are not displayed (or are displayed differently).

Figure 22:
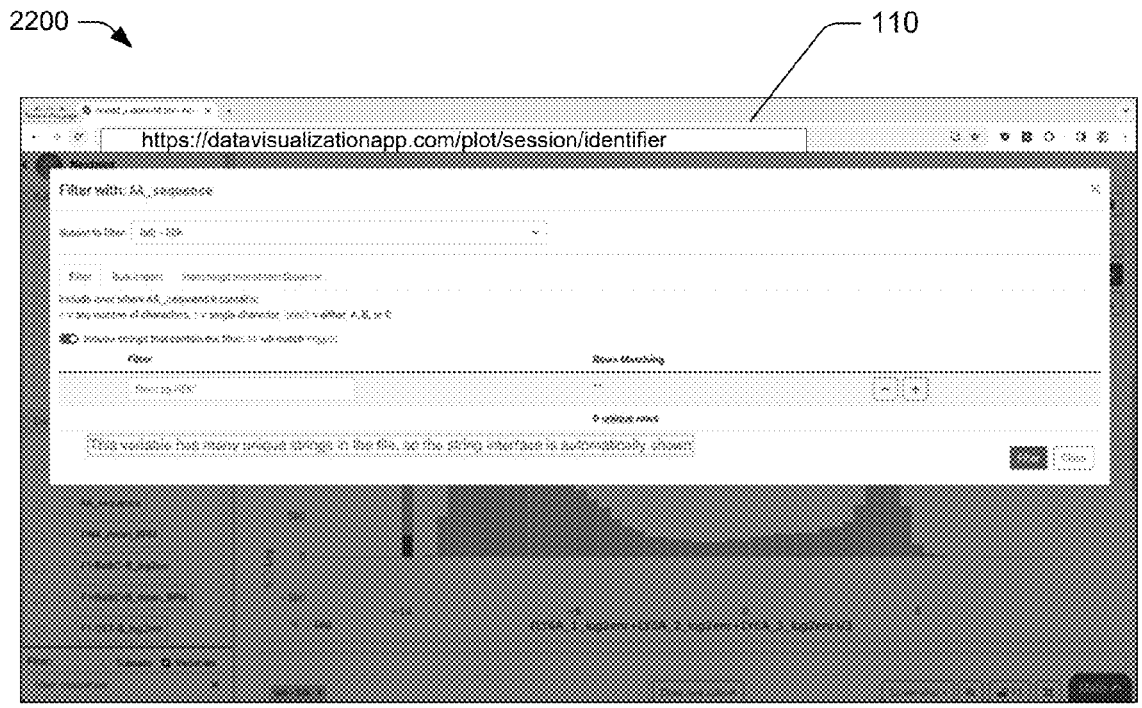
FIG. 22 depicts another example 2200 of an interactive graphing user interface.

FIG. 22 depicts another example 2200 of an interactive graphing user interface.

The illustrated example 2200 includes the graphing user interface 110, e.g., as generated by processor(s) 116 executing program code 114 and displayed by the display device 112. In this example 2200, the graphing user interface 110 includes an interactive string user interface element, which in at least one variation contrasts with an interactive category user interface element. In one or more implementations, the processor(s) 116 executing the program code 114 automatically detect whether a set of data values (e.g., corresponding to a selected visual indication) are categorical or string values (or numerical values). The processor(s) 116 cause the interactive string user interface element or the interactive category user interface element to be displayed based on such a determination. Thus, in this example 2200, a determination is made that the selected visual indication corresponds to a set of values that are strings (rather than categorical variables).

Figure 23:
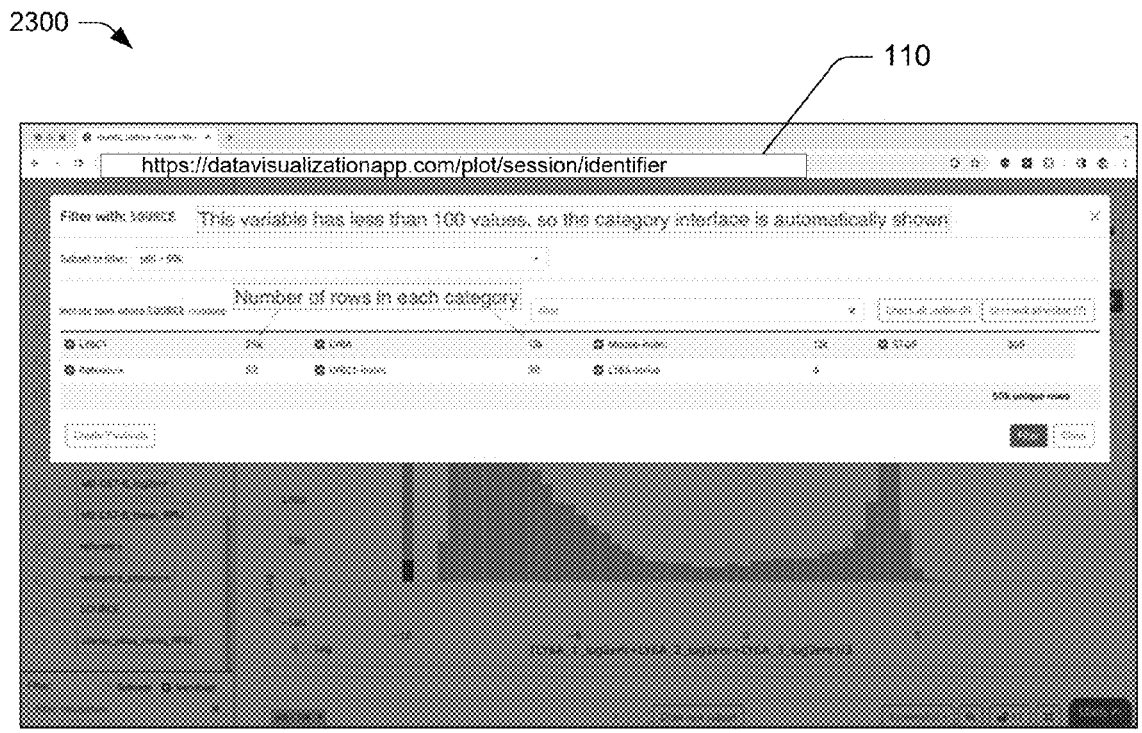
FIG. 23 depicts another example 2300 of an interactive graphing user interface.

FIG. 23 depicts another example 2300 of an interactive graphing user interface.

The illustrated example 2300 includes the graphing user interface 110, e.g., as generated by processor(s) 116 executing program code 114 and displayed by the display device 112. In this example 2300, the graphing user interface 110 includes an interactive category user interface element, which in at least one variation contrasts with an interactive string user interface element. Thus, in this example 2300, a determination is made that the selected visual indication corresponds to a set of values that are categorical variables (rather than string variables).

Figure 24:
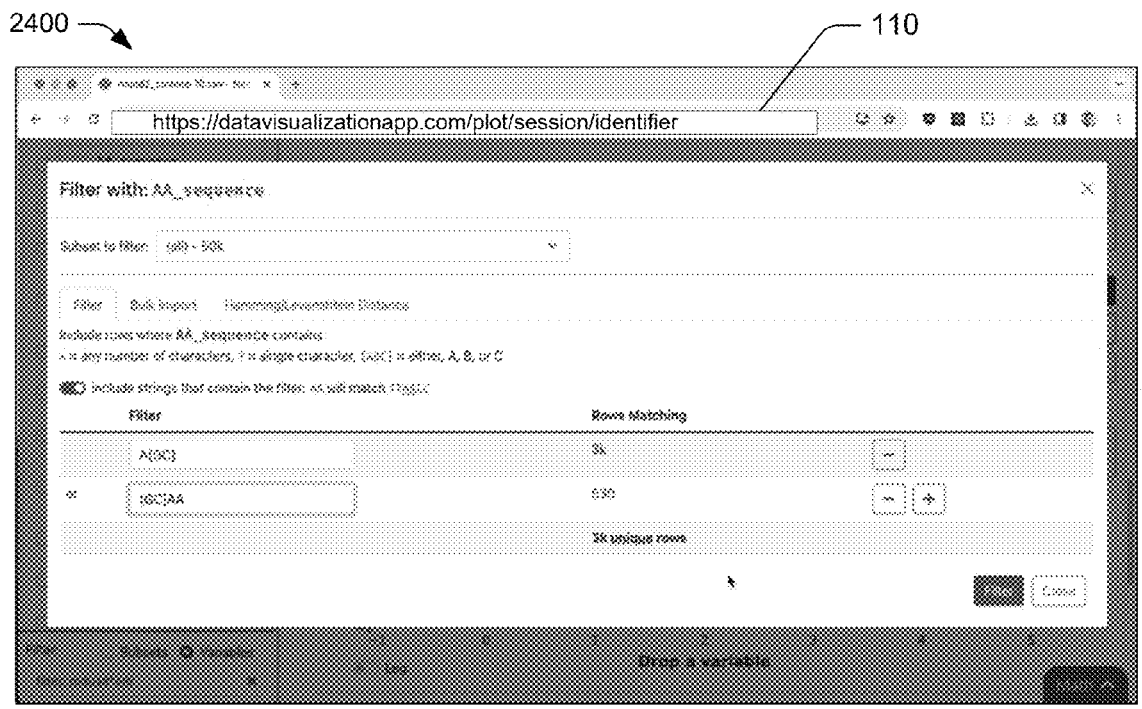
FIG. 24 depicts another example 2400 of an interactive graphing user interface.

FIG. 24 depicts another example 2400 of an interactive graphing user interface.

The illustrated example 2400 includes the graphing user interface 110, e.g., as generated by processor(s) 116 executing program code 114 and displayed by the display device 112. In this example 2400, the graphing user interface 110 displays the interactive string user interface element. The interactive string user interface element includes one or more user interface elements which are operable to specify strings of the respective set of data values to use for filtering. In this example, the interactive elements receive user input, e.g., typing, for specifying the strings used to filter. In this example 2400, the interactive user interface elements are further configured to receive the characters '*', '?', and '[ ]'. In one or more implementations, use of the '*' character in an expression indicates to match any sequence of characters (one or more characters), use of the '?' character in an expression indicates to match a single character, and use of the '[ ]' in an expression indicates to match any one of the set included within the square brackets, e.g., [ABC] indicates to match either A, B, or C in the strings.

Figure 25:
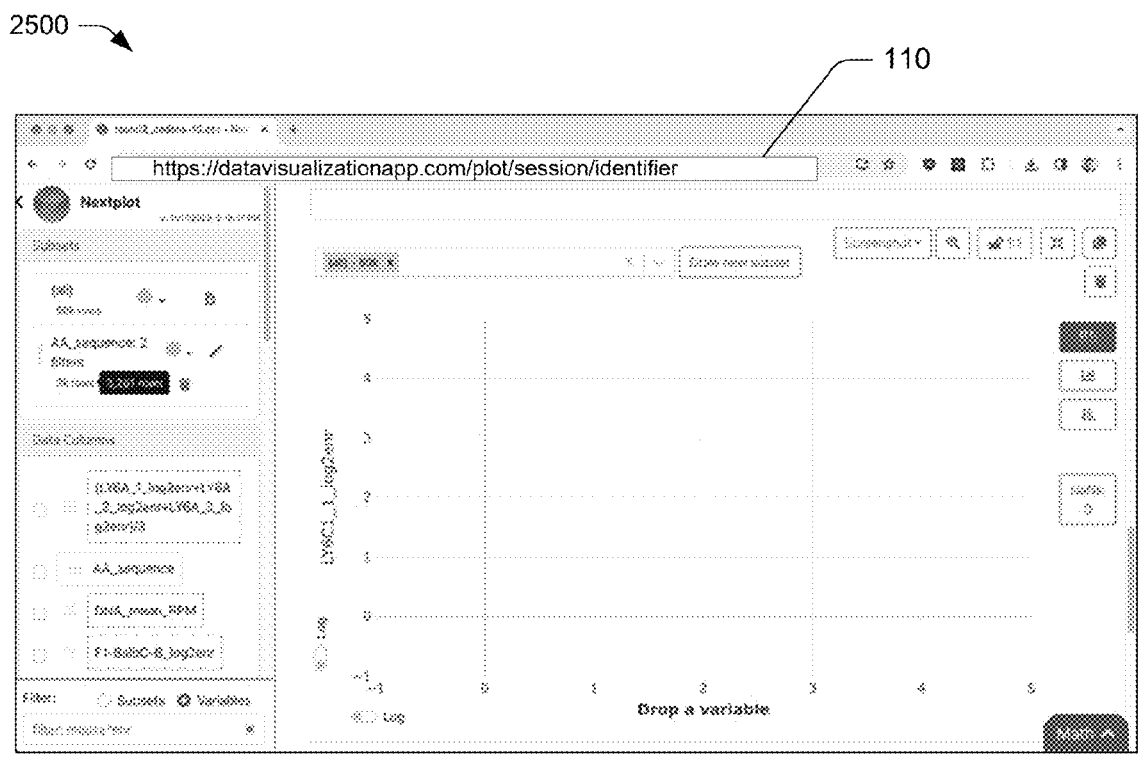
FIG. 25 depicts another example 2500 of an interactive graphing user interface.

FIG. 25 depicts another example 2500 of an interactive graphing user interface.

The illustrated example 2500 includes the graphing user interface 110, e.g., as generated by processor(s) 116 executing program code 114 and displayed by the display device 112. In this example 2500, the user interface displays an indication of a number of rows (or entries) in a set of data values represented by a visual indication. In one or more implementations, user input is received in relation to the visual indication (e.g., a hover input), and responsive to detection of the user input a set size indication, e.g., indicating the number of rows or entries in the set, is displayed.

Figure 26:
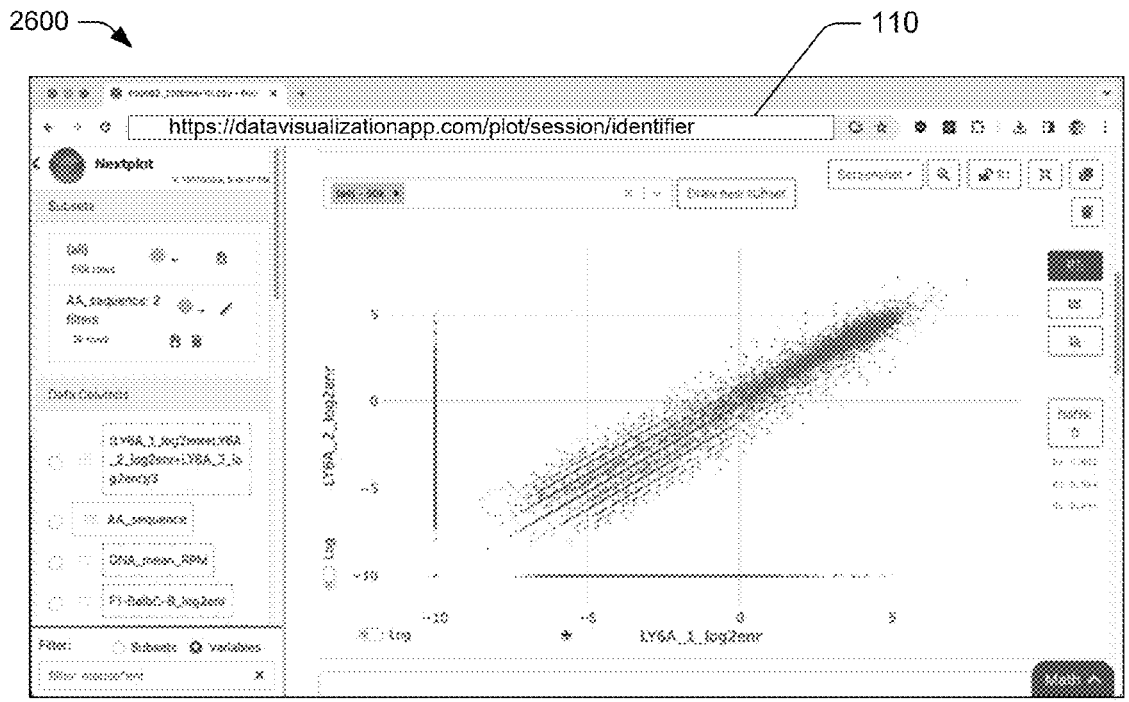
FIGS. 26 depicts another example 2600 of an interactive graphing user interface.

FIGS. 26 depicts another example 2600 of an interactive graphing user interface.

The illustrated example 2600 includes the graphing user interface 110, e.g., as generated by processor(s) 116 executing program code 114 and displayed by the display device 112. In this example 2600, the graphing user interface 110 displays interactive log user interface elements in relation to each axis of the graph. The interactive log user interface elements are operable to toggle on or off the respective set of data values. In the illustrated example, the interactive log user interface elements are toggled off for both the x-axis and the y-axis of the graph.

Figure 27:
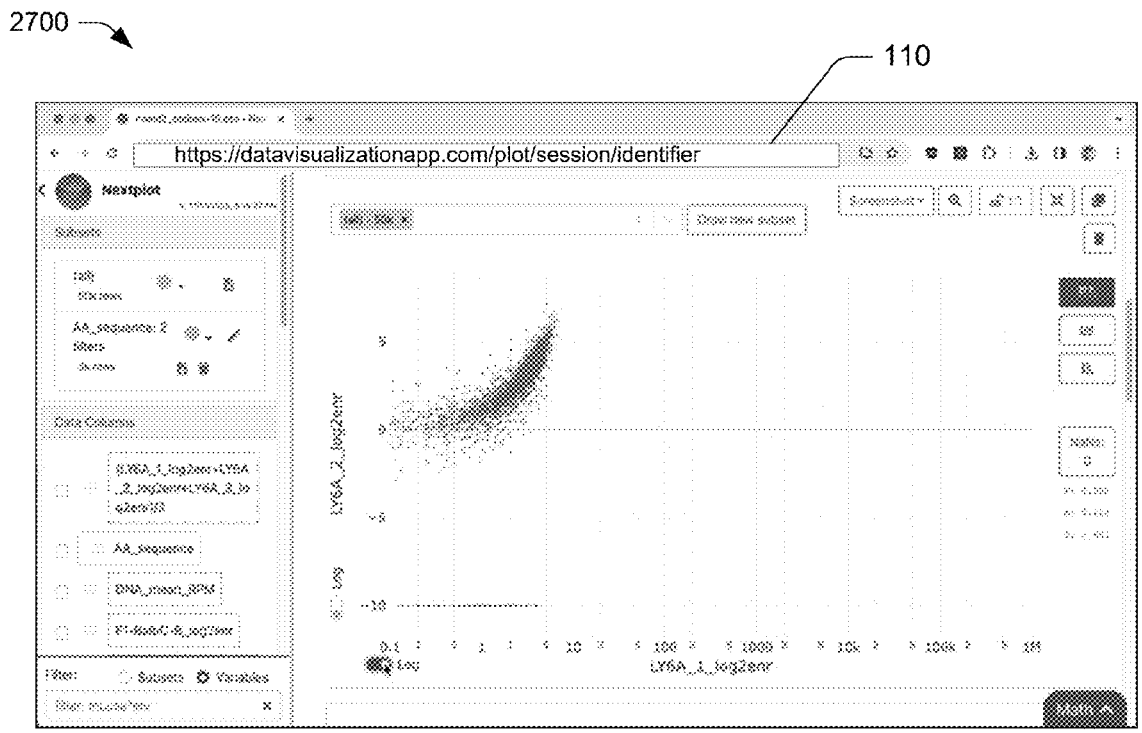
FIG. 27 depicts another example 2700 of an interactive graphing user interface.

FIG. 27 depicts another example 2700 of an interactive graphing user interface.

The illustrated example 2700 includes the graphing user interface 110, e.g., as generated by processor(s) 116 executing program code 114 and displayed by the display device 112. In particular, the illustrated example 2700 is a continuation of the scenario depicted in FIG. 26. In this example 2700, the interactive log user interface element for the x-axis of the graph is toggled on and the interactive log user interface element for the y-axis of the graph is toggled off.

Figure 28:
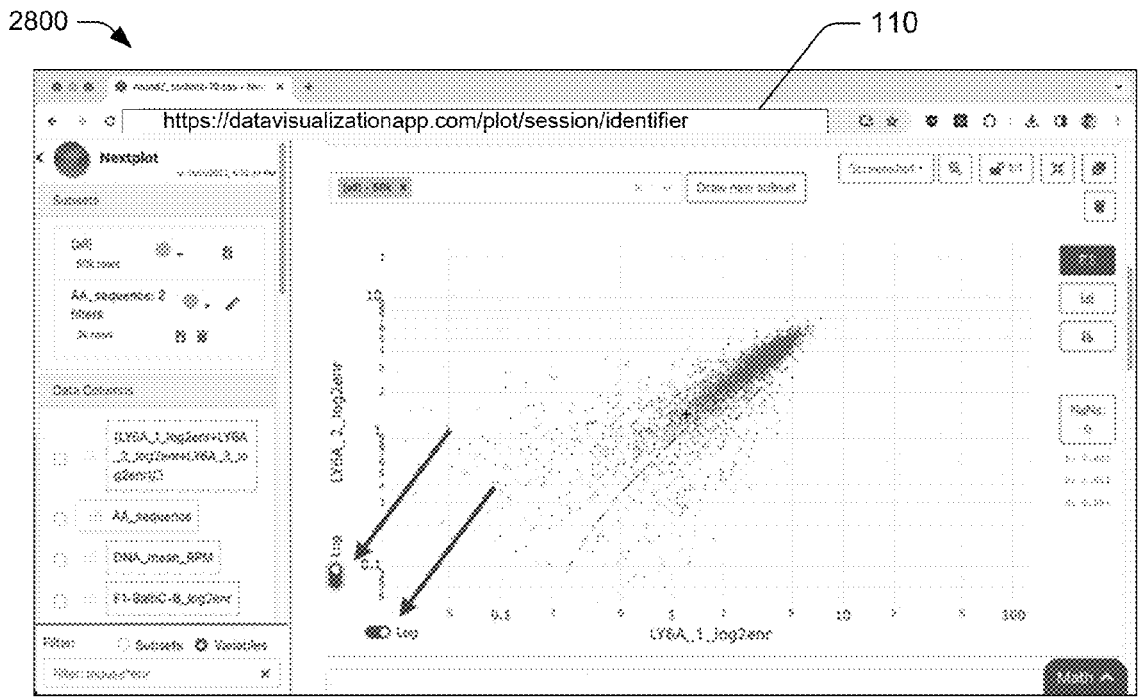
FIG. 28 depicts another example 2800 of an interactive graphing user interface.

FIG. 28 depicts another example 2800 of an interactive graphing user interface.

The illustrated example 2800 includes the graphing user interface 110, e.g., as generated by processor(s) 116 executing program code 114 and displayed by the display device 112. In particular, the illustrated example 2800 is a continuation of the scenario depicted in FIGS. 26 and 27. In this example 2800, the interactive log user interface elements for both the x-axis and the y-axis of the graph are toggled on.

Figure 29:
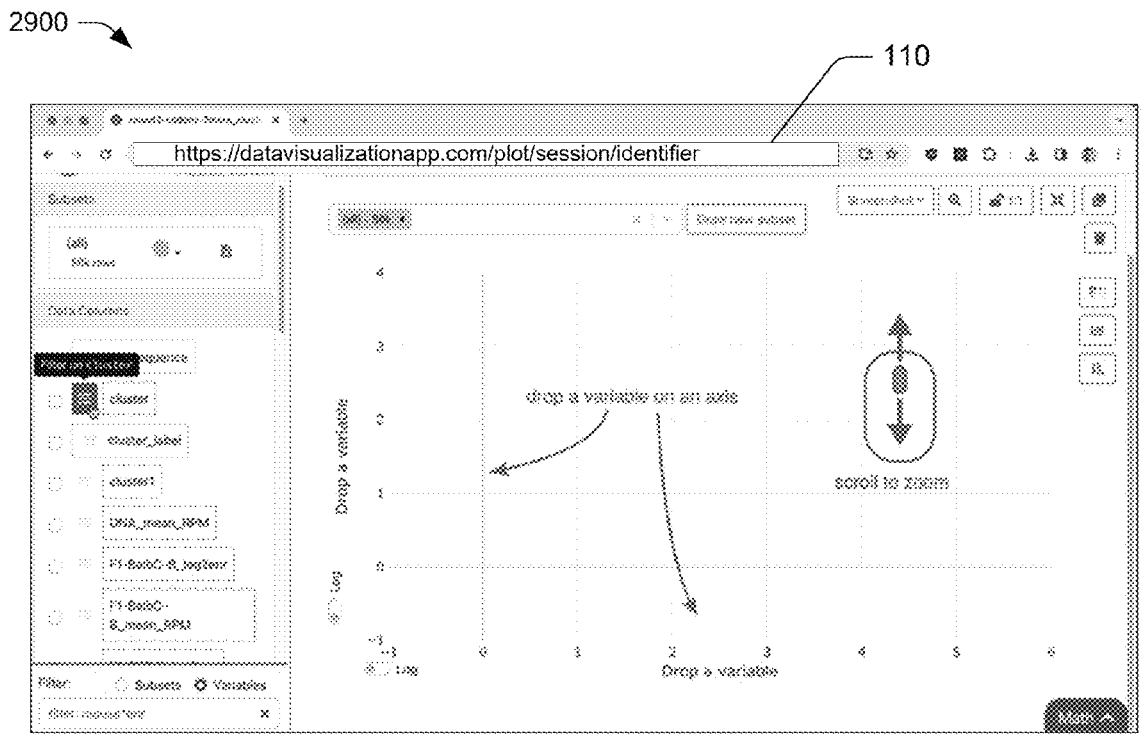
FIG. 29 depicts another example 2900 of an interactive graphing user interface.

FIG. 29 depicts another example 2900 of an interactive graphing user interface.

The illustrated example 2900 includes the graphing user interface 110, e.g., as generated by processor(s) 116 executing program code 114 and displayed by the display device 112. In this example 2900, user input is received in relation to a visual indication to enable text filtering on numeric values such as on a cluster label.

Figures 30, 31:
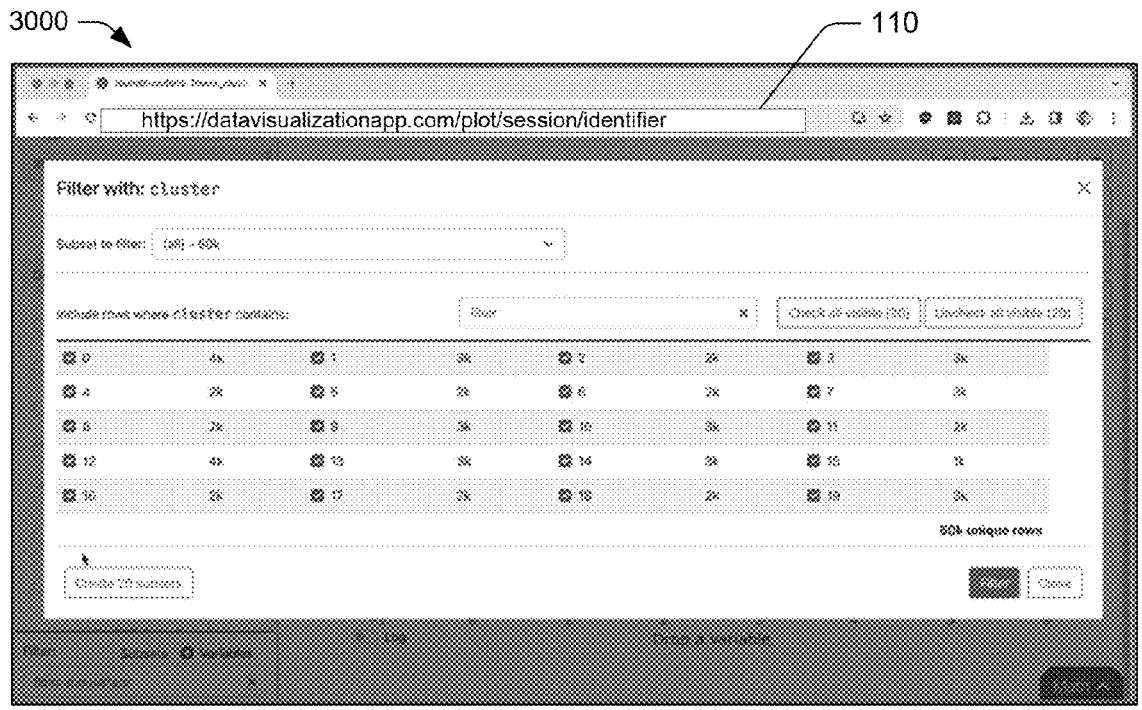
FIG. 30 depicts another example 3000 of an interactive graphing user interface.
FIG. 31 depicts another example 3100 of an interactive graphing user interface.

FIG. 30 depicts another example 3000 of an interactive graphing user interface.

The illustrated example 3000 includes the graphing user interface 110, e.g., as generated by processor(s) 116 executing program code 114 and displayed by the display device 112. In particular, the illustrated example 3000 represents a continuation of the scenario depicted in FIG. 29. In particular, user input is received in relation to a visual indication, and one or more interactive user interface elements are displayed to filter on cluster labels. In this example 3000, the cluster labels are selectable such that the data points corresponding to selected cluster labels are displayed and the data points that correspond to unselected cluster labels are not displayed (or are displayed differently).

FIG. 31 depicts another example 3100 of an interactive graphing user interface.

Figure 32:
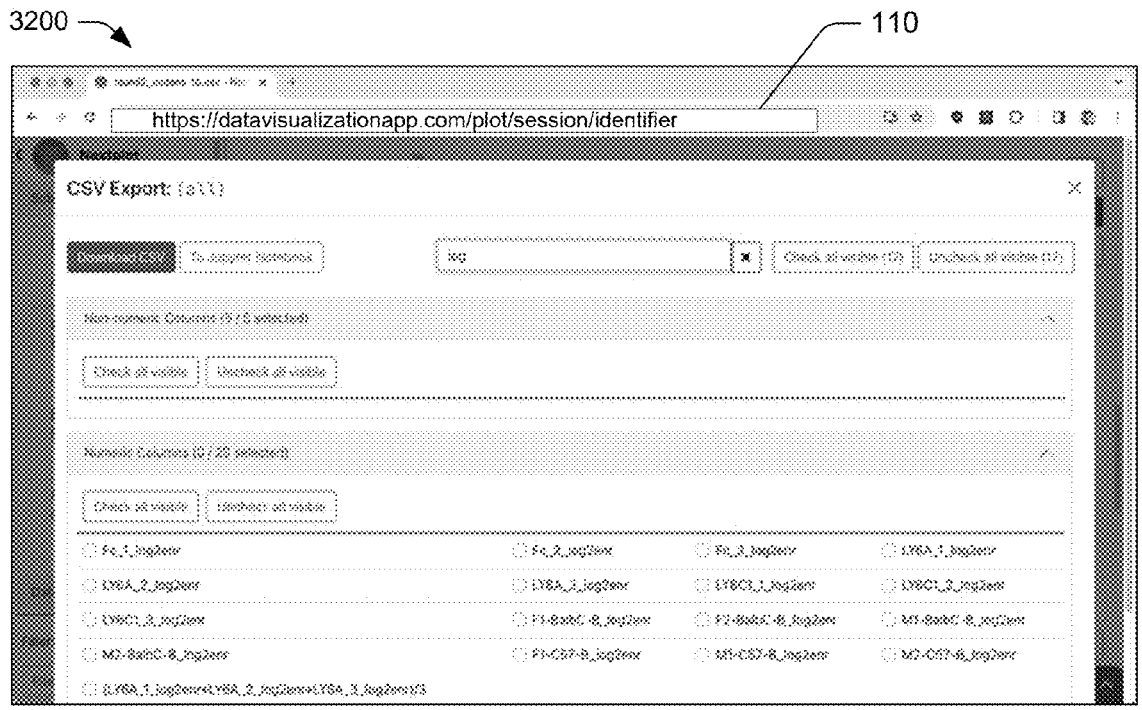
FIG. 32 depicts another example 3200 of an interactive graphing user interface.

The illustrated example 3100 includes the graphing user interface 110, e.g., as generated by processor(s) 116 executing program code 114 and displayed by the display device 112. In this example 3100, the graphing user interface 110 includes an interactive user interface element that is selectable to create a different subset (e.g., set of data values) for each of the selected data values. In other words, FIG. 32 depicts another example 3200 of an interactive graphing user interface.

The illustrated example 3200 includes the graphing user interface 110, e.g., as generated by processor(s) 116 executing program code 114 and displayed by the display device 112. In this example 3200, the graphing user interface 110 displays interactive user interface elements for quickly filtering may columns using text filtering and check and/or uncheck of filtered values. In this example 3200, a search string (e.g., 'log') is entered into a text filtering interactive user interface element.

Figure 33:
FIG. 33 depicts another example 3300 of an interactive graphing user interface.

FIG. 33 depicts another example 3300 of an interactive graphing user interface.

The illustrated example 3300 includes the graphing user interface 110, e.g., as generated by processor(s) 116 executing program code 114 and displayed by the display device 112. The example 3300 represents a continuation of the scenario depicted in FIG. 32. In this example 3300, user input is received in relation to an interactive element (e.g., check all visible button) to select the data values of the set that are listed and thus visible on the graphing user interface 110. Notably, the visible data values all match the search string (e.g., 'log') entered into the text filtering interactive user interface element.

Figure 34:
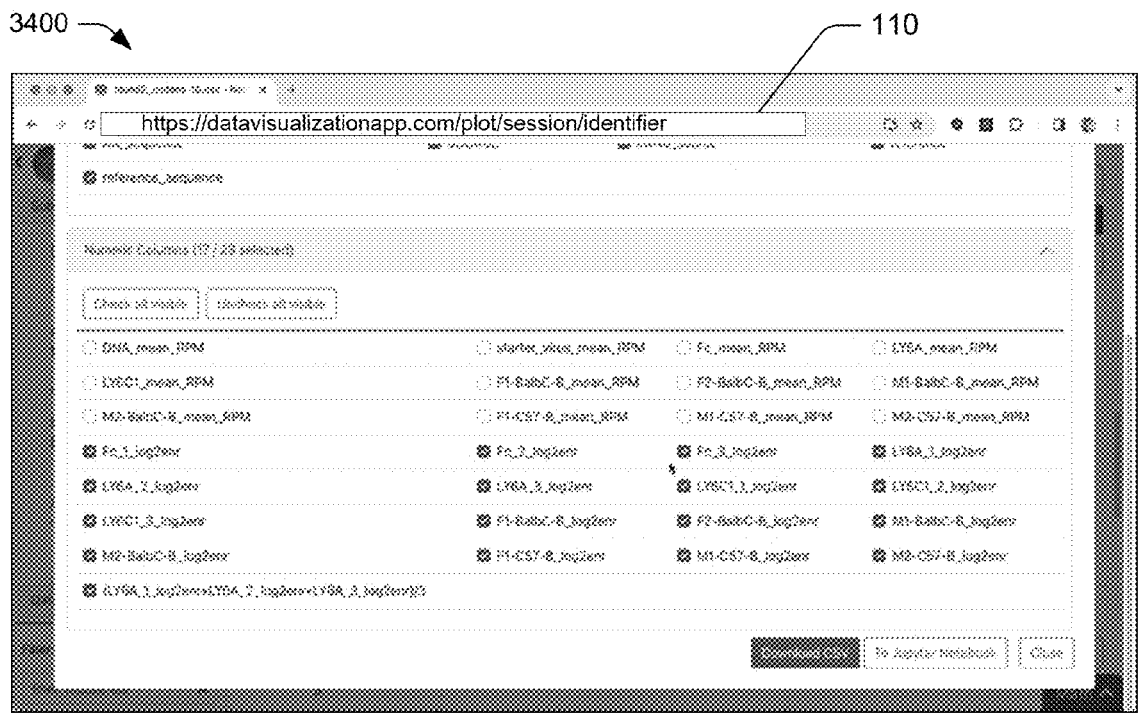
FIG. 34 depicts another example 3400 of an interactive graphing user interface.

FIG. 34 depicts another example 3400 of an interactive graphing user interface.

The illustrated example 3400 includes the graphing user interface 110, e.g., as generated by processor(s) 116 executing program code 114 and displayed by the display device 112. In this example 3400, the data values selected in the example 3300 remain checked. In contrast to the example 3300, however, the data values are not filtered based on a search string. Instead, more data values (e.g., all) of the set are listed via the graphing user interface 110. In this instance, however, the data values that were not presented in the example 3300 are not checked in the example 3400. This may result from a scenario where the user selects the interactive element to select all visible values while a text string is visually present in the text filtering interactive user interface element and where after selecting the interactive element to select all, user input is received to delete the text string from the text filtering interactive element.

Figure 35:
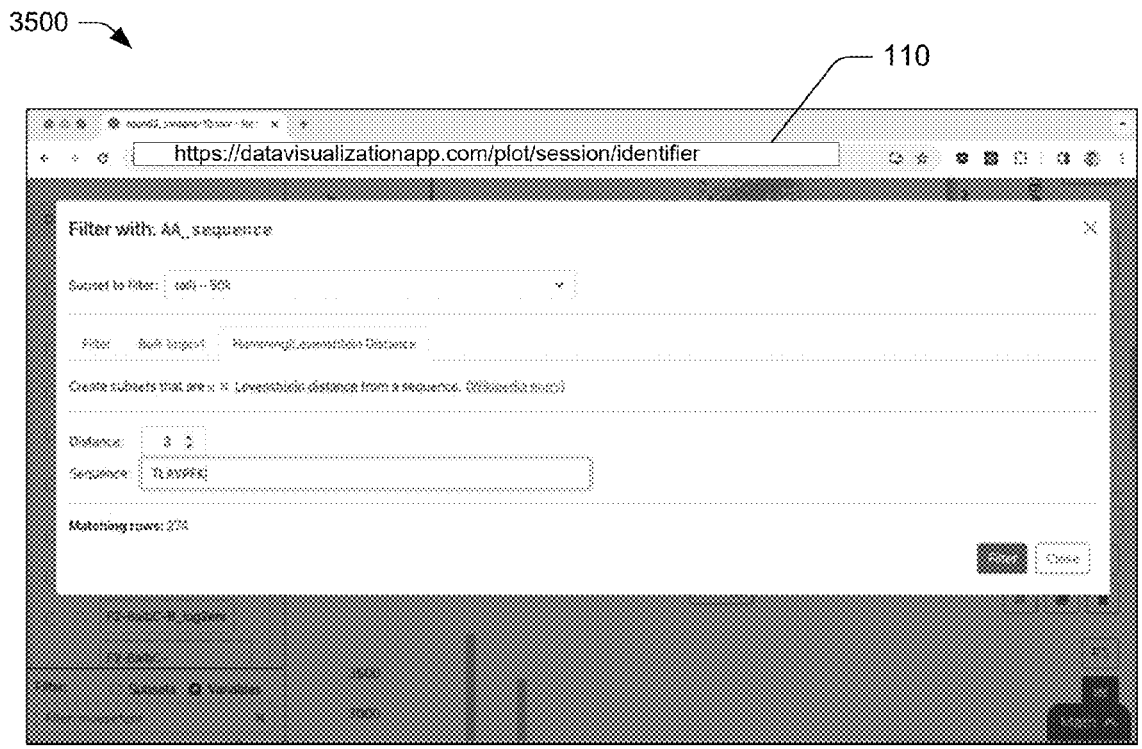
FIG. 35 depicts another example 3500 of an interactive graphing user interface.

FIG. 35 depicts another example 3500 of an interactive graphing user interface.

The illustrated example 3500 includes the graphing user interface 110, e.g., as generated by processor(s) 116 executing program code 114 and displayed by the display device 112. In this example 3500, the graphing user interface 110 includes one or more instrumentalities that allow a user to provide input to filter data values based on a similarity to (or difference with) a specified data value. By way of example and not limitation, the graphing user interface 110 includes one or more interactive elements that are operable to specify a data value and are also operable to specify how similar or different data values are allowed to be to be included in a same subset as the specified data value. Here, for instance, the interactive elements are operable to specify an Levenshtein distance and a specified value. Based on such user input, the processor(s) 116 identify which data values of the respective set of data values are within the specified Levenshtein distance of the specified value. The processor(s) 116 then creates a subset of data values that are within the specified Levenshtein distance of the specified value. In one or more implementations, different measures of similarity and/or difference may be used, examples of which include but are not limited to Hamming distance, Euclidean distance, Manhattan distance, Minkowski distance, Chebyshev distance, Edit distance, Lee distance, and Jaro distance, to name just a few.

Figure 36:
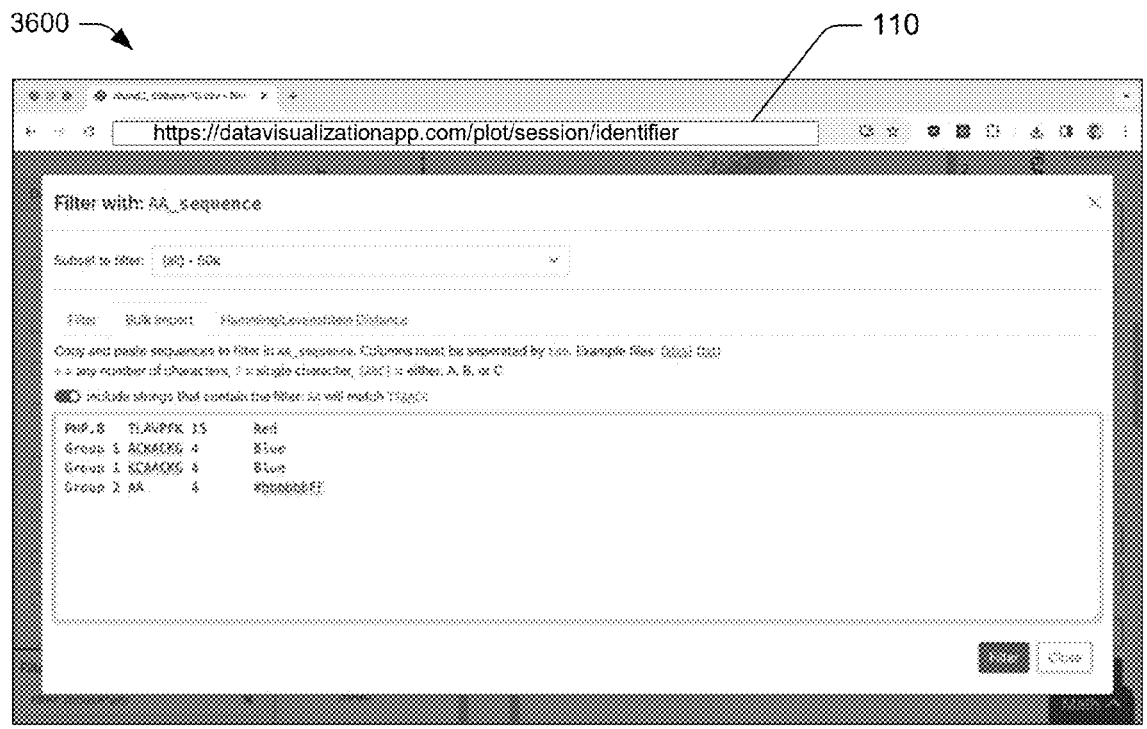
FIG. 36 depicts another example 3600 of an interactive graphing user interface.

FIG. 36 depicts another example 3600 of an interactive graphing user interface.

The illustrated example 3600 includes the graphing user interface 110, e.g., as generated by processor(s) 116 executing program code 114 and displayed by the display device

112. In this example 3600, the graphing user interface 110 includes one or more interactive user interface elements for bulk importing strings (e.g., sequences). These elements are operable to enable a user to specify via type at least labels for labeling visual indications of the subset to be filtered, a string to filter on, and a color for labeling (e.g., data points) of the subset, to name just a few.

Figure 37:
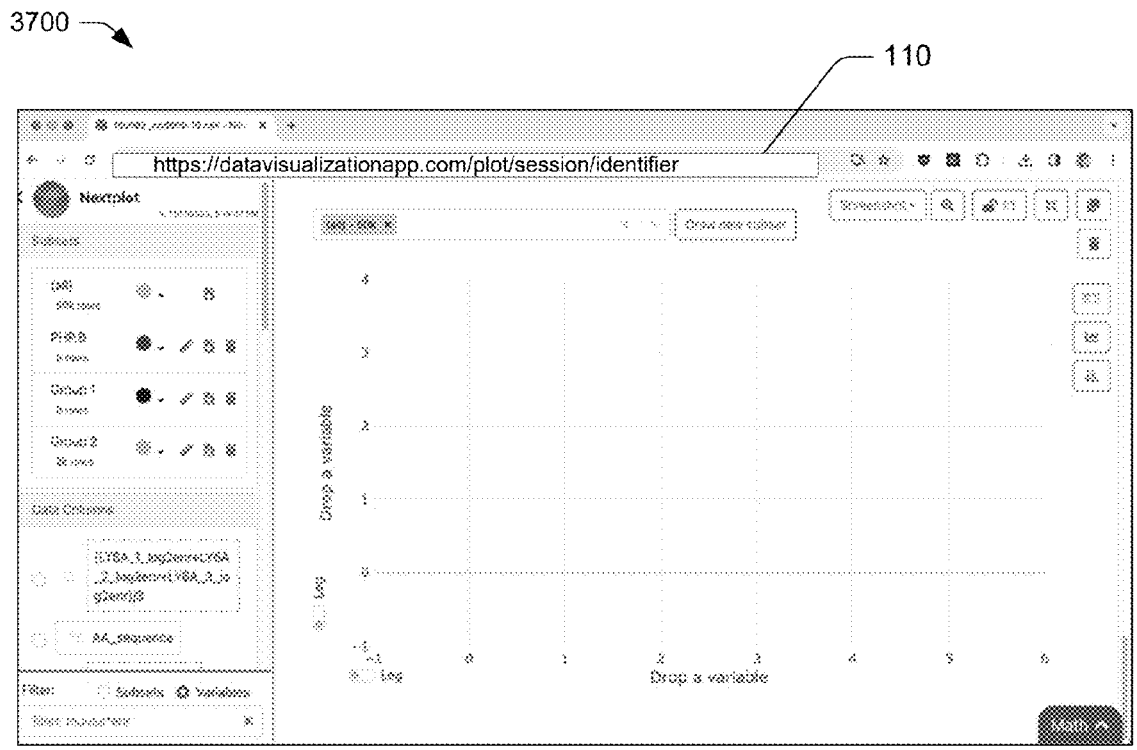
FIG. 37 depicts another example 3700 of an interactive graphing user interface.

FIG. 37 depicts another example 3700 of an interactive graphing user interface.

The illustrated example 3700 includes the graphing user interface 110, e.g., as generated by processor(s) 116 executing program code 114 and displayed by the display device 112. This example 3700 depicts a continuation of the scenario depicted in FIG. 36. In this example 3700, the graphing user interface 110 includes a subset indication region that includes subsets and attributes of the subsets (e.g., labels and colors) defined by text in the previous example 3600.

Figure 38:
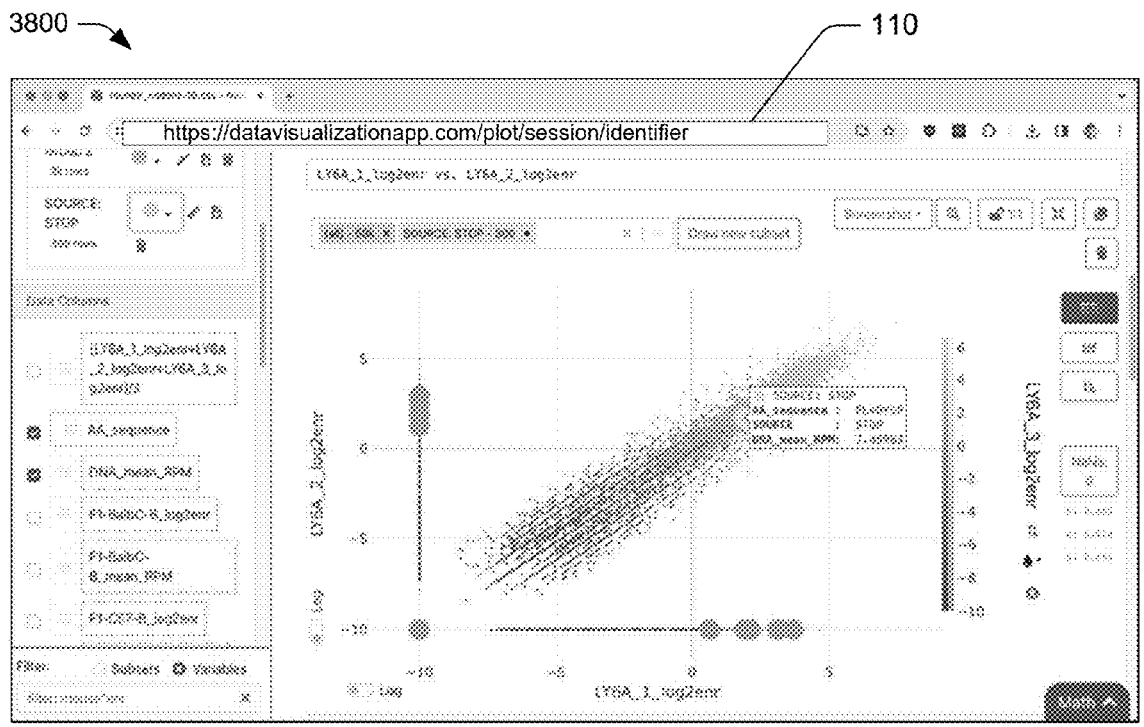
FIG. 38 depicts another example 3800 of an interactive graphing user interface.

FIG. 38 depicts another example 3800 of an interactive graphing user interface.

The illustrated example 3800 includes the graphing user interface 110, e.g., as generated by processor(s) 116 executing program code 114 and displayed by the display device 112. In this example 3800, the graphing user interface 110 displays data point information. In one or more implementations, data point information is displayed about a data point responsive to receiving user input in relation to the displayed data point, e.g., responsive to user input hovering over the displayed data point.

Figure 39:
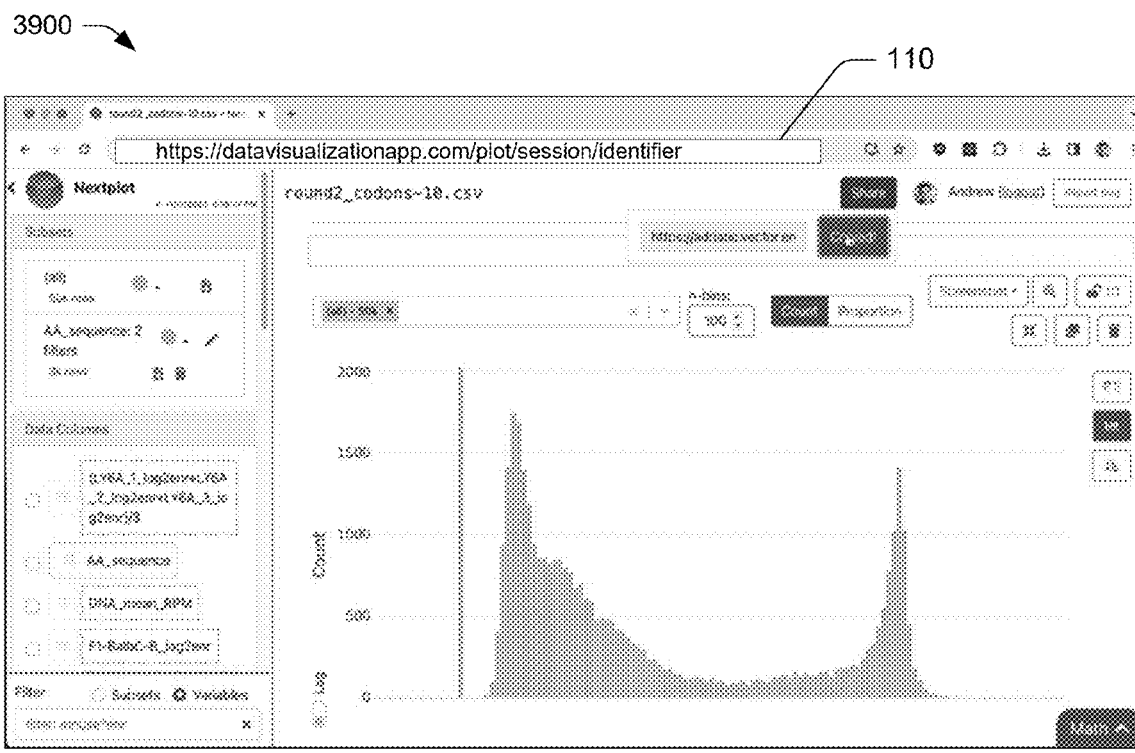
FIG. 39 depicts another example 3900 of an interactive graphing user interface.

FIG. 39 depicts another example 3900 of an interactive graphing user interface.

The illustrated example 3900 includes the graphing user interface 110, e.g., as generated by processor(s) 116 executing program code 114 and displayed by the display device 112. In this example 3900, the graphing user interface 110 includes a user interface element that is selectable to share one or more portions of the graphing session displayed via the graphing user interface 110. For instance, the user interface element is selectable to share a graph proximate the user interface element. Alternatively or in addition, the user interface element is selectable to share all graphs of the session. In one or more implementations, the user interface element is selectable to copy a hyperlink to the session or to a graph. Responsive to selection of such a user interface element, the hyperlink is copied to a clipboard, such that the copied hyperlink can be subsequently pasted, e.g., to an email, instant message, website, etc. When provided to a different user, the hyperlink is selectable by the different user to navigate to the graph or session to which the hyperlink points. In one or more implementations, the hyperlink allows the different user to access a permissioned version of the graph or session, such as a read-only version of the graph.

Figure 40:
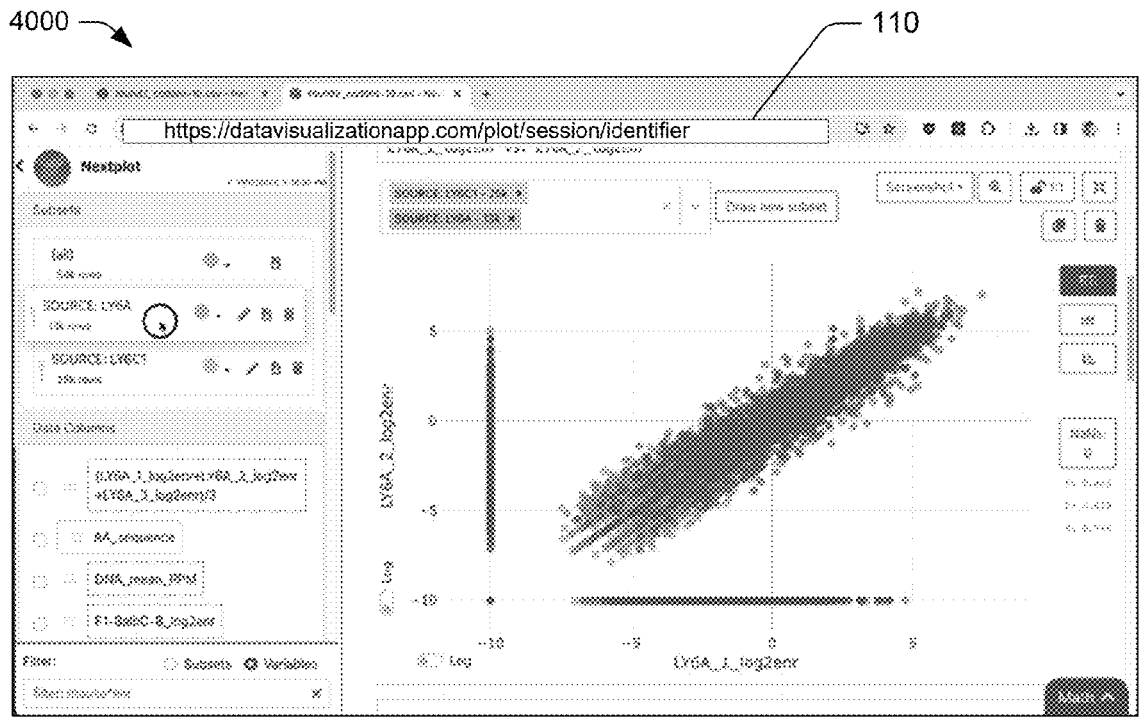
FIG. 40 depicts another example 4000 of an interactive graphing user interface.

FIG. 40 depicts another example 4000 of an interactive graphing user interface.

The illustrated example 4000 includes the graphing user interface 110, e.g., as generated by processor(s) 116 executing program code 114 and displayed by the display device 112. In one or more implementations, the graphing user interface 110 includes a displayed subset area, which includes visual indication of the subsets of data values plotted on the graph 130. In one or more implementations, the visual indications in the displayed subset area have a color that is indicative of the color of the respective data points visualized on the graph 130. In at least one variation, the visual indications are ordered to affect whether the data points corresponding to a visual indication are displayed in front of or behind the data points of corresponding to a different visual indication. For instance, when a first visual indication is higher in the order than a second visual indication, then the data points corresponding to the first visual indication are displayed in front of the data points corresponding to the second visual indication.

Figure 41:
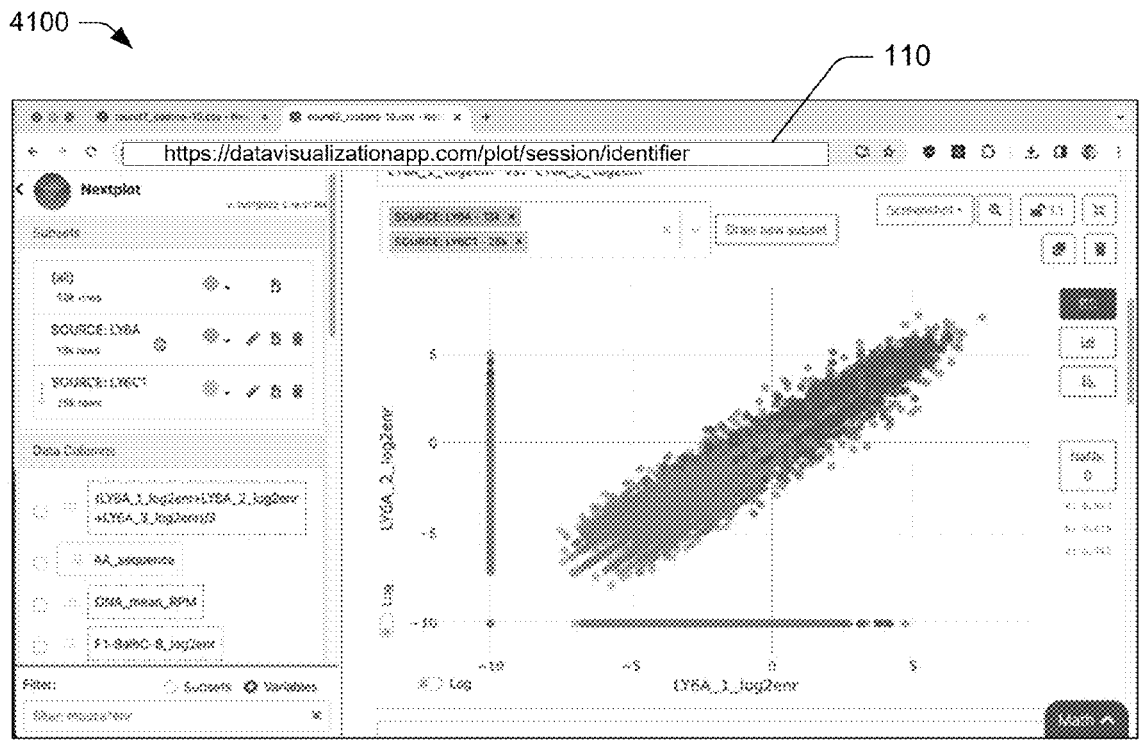
FIG. 41 depicts another example 4100 of an interactive graphing user interface.

FIG. 41 depicts another example 4100 of an interactive graphing user interface.

The illustrated example 4100 includes the graphing user interface 110, e.g., as generated by processor(s) 116 executing program code 114 and displayed by the display device 112. This example 4100 is a continuation of the scenario depicted in FIG. 40. In particular, the visual indications of two sets of data points displayed in the graph 130 are switched, such that a first set of data points previously displayed behind a second set of data points is positioned in front of the second set of data points. In other words, an order of the visual indications defines a z-order of the respective data points on the graph 130.

Figure 42:
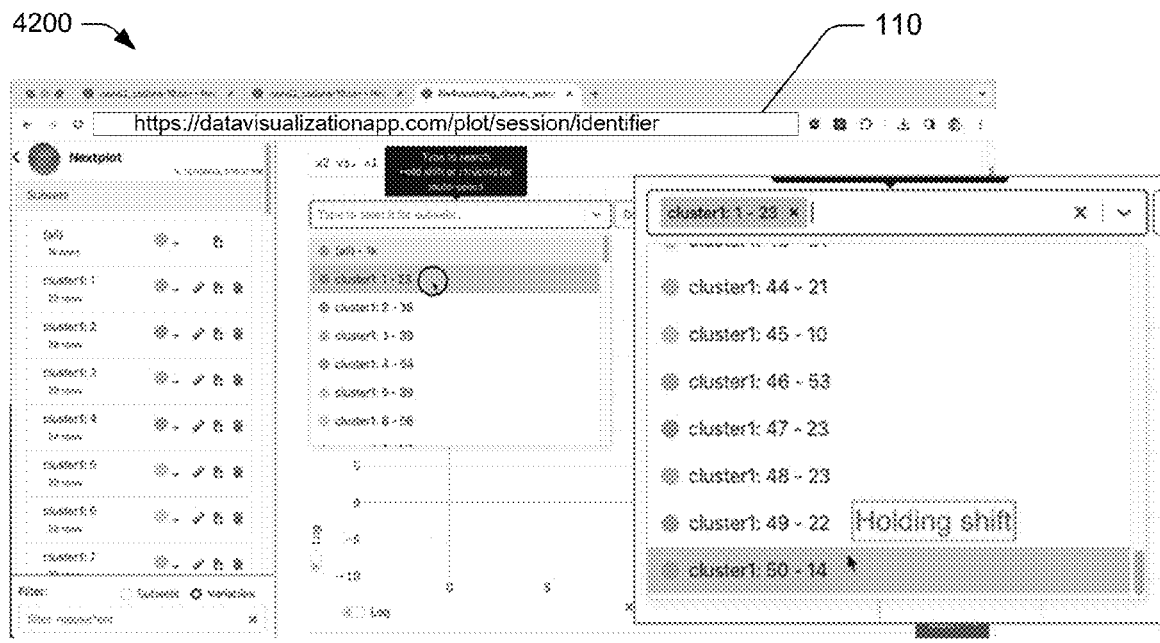
FIG. 42 depicts another example 4200 of an interactive graphing user interface.

FIG. 42 depicts another example 4200 of an interactive graphing user interface.

The illustrated example 4200 includes the graphing user interface 110, e.g., as generated by processor(s) 116 executing program code 114 and displayed by the display device 112. This example 4200 represents a scenario in which user input is received to quickly select a plurality of subsets to plot, e.g., multiple clusters. In one or more implementations, the graphing user interface 110 includes a list of subsets that are displayable. In at least one variation, multiple subsets adjacent in the list are selectable by initially selecting a first subset (e.g., by clicking on the subset). A further user input may be received to select a last subset and all the subsets in the list between the first and last subsets. In one example, the further input includes holding the shift key on a keyboard and selecting the last subset (e.g., by clicking or tapping). It is to be appreciated that consecutive subsets may be selected from a list in other ways without departing from the spirit or scope of the techniques described herein. Responsive to such selection, the selected subsets are displayed in the graph 130.

Figure 43:
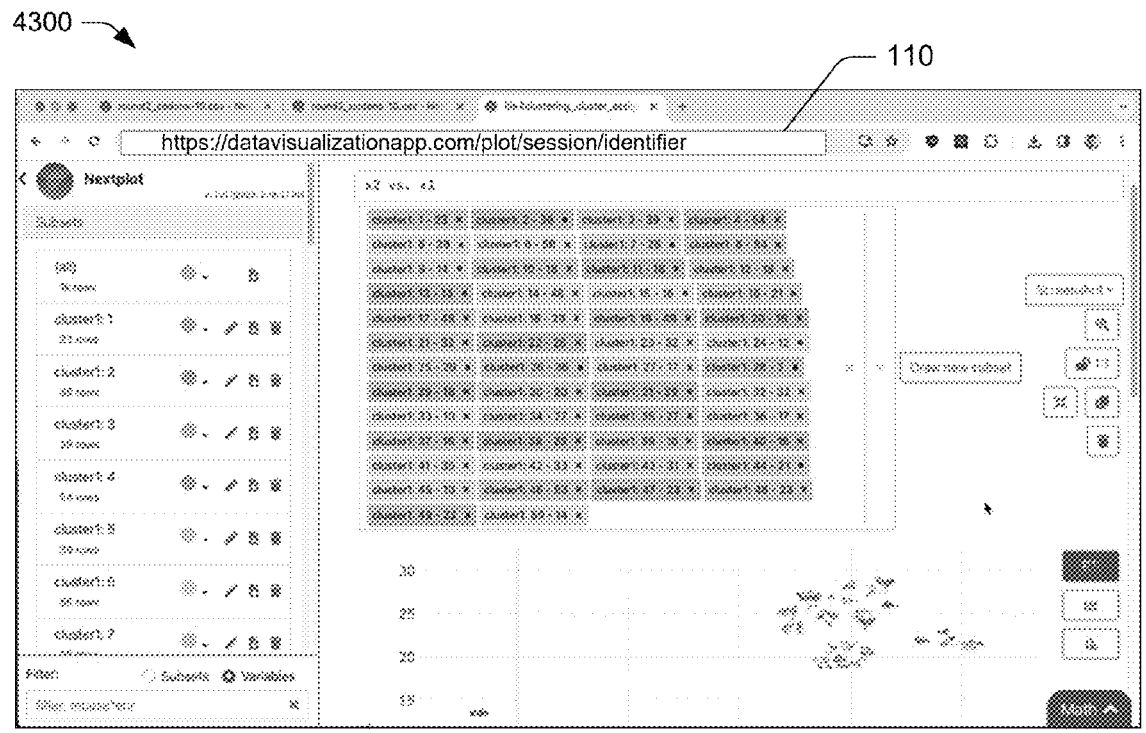
FIG. 43 depicts another example 4300 of an interactive graphing user interface.

FIG. 43 depicts another example 4300 of an interactive graphing user interface.

The illustrated example 4300 includes the graphing user interface 110, e.g., as generated by processor(s) 116 executing program code 114 and displayed by the display device 112. This example 4300 is a continuation of the scenario depicted in FIG. 42. In this example 4300, the consecutively ordered subsets selected from the list of subsets are displayed in the graph 130 of the graphing user interface 110. Visual indications of those subsets are also included in at least one displayed subset area of the graphing user interface 110.

Figure 44:
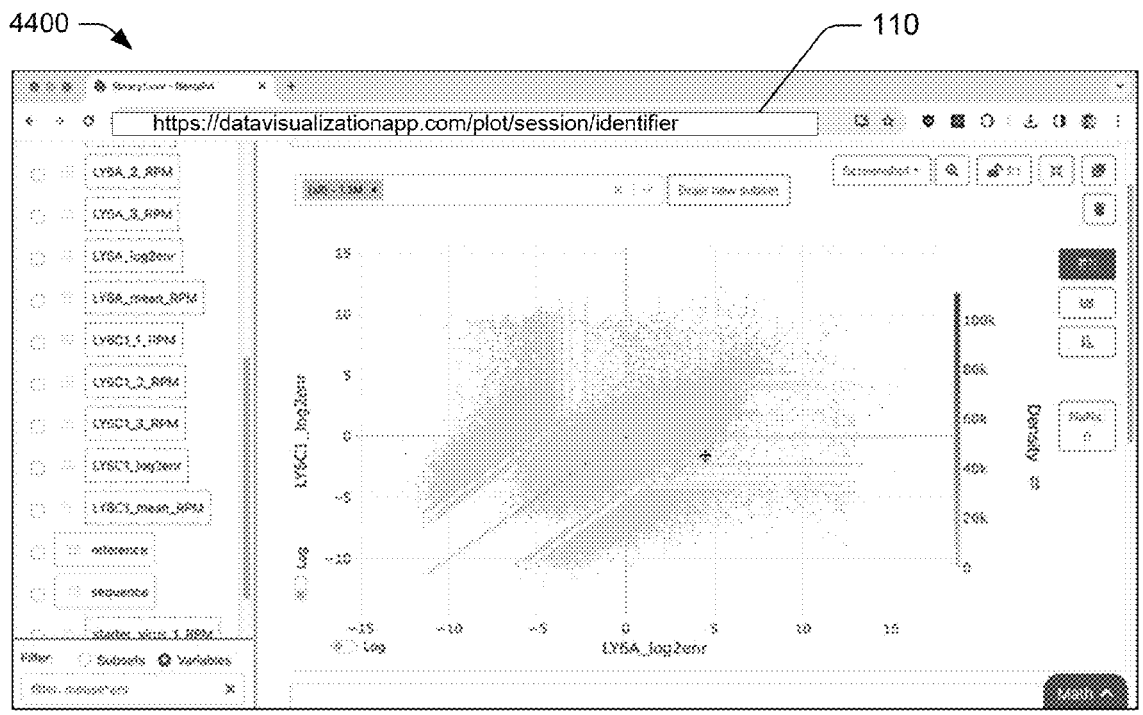
FIG. 44 depicts another example 4400 of an interactive graphing user interface.

FIG. 44 depicts another example 4400 of an interactive graphing user interface.

The illustrated example 4400 includes the graphing user interface 110, e.g., as generated by processor(s) 116 executing program code 114 and displayed by the display device 112. In this example 4400, the processor(s) 116 cause a heatmap to be displayed rather than a scatterplot via the graphing user interface 110, such as when an amount of data satisfies (e.g., exceeds) a threshold amount. In one or more implementations, the program code 114 causes the processor(s) 116 to determine whether an amount of data for display on the graph 130 satisfies the threshold amount. If the amount of data is determined to satisfy the threshold amount, then the processor(s) 116 cause data points of a scatter plot to be converted to a heat map. The heat map is then displayed via the graphing user interface 110.

Figure 45:
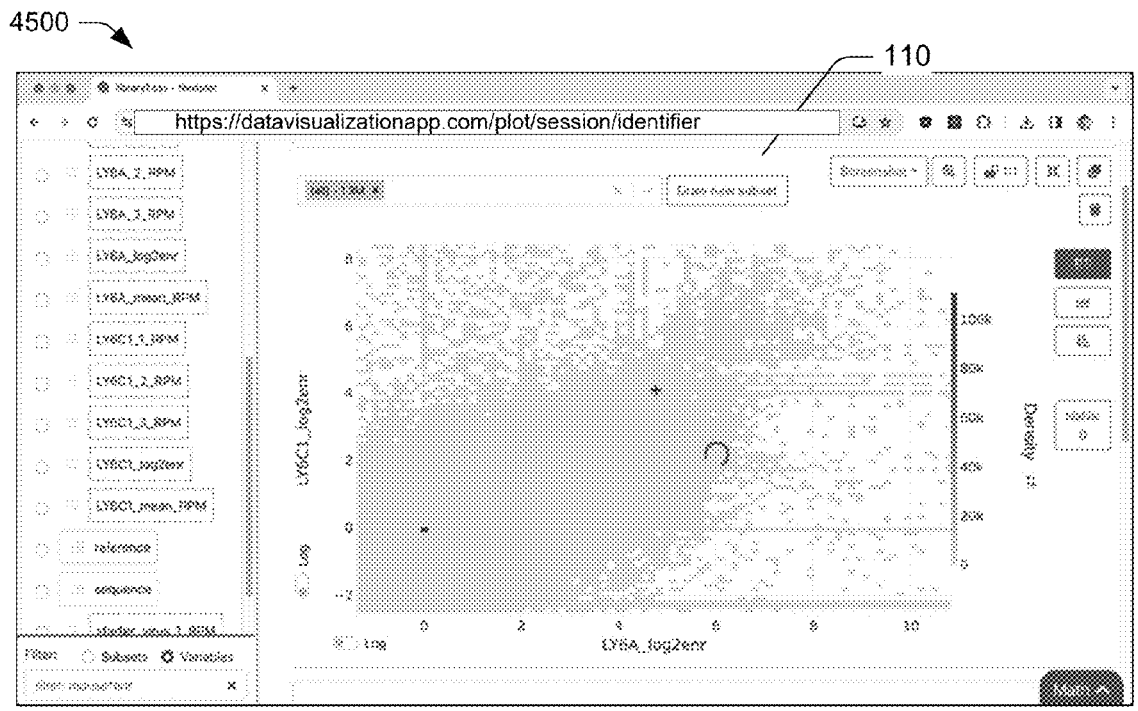
FIG. 45 depicts another example 4500 of an interactive graphing user interface.

FIG. 45 depicts another example 4500 of an interactive graphing user interface.

The illustrated example 4500 includes the graphing user interface 110, e.g., as generated by processor(s) 116 executing program code 114 and displayed by the display device 112. In one or more implementations, when user input is received to zoom into a heatmap, the processor(s) 116 can convert the data back into a scatter plot, such as when an amount of data to be included in the zoomed in portion of the graph 130 satisfies (e.g., is less than or equal to) a threshold. The illustrated example 4500 represents a scenario where a zoom input is received in relation to a portion of a heatmap displayed on the graph 130.

Figure 46:
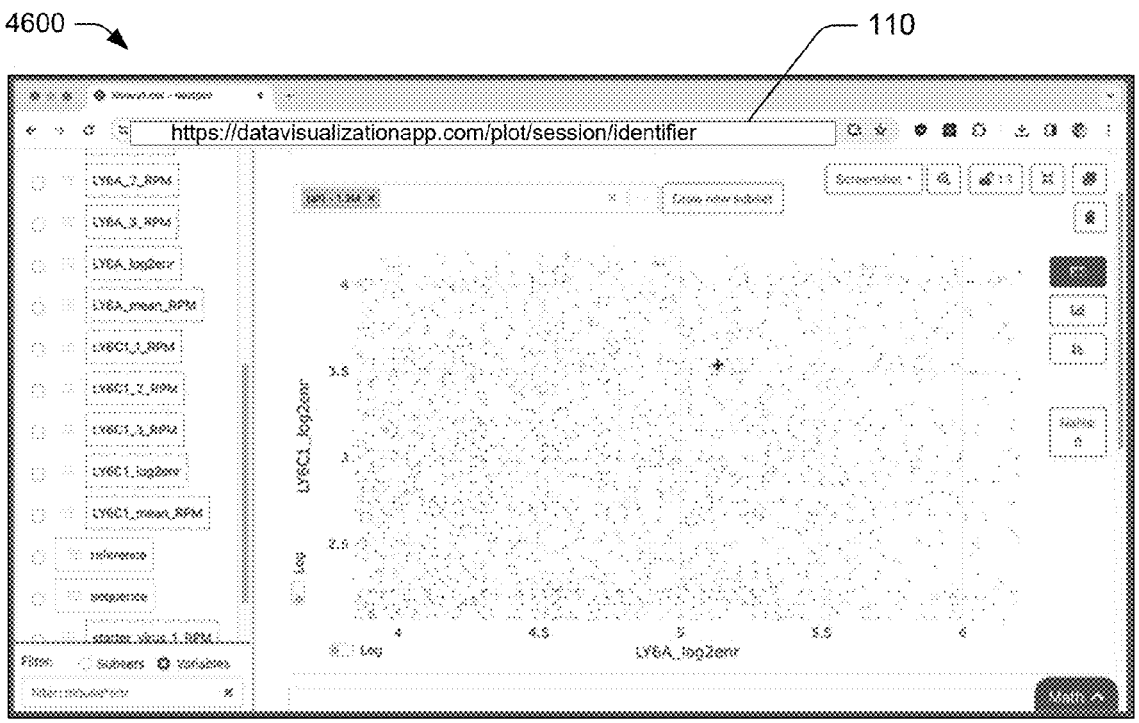
FIG. 46 depicts another example 4600 of an interactive graphing user interface.

FIG. 46 depicts another example 4600 of an interactive graphing user interface.

The illustrated example 4600 includes the graphing user interface 110, e.g., as generated by processor(s) 116 executing program code 114 and displayed by the display device 112. The illustrated example represents a continuation of the scenario depicted in FIG. 45. In this example 4600, the processor(s) 116 have made a determination that an amount of data to be displayed via the graph satisfies (e.g., is less than) a threshold amount based on a zooming user input. Here, the heat map is converted to a scatter plot, and in the illustrated example 4600 the scatter plot of the zoomed in portion is displayed via the graphing user interface 110 (e.g., rather than the heat map of that portion).

Figure 47:
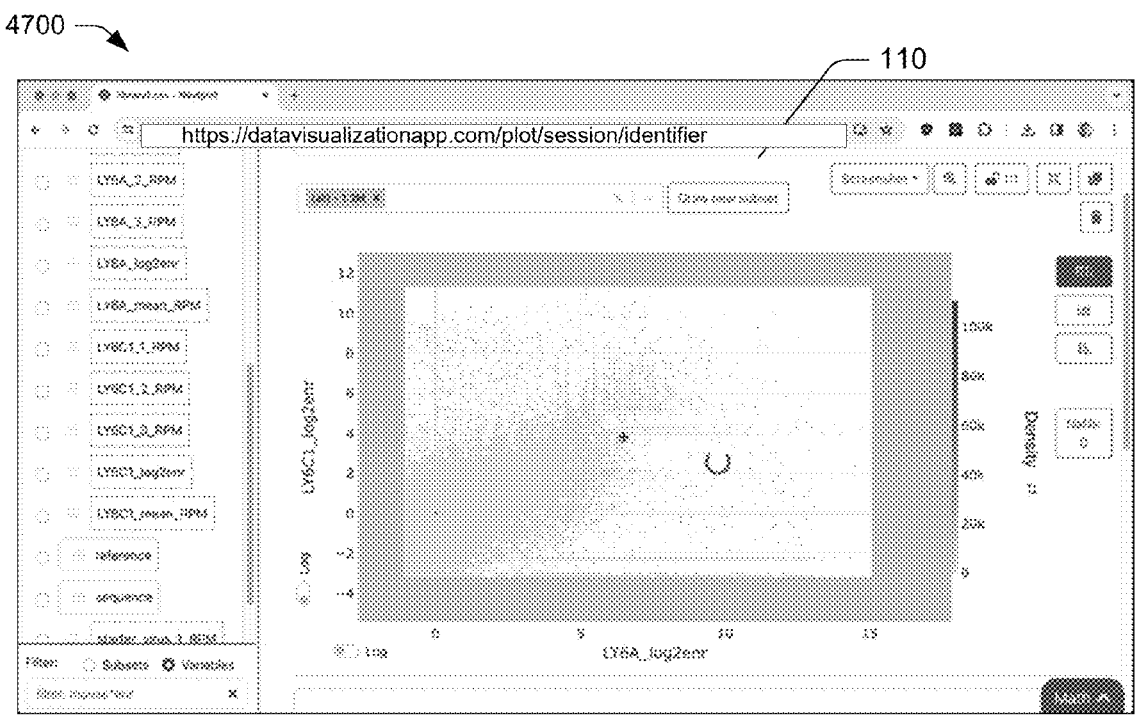
FIG. 47 depicts another example 4700 of an interactive graphing user interface.

FIG. 47 depicts another example 4700 of an interactive graphing user interface.

The illustrated example 4700 includes the graphing user interface 110, e.g., as generated by processor(s) 116 executing program code 114 and displayed by the display device 112. In one or more implementations, the program code 114 of the interactive graphing application 108 improves performance by selectively limiting the data visualized in one or more scenarios. For instance, the program code 114 causes the processor(s) 116 to only visualize data that a user has selected to view, e.g. within the viewing window. At least some of the data outside the viewing window is not visualized. By way of example, in a scenario where a user zooms out quickly the updated viewing window may extend past a level at which the data was previously visualized. In this example, the data for the portion of the updated window not previously visualized is visualized after user input is received to zoom out to the zoomed out level, e.g., the processor(s) 116 automatically load the data for the updated new zoom level. The illustrated example 4700 illustrates the scenario where user input is received to zoom out quickly from a previous viewing window and where a gray portion is displayed while the processor(s) 116 update the visualization to include the zoomed out portions.

Figure 48:
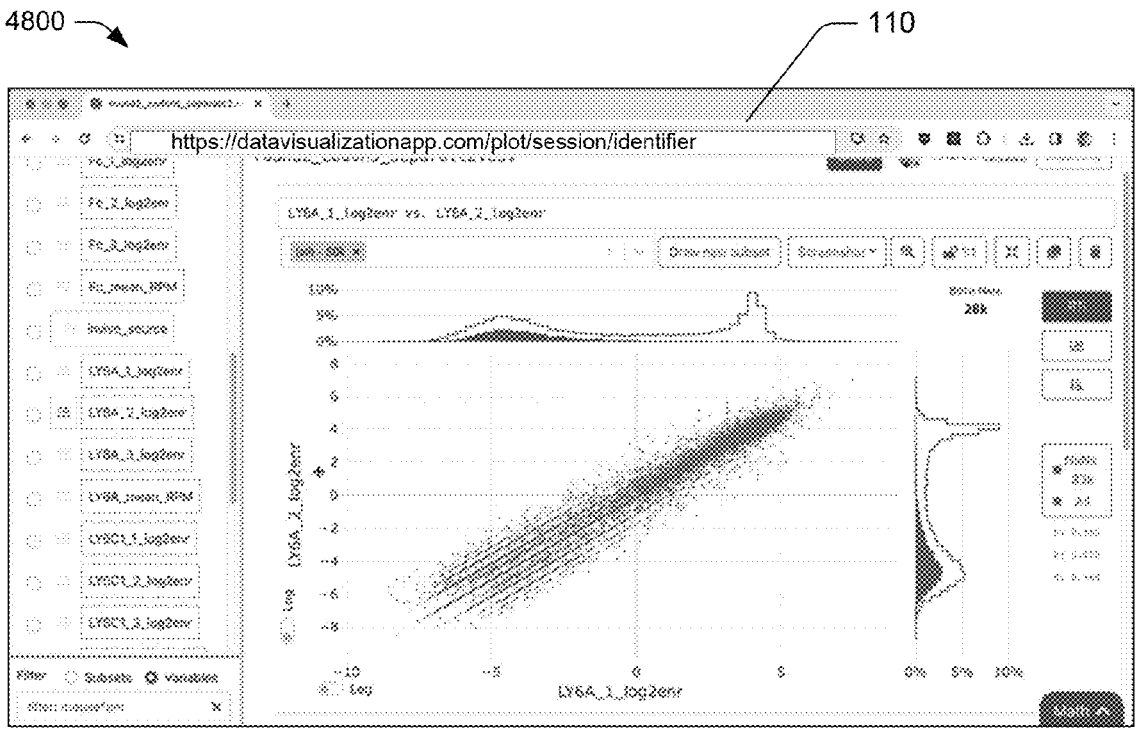
FIG. 48 depicts another example 4800 of an interactive graphing user interface.

FIG. 48 depicts another example 4800 of an interactive graphing user interface.

The illustrated example 4800 includes the graphing user interface 110, e.g., as generated by processor(s) 116 executing program code 114 and displayed by the display device 112. In this example 4800, the graphing user interface 110 includes not-a-number graphics that indicate where at least one data value is missing, e.g., where a row is missing a data value in the column assigned to the respective axis. Entries may be missing data values for a variety of reasons. For instance, at the edges of functionality, sensors may not be able to detect a data value. In one or more implementations, rather than leave such values missing, null, or empty, the processor(s) 116 causes the missing data values to be interpolated using one or more known interpolation techniques.

Figure 49:
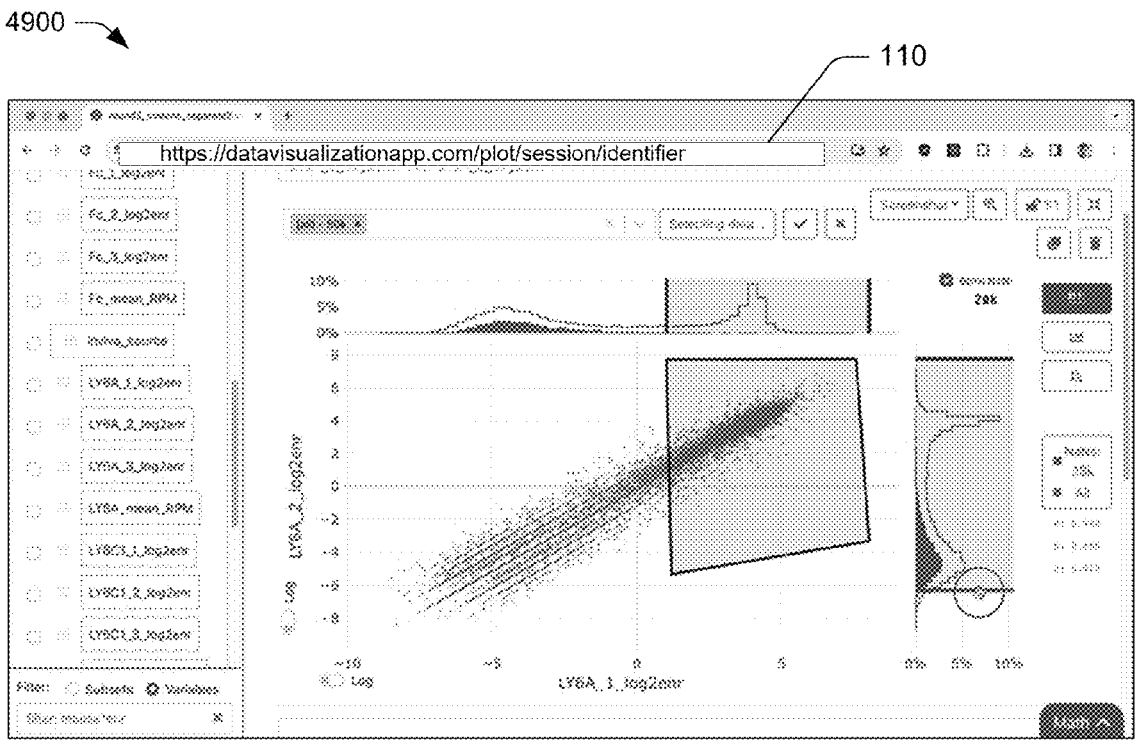
FIG. 49 depicts another example 4900 of an interactive graphing user interface.

FIG. 49 depicts another example 4900 of an interactive graphing user interface.

The illustrated example 4900 includes the graphing user interface 110, e.g., as generated by processor(s) 116 executing program code 114 and displayed by the display device 112. This example 4900 represents a continuation of the scenario depicted in FIG. 48. In this example 4900 a polygon is drawn over a portion of the graph 130. The non-a-number graphics include a visual indication corresponding to the polygon over those graphics. By leaving including an indication of the polygon over the non-a-number graphics, as a user is drawing a polygon as discussed in more detail above, the user can provide input to draw the polygon in a manner that purposely avoids selecting portions of the graph where there are many missing numbers, which may indicate less quality in the data at those portions of the graph 130.

Figure 50:
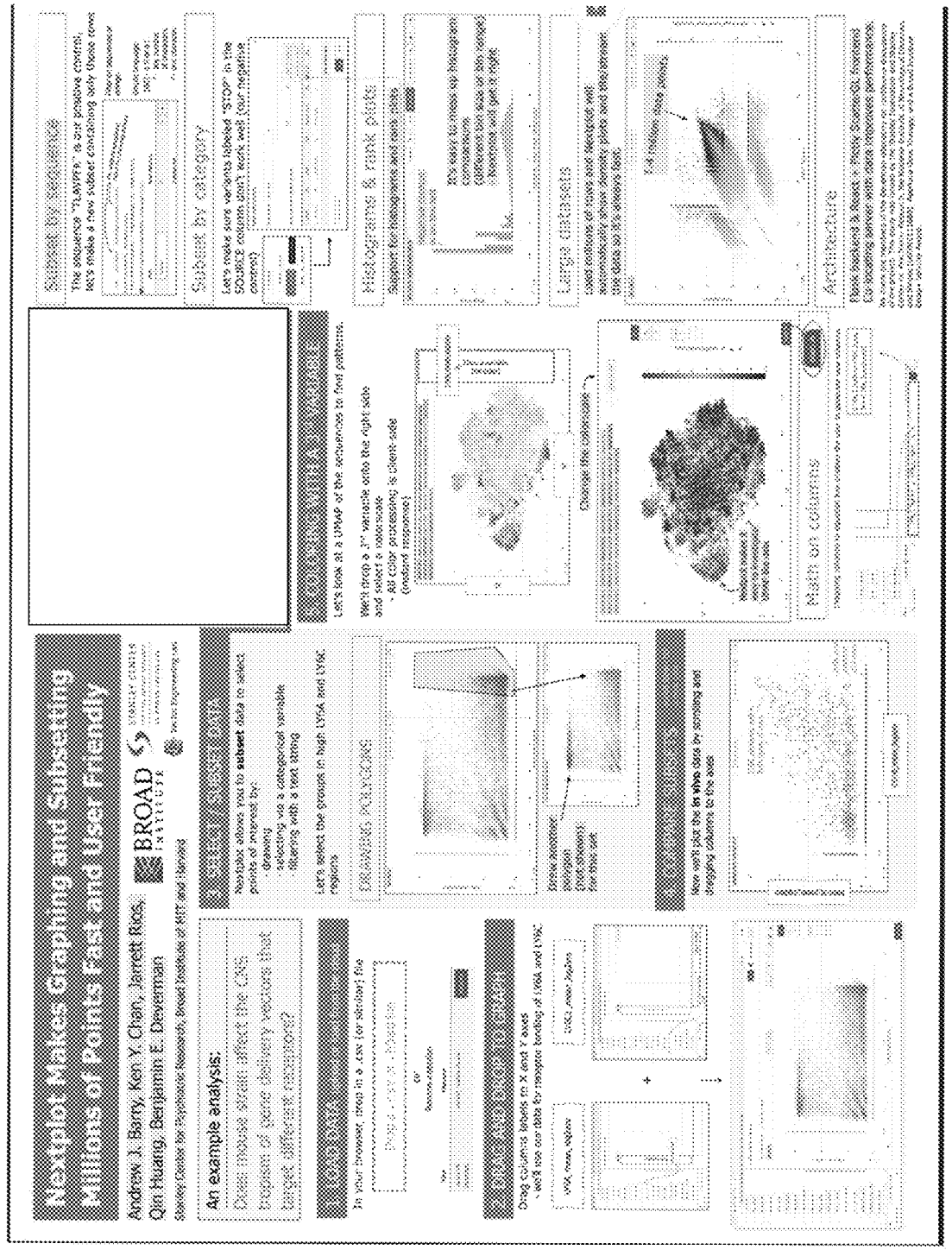
FIG. 50 depicts an example 5000 of various features of the interactive graphing application.

FIG. 50 depicts an example 5000 of various features of the interactive graphing application. The "Math on Columns" section of FIG. 50 shows that a user can drag columns to an equation box in order to generate new columns (e.g., new subsets of data). This feature enables non-computational users to do this type of math. For example, the user can compute new columns by applying math operations to entire columns at once. For example, you could average replicates together by typing "([COL1]+[COL2]+COL3])/3". Another example is taking a log-base-2 of a column by typing "log([COLUMN])/log2".

Having discussed exemplary details of interactive graphing user interfaces, consider now some examples of procedures to illustrate additional aspects of the techniques.

Example Procedures

This section describes examples of procedures for interactive graphing user interfaces. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 51:
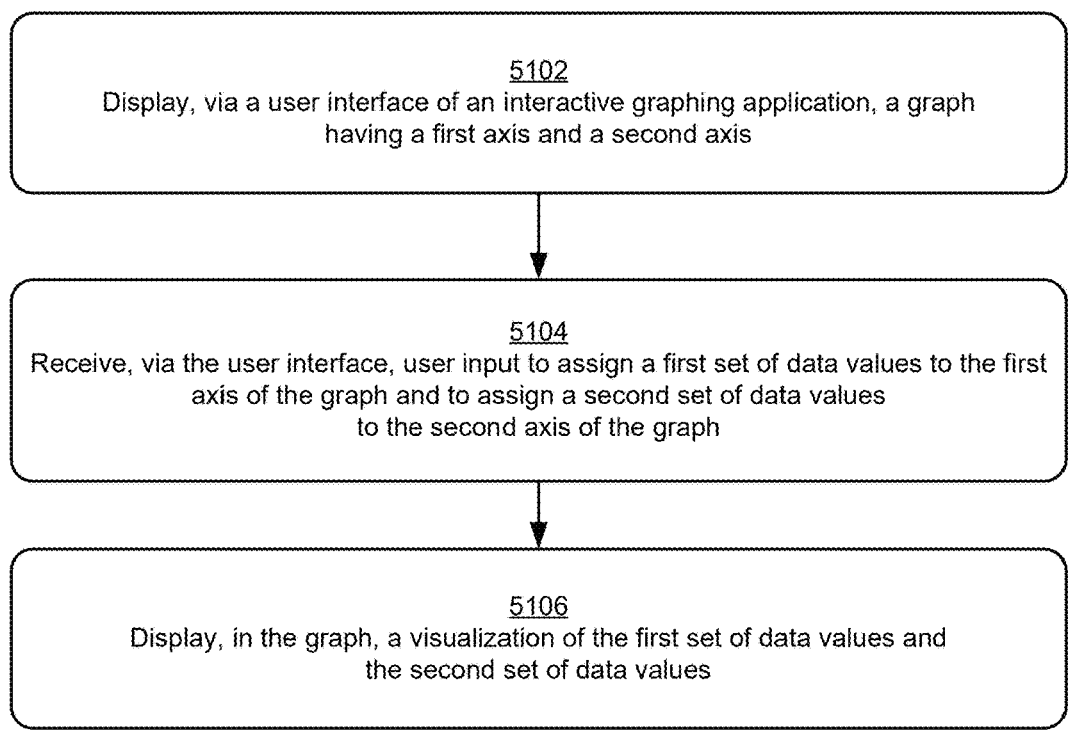
FIG. 51 depicts a procedure 5100 in an example implementation of interactive graphing user interface.

FIG. 51 depicts a procedure 5100 in an example implementation of interactive graphing user interface.

A user interface of an interactive graphing application having a graph that includes a first axis and a second axis is displayed (block 5102). By way of example, user interface 110 of interactive graphing application 108 is displayed. User interface 110 includes a graph 130 having a first axis and a second axis.

User input to assign a first set of data values to the first axis of the graph and to assign a second set of data values to the second axis of the graph is received via the user interface (block 5104). By way of example, the user input may include a first user input and a second user input. For example, first user input is received to move a first visual indication of the plurality of visual indications 128 to a first area of the graphing user interface 110. In this example, the first area of the graphing user interface 110 is associated with a first axis of a graph 130 that is displayed in the graphing user interface 110. In other words, the input to move the first visual indication to the first area assigns a first set of data values to the first axis of the graph 130. In this example, the first set of data values corresponds to the column 126 of the table 122 that is represented by the respective first visual indication. Based on receipt of the first input, the first set of data values is assigned to the first axis of the graph 130.

A second user input is also received to move a second visual indication of the plurality of visual indications 128 to a second area of the graphing user interface 110. In this example, the second area of the graphing user interface 110 is associated with a second axis of the graph 130. In other words, the input to move the second visual indication to the second area assigns a second set of data values to the second axis of the graph. In this example, the second set of data values corresponds to a different column 126 of the table 122, which is represented by the respective second visual indication. Based on receipt of this additional user input, the second set of data values is assigned to the second axis of the graph 130.

Responsive to the user input, a visualization of the first set of data values and the second set of data values is displayed in the graph (block 5106). In accordance with the principles discussed herein, the visualization includes data points that plot the first set of data values against the second set of data values. By way of example, responsive to the second input, a visualization 132 is displayed in the graph 130. The visualization 132 includes data points that plot the first set of data values against the second set of data values.

Having described examples of procedures in accordance with one or more implementations, consider now an example of a system and device that can be utilized to implement the various techniques described herein.

Example System and Device

Figure 52:
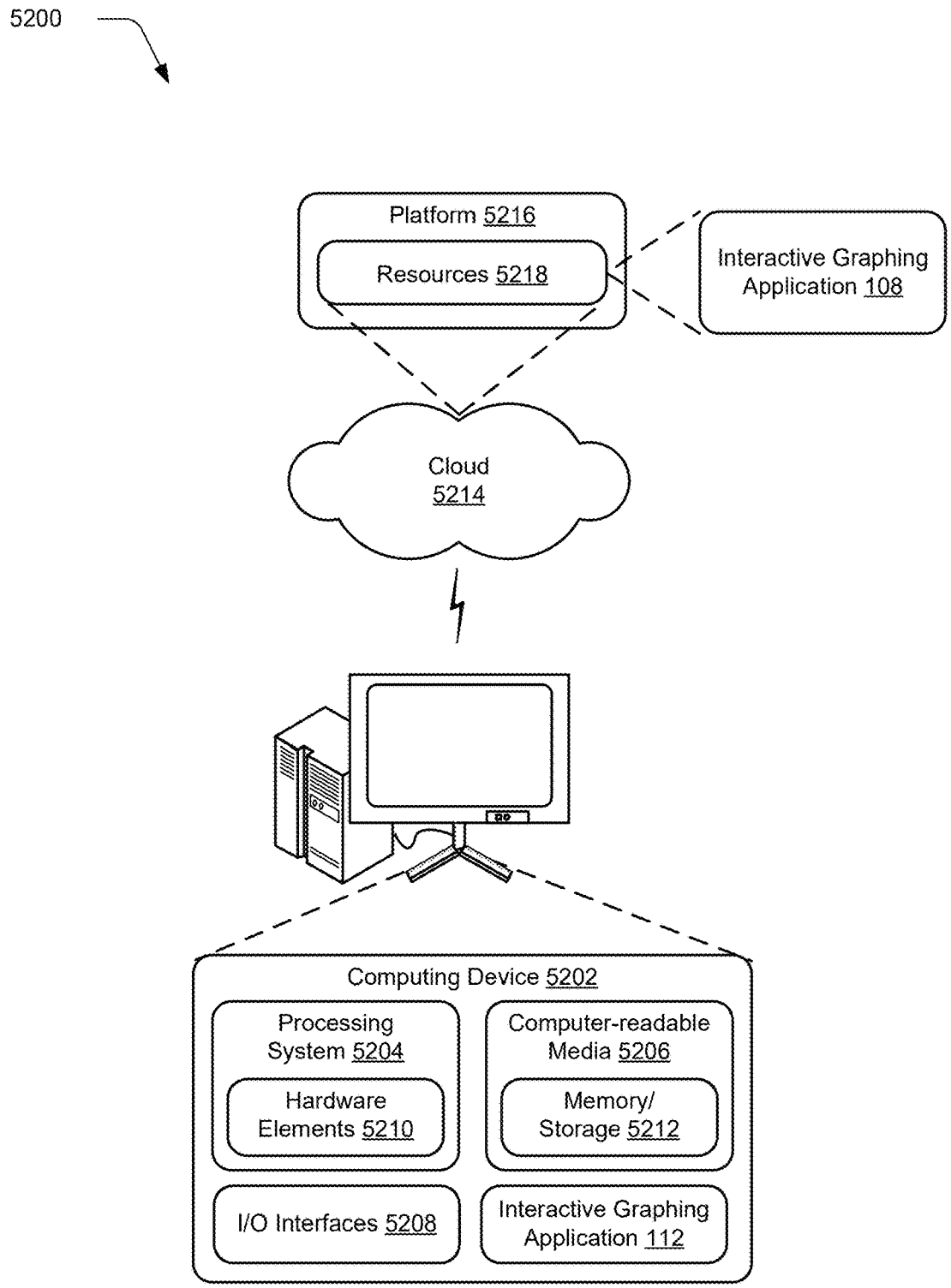
FIG. 52 illustrates an example of a system generally at 5200 that includes an example of a computing device 5202 that is representative of one or more computing systems and/or devices that may implement the various techniques described herein.

FIG. 52 illustrates an example of a system generally at 5200 that includes an example of a computing device 5202 that is representative of one or more computing systems and/or devices that may implement the various techniques described herein. This is illustrated through inclusion of the interactive graphing application 108 in the example 5200. The computing device 5202 may be, for example, a server of a service provider, a device associated with a client (e.g., a client device), an on-chip system, and/or any other suitable computing device or computing system.

The example computing device 5202 as illustrated includes a processing system 5204, one or more computer-readable media 5206, and one or more I/O interfaces 5208 that are communicatively coupled, one to another. Although not shown, the computing device 5202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 5204 is representative of functionality to perform one or more operations using hardware. Accordingly, the processing system 5204 is illustrated as including hardware elements 5210 that may be configured as processors, functional blocks, and so forth. This may include implementation in hardware as an application specific integrated circuit or other logic device formed using one or more semiconductors. The hardware elements 5210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 5206 is illustrated as including memory/storage 5212. The memory/storage 5212 represents memory/storage capacity associated with one or more computer-readable media. The memory/storage 5212 may include volatile media (such as random access memory (RAM)) and/or nonvolatile media (such as read only memory (ROM), Flash memory, optical disks, magnetic disks, and so forth). The memory/storage 5212 may include fixed media (e.g., RAM, ROM, a fixed hard drive, and so on) as well as removable media (e.g., Flash memory, a removable hard drive, an optical disc, and so forth). The computer-readable media 5206 may be configured in a variety of other ways as further described below.

Input/output interface(s) 5208 are representative of functionality to allow a user to enter commands and information to computing device 5202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 5202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 5202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 5202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 5210 and computer-readable media 5206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 5210. The computing device 5202 may be configured to implement particular instructions and/or functions corresponding to the software and/or hardware modules. Accordingly, implementation of a module that is executable by the computing device 5202 as software may be achieved at least partially in hardware, e.g., through use of computer-readable storage media and/or hardware elements 5210 of the processing system 5204. The instructions and/or functions may be executable/operable by one or more articles of manufacture (for example, one or more computing devices 5202 and/or processing systems 5204) to implement techniques, modules, and examples described herein.

The techniques described herein may be supported by various configurations of the computing device 5202 and are not limited to the specific examples of the techniques described herein. This functionality may also be implemented all or in part through use of a distributed system, such as over a "cloud" 5214 via a platform 5216 as described below.

The cloud 5214 includes and/or is representative of a platform 5216 for resources 5218. The platform 5216 abstracts underlying functionality of hardware (e.g., servers) and software resources of the cloud 5214. The resources 5218 may include applications and/or data that can be utilized while computer processing is executed on servers that are remote from the computing device 5202, such as to execute the interactive graphing application 108 using the resources 5218 and provide its functionality to the computing device 102 via the graphing user interface 110. Resources 5218 can also include services provided over the Internet and/or through a subscriber network, such as a cellular or Wi-Fi network.

The platform 5216 may abstract resources and functions to connect the computing device 5202 with other computing devices. The platform 5216 may also serve to abstract scaling of resources to provide a corresponding level of scale to encountered demand for the resources 5218 that are implemented via the platform 5216. Accordingly, in an interconnected device embodiment, implementation of functionality described herein may be distributed throughout the system 5200. For example, the functionality may be implemented in part on the computing device 5202 as well as via the platform 5216 that abstracts the functionality of the cloud 5214.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A computer-implemented method comprising:
   displaying, via a user interface of an interactive graphing application, a graph having a first axis and a second axis;
   receiving, via the user interface, user input to assign a first set of data values to the first axis of the graph and to assign a second set of data values to the second axis of the graph;
   adjusting the graph based on the first set of data values and the second set of data values, the adjusting comprising:
   i. determining a first range and a first scale of the first axis based on the first set of data values;
   ii. determining a second range and a second scale of the second axis based on the second set of data values; and
   iii. adjusting the graph based on the first range and the first scale of the first axis and the second range and the second scale of the second axis;
   responsive to the user input, displaying, in the graph, a visualization of the first set of data values and the second set of data values, the visualization including data points that plot the first set of data values against the second set of data values;
   receiving additional user input to select a subset of the data points of the visualization; and
   responsive to the additional user input, adjusting the visualization in order to visually differentiate the selected subset of data points.

2. The computer-implemented method of claim 1, wherein the first set of data values is stored in a first column of a table, and wherein the second set of data values is stored in a second column of the table.

3. The computer-implemented method of claim 2, further comprising loading a file that includes the table into the interactive graphing application, wherein the loading causes the interactive graphing application to:
   extract the first set of data from a first column in the table;
   extract the second set of data from a second column in the table; and
   display visual indications of the first set of data and the second set of data in the user interface.

4. The computer-implemented method of claim 2, wherein each row of the table represents an entry in the table, and wherein each column in the table represents an attribute of the respective entry.

5. The computer-implemented method of claim 2, wherein each row of the table represents a sample that is subject to test results, and wherein each column in the table represents a test result from testing the respective sample.

6. The computer-implemented method of claim 1, wherein the user interface includes a data set selection region that includes at least a first visual indication of the first set of data values and a second visual indication of the second set of data values.

7. The computer-implemented method of claim 6, wherein the user input includes at least:
   a first user input, to the data set selection region, to select the first visual indication and position the first visual indication in a first data assignment region associated with the first axis; and
   a second user input, to the data set selection region, to select the second visual indication and position the second visual indication in a second data assignment region associated with the second axis.

8. The computer-implemented method of claim 1, wherein the adjusting the visualization in order to visually differentiate the selected subset of data points comprises displaying the selected subset of data points with a different color.

9. The computer-implemented method of claim 1, wherein the adjusting the visualization in order to visually differentiate the selected subset of data points comprises displaying only the selected subset of data points.

10. The computer-implemented method of claim 1, wherein the additional user input comprises user input to draw a polygon to select the subset of the data points of the visualization.

11. The computer-implemented method of claim 1, wherein the additional user input comprises user input to provide a text string.

12. One or more computer-readable storage media having instructions stored thereon that, responsive to execution by one or more processors, perform operations comprising:
   displaying a user interface of an interactive graphing application, the user interface including a graph having a first axis and a second axis;
   displaying, on the graph, a visualization of a first set of data values extracted from a table and a second set of data values extracted from the table, the visualization including data points that plot the first set of data values against the second set of data values wherein, for the displaying of the visualization, the graph is adjusted based on the first set of data values and the second set of data values by:
      i. determining a first range and a first scale of the first axis based on the first set of data values;
      ii. determining a second range and a second scale of the second axis based on the second set of data values; and
      iii. adjusting the graph based on the first range and the first scale of the first axis and the second range and the second scale of the second axis;
   receiving, via the user interface, user input to select a subset of the data points; and
   responsive to the user input, adjusting the visualization in order to visually differentiate the selected subset of data points.

13. The one or more computer-readable storage media of claim 12, wherein the adjusting the visualization in order to visually differentiate the selected subset of data points comprises displaying the selected subset of data points with a different color.

14. The one or more computer-readable storage media of claim 12, wherein the adjusting the visualization in order to visually differentiate the selected subset of data points comprises displaying only the selected subset of data points.

15. The one or more computer-readable storage media of claim 13, wherein the user input comprises user input to draw a polygon to select the subset of the data points of the visualization.

16. A computing device comprising:
   at least a memory and a processor to execute an interactive graphing application, the interactive graphing application configured to:
      extract a first set of data values from a first column of a table and extract a second set of data values from a second column of the table;
      display a user interface that includes a graph having a first axis and a second axis;
      display, on the graph, a visualization of a first set of data values extracted from the table and the second set of data values extracted from the table, the visualization including data points that plot the first set of data values against the second set of data values wherein, to display the visualization, the graph is adjusted based on the first set of data values and the second set of data values by:
         i. determining a first range and a first scale of the first axis based on the first set of data values;
         ii. determining a second range and a second scale of the second axis based on the second set of data values; and
         iii. adjusting the graph based on the first range and the first scale of the first axis and the second range and the second scale of the second axis;
      receive, via the user interface, user input to select a subset of the data points; and
      responsive to the user input, adjust the visualization in order to visually differentiate the selected subset of data points.

17. The computing device of claim 16, wherein the visualization is displayed responsive to user input received, via the user interface, to assign a first set of data values to the first axis of the graph and to assign a second set of data values to the second axis of the graph.

18. The computing device of claim 16, wherein each row of the table represents an entry in the table, and wherein each column in the table represents an attribute of the respective entry.

19. The computing device of claim 16, wherein each row of the table represents a sample that is subject to test results, and wherein each column in the table represents a test result from testing the respective sample.

20. The computing device of claim 16, wherein the user interface includes a data set selection region that includes at least a first visual indication of the first set of data values and a second visual indication of the second set of data values.

* * * * *